US009628338B2

(12) United States Patent
Turon et al.

(10) Patent No.: US 9,628,338 B2
(45) Date of Patent: Apr. 18, 2017

(54) MESH NETWORK COMMISSIONING

(71) Applicant: Google, Inc., Mountain View, CA (US)

(72) Inventors: Martin A. Turon, Berkeley, CA (US); Grant M. Erickson, Sunnyvale, CA (US); Christopher A. Boross, San Francisco, CA (US); Jay D. Logue, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/752,380

(22) Filed: Jun. 26, 2015

(65) Prior Publication Data

US 2015/0373753 A1    Dec. 24, 2015

Related U.S. Application Data

(63) Continuation of application No. 14/479,616, filed on Jun. 24, 2015.

(Continued)

(51) Int. Cl.
*H04L 5/20* (2006.01)
*H04L 12/24* (2006.01)
(Continued)

(52) U.S. Cl.
CPC ............. *H04L 41/12* (2013.01); *H04L 9/08* (2013.01); *H04L 9/0816* (2013.01); *H04L 29/08621* (2013.01); *H04L 63/166* (2013.01); *H04L 69/16* (2013.01); *H04W 4/008* (2013.01); *H04W 12/04* (2013.01); *H04W 12/06* (2013.01); *H04W 12/08* (2013.01); *H04W 12/10* (2013.01);
(Continued)

(58) Field of Classification Search
CPC ............................ H04W 8/005; H04W 48/16
USPC ................................................... 370/254, 200
See application file for complete search history.

(56) References Cited

U.S. PATENT DOCUMENTS 6,581,075 B1 *  6/2003  Guturu .............. G06F 17/30578
7,092,943 B2     8/2006  Roese et al.
(Continued)

OTHER PUBLICATIONS

"Non-Final Office Action", U.S. Appl. No. 14/752,292, Oct. 26, 2015, 10 pages.
(Continued)

*Primary Examiner* — Chi H Pham
*Assistant Examiner* — Abedeltif Ajid
(74) *Attorney, Agent, or Firm* — Wolfe-SBMC

(57) ABSTRACT

In embodiments of mesh network commissioning, a node device in a mesh network receives a commissioning dataset, and compares a timestamp in the received commissioning dataset with a stored timestamp in a commissioning dataset that is stored in the node. The node device can determine from the comparison that the stored timestamp is more recent than the received timestamp, and in response, transmit a message to a leader device of the mesh network, where the message includes the stored commissioning dataset. The leader device accepts the stored commissioning dataset as the most recent commissioning dataset for the mesh network, and propagates the stored commissioning dataset to the mesh network. Alternatively, the node device can determine that the received timestamp is more recent than the stored timestamp, and in response to the determination, update the stored commissioning dataset to match the received commissioning dataset.

20 Claims, 21 Drawing Sheets

Related U.S. Application Data

(60) Provisional application No. 62/016,450, filed on Jun. 24, 2014, provisional application No. 62/063,135, filed on Oct. 13, 2014, provisional application No. 62/115,601, filed on Feb. 12, 2015, provisional application No. 62/141,853, filed on Apr. 2, 2015.

(51) Int. Cl.

| | | |
|---|---|---|
| *H04L 9/08* | (2006.01) | |
| *H04W 12/10* | (2009.01) | |
| *H04W 72/04* | (2009.01) | |
| *H04W 12/06* | (2009.01) | |
| *H04W 76/02* | (2009.01) | |
| *H04W 12/04* | (2009.01) | |
| *H04W 12/08* | (2009.01) | |
| *H04L 29/08* | (2006.01) | |
| *H04L 29/06* | (2006.01) | |
| *H04W 40/32* | (2009.01) | |
| *H04W 4/00* | (2009.01) | |
| *H04W 84/18* | (2009.01) | |

(52) U.S. Cl.
CPC ......... *H04W 40/32* (2013.01); *H04W 72/048* (2013.01); *H04W 76/02* (2013.01); *H04W 84/18* (2013.01)

(56) References Cited

U.S. PATENT DOCUMENTS

| | | | |
|---|---|---|---|
| 7,295,556 B2 | 11/2007 | Roese et al. | |
| 7,302,704 B1* | 11/2007 | Elliott | H04L 45/02 380/2 |
| 7,464,378 B1* | 12/2008 | Limaye | G06F 9/5061 714/100 |
| 7,496,078 B2 | 2/2009 | Rahman | |
| 7,539,488 B2 | 5/2009 | Friedman | |
| 7,606,938 B2 | 10/2009 | Roese et al. | |
| 7,706,369 B2 | 4/2010 | Roese et al. | |
| 7,739,402 B2 | 6/2010 | Roese et al. | |
| 7,814,478 B2 | 10/2010 | Friedman | |
| 7,839,856 B2 | 11/2010 | Sinha et al. | |
| 7,894,378 B2 | 2/2011 | Lewis et al. | |
| 7,898,977 B2 | 3/2011 | Roese et al. | |
| 7,907,581 B2 | 3/2011 | Roh et al. | |
| 8,023,478 B2 | 9/2011 | Cam-Winget et al. | |
| 8,037,305 B2 | 10/2011 | Rahman | |
| 8,159,349 B2 | 4/2012 | McAllister et al. | |
| 8,171,292 B2 | 5/2012 | Brown et al. | |
| 8,270,382 B2 | 9/2012 | Cam-Winget et al. | |
| 8,634,342 B2 | 1/2014 | Rahman | |
| 8,660,121 B2 | 2/2014 | McCormack | |
| 8,729,833 B2 | 5/2014 | Chemel et al. | |
| 8,811,225 B2 | 8/2014 | McCormack et al. | |
| 8,843,241 B2 | 9/2014 | Saberi et al. | |
| 8,972,589 B2 | 3/2015 | Roese et al. | |
| 9,026,656 B2 | 5/2015 | Eruchimovitch et al. | |
| 9,363,733 B2 | 6/2016 | Turon et al. | |
| 9,413,613 B2 | 8/2016 | Turon et al. | |
| 2005/0083859 A1* | 4/2005 | Kang | H04L 29/12254 370/254 |
| 2007/0266143 A1 | 11/2007 | Zeng et al. | |
| 2008/0031283 A1* | 2/2008 | Curran-Gray | H04J 3/0667 370/503 |
| 2010/0037311 A1* | 2/2010 | He | H04L 63/0209 726/15 |
| 2010/0083303 A1 | 4/2010 | Redei et al. | |
| 2010/0123907 A1* | 5/2010 | Edgar | G06K 9/00483 358/1.5 |
| 2010/0205273 A1* | 8/2010 | Shim | G06F 11/1425 709/210 |
| 2011/0026513 A1* | 2/2011 | Tien | G06F 17/30575 370/350 |
| 2012/0170447 A1 | 7/2012 | Bell et al. | |
| 2012/0209808 A1* | 8/2012 | Tien | H04L 67/1095 707/622 |
| 2013/0191755 A1 | 7/2013 | Balog et al. | |
| 2014/0044016 A1 | 2/2014 | Rahman | |
| 2015/0010000 A1 | 1/2015 | Zhang et al. | |
| 2015/0123563 A1 | 5/2015 | Dahlen | |
| 2015/0373751 A1 | 12/2015 | Turon et al. | |
| 2015/0373752 A1 | 12/2015 | Turon et al. | |

OTHER PUBLICATIONS

"Non-Final Office Action", U.S. Appl. No. 14/752,327, Oct. 26, 2015, 10 pages.

"Final Office Action", U.S. Appl. No. 14/752,327, Feb. 16, 2016, 10 pages.

"Notice of Allowance", U.S. Appl. No. 14/752,292, Feb. 26, 2016, 4 pages.

"Notice of Allowance", U.S. Appl. No. 14/752,327, Jun. 1, 2016, 8 pages.

\* cited by examiner

MESH NETWORK COMMISSIONING

CROSS REFERENCE TO RELATED APPLICATIONS

This application claims priority to U.S. patent application Ser. No. 14/749,616 filed Jun. 24, 2015, the disclosure of which is incorporated by reference herein in its entirety. The application Ser. No. 14/749,616 claims priority under 35 U.S.C. §119(e) to U.S. Provisional Patent Application Ser. No. 62/016,450 filed Jun. 24, 2014, the disclosure of which is incorporated by reference herein in its entirety. The application Ser. No. 14/749,616 also claims priority to U.S. Provisional Patent Application Ser. No. 62/063,135 filed Oct. 13, 2014, the disclosure of which is incorporated by reference herein in its entirety. The application Ser. No. 14/749,616 also claims priority to U.S. Provisional Patent Application Ser. No. 62/115,601 filed Feb. 12, 2015, the disclosure of which is incorporated by reference herein in its entirety. The application Ser. No. 14/749,616 also claims priority to U.S. Provisional Patent Application Ser. No. 62/141,853 filed Apr. 2, 2015, the disclosure of which is incorporated by reference herein in its entirety.

BACKGROUND

Using wireless mesh networking to connect devices to each other, and to cloud-based services, is increasingly popular for sensing environmental conditions, controlling equipment, and providing information and alerts to users. However many devices on mesh networks are designed to operate for extended periods of time on battery-power, which limits the available computing, user interface, and radio resources in the devices. Additionally, to ensure the security of mesh networks, the identity of devices joining and operating on a mesh network is authenticated, and communication within the mesh network is encrypted, based on credentials that are commissioned into the devices. However, with the increasing ubiquity and scale of mesh networks, commissioning techniques limit the quality of user experience for commissioning, the accuracy of joining a device to the correct mesh network, securely injecting credentials into the devices, and provisioning device-specific and application-specific information into a device during commissioning.

SUMMARY

This summary is provided to introduce simplified concepts of mesh network commissioning. The simplified concepts are further described below in the Detailed Description. This summary is not intended to identify essential features of the claimed subject matter, nor is it intended for use in determining the scope of the claimed subject matter.

Mesh network commissioning, generally related to joining nodes in a mesh network, is described. In embodiments, a joiner router can receive a beacon request from a joining device, and then transmit a beacon from the joiner router to the joining device, where the beacon provides an indication that a mesh network is available for joining. The transmitted beacon is also enables the joining device to establish a local link between the joining device and the joiner router. The joiner router receives a message from the joining device requesting to join the mesh network. The message received from the joining device can include a device identifier that is usable to authenticate the joining device, which is authenticated using Password Authenticated Key Exchange by Juggling (J-PAKE) or any other suitable cipher suite, and the authentication is effective to establish a secure communication session between a commissioning device and the joining device. The joiner router forwards the received message to the commissioning device of the mesh network, which can include forwarding the received message through one or more routers of the mesh network in a communication path between the joiner router and the commissioning device. In implementations, one of the routers may be a border router that connects the mesh network to an external network, and the commissioning device is attached to the external network. The joiner router then receives an authorization for the joining device to join the mesh network from the commissioning device, and the joiner router transmits network information to the joining device, where the network information enables the joining device to join the mesh network.

Mesh network commissioning, generally related to joining nodes in a mesh network, is described. In embodiments, a joiner router can receive a beacon request from a joining device, and then transmit a beacon from the joiner router to the joining device, where the beacon provides an indication that a mesh network is available for joining. The transmitted beacon also enables the joining device to establish a local link between the joining device and the joiner router. The joiner router relays a DTLS-ClientHello message, from a joining device requesting to join a mesh network, in a DTLS Relay Receive Notification message, which is transmitted to a commissioning device of the mesh network. The joiner router receives a DTLS Relay Transmit Notification message from the commissioning device, and transmits content of the DTLS Relay Transmit Notification message to the joining device, where the content enables the joining device to join the mesh network and is effective to establish a secure communication session between the commissioning device and the joining device. The joiner router receives an indication from the commissioning device that the joining device is to be entrusted to receive network credentials for the mesh network, and receives a Key Encryption Key (KEK) that is shared between the commissioning device and the joining device. The joiner router then transmits the network credentials, and other essential network parameters, from the joiner router to the joining device using the KEK to encrypt and authenticate a message at a Media Access Control (MAC) layer, to securely communicate the network credentials. The secure communication session is usable to perform provisioning of the joining device.

Mesh network commissioning, generally related to establishing a commissioning session, is described. In embodiments, a border router receives a petition from a commissioning device to become the commissioner for joining devices to the mesh network. The border router advertises availability of the mesh network for commissioning devices. In response to receiving the advertisement, the commissioner sends the petition in response to the commissioning device receiving the advertising. The border router can transmit the received petition to a leader device of the mesh network, and receive a response to the petition from the leader device, where the response indicates acceptance or rejection of the petition. The border router transmits an indication of the acceptance or the rejection of the petition to the commissioning device. An acceptance of the petition by the leader device authorizes the commissioning device to be the commissioner for the mesh network and a secure commissioning session is established. The acceptance of the petition also enables the leader device to update an internal state that tracks an active commissioner for the mesh network, enable joining across the mesh network, communicate a set of devices that are allowed to join the mesh network, and propagate a commissioning dataset within the mesh network.

In other aspects of mesh network commissioning, the border router can also register an identity of the commissioning device to establish a secure commissioning communication session, including providing a hardened (e.g., cryptographically hashed) commissioning credential to the border router, wherein the hardened commissioning credential was derived from a commissioning credential passphrase that was input to the commissioning device by a user. The border router includes a copy of the encrypted commissioning credential usable to authenticate the commissioning device to the mesh network, where the copy of the encrypted commissioning credential was previously derived from the commissioning credential. The commissioning credential was injected into the leader device of the mesh network that derived the copy of the encrypted commissioning credential, and the leader device communicated the copy of the encrypted commissioning credential securely to the border router.

Mesh network commissioning, generally related to establishing a commissioning session, is described. In embodiments, a leader device of a mesh network receives a petition to accept a commissioning device as a commissioner to commission joining devices to join the mesh network. The leader device can determine whether to accept or reject the received petition, and transmit a response to the commissioning device with an indication of whether the received petition is accepted or rejected. The determination as to whether to accept or reject the received petition from the commissioning device may include ensuring that there is a single active commissioner for the mesh network. In response to a determination of the received petition being accepted, the leader device can update an internal state that tracks an active commissioner for the mesh network.

In other aspects of mesh network commissioning, the leader device can receive a command from the commissioning device to initiate a joining mode for the mesh network, and propagate a commissioning dataset within the mesh network. The hardened commissioning credential can be derived from a commissioning credential that was injected into the leader device during commissioning of the leader device. The leader device can send a copy of the encrypted commissioning credential to the border router, enabling the border router to authenticate the commissioning device to the mesh network.

Mesh network commissioning, generally related to managing multiple commissioning sessions, is described. In embodiments, a commissioning device establishes a secure commissioning communication session between the commissioning device and a border router of a mesh network to securely establish network communication sessions for joining one or more joining devices to the mesh network. The secure commissioning communication session is used by the commissioning device to send a petition to a leader device of the mesh network to request acceptance of the commissioning device as an active commissioner for the mesh network, and receiving an indication of an acceptance of the petition from the leader device. The commissioning device can activate joining for the mesh network, and receive a request from a joining device to join the mesh network. To activate joining for the mesh network, the commissioning device can initiate a joining mode that causes the routers in the mesh network to advertise that the mesh network is accepting joining requests.

In other aspects of mesh network commissioning, the commissioning device can also send a management message to a leader device to make the mesh network joinable, where the management message enables the leader device to update network data for the mesh network. The management message can include steering data that indicates joining devices that are allowed to join to the mesh network. The network data is then propagated to the router devices in the mesh network, where the network data includes an indication that the mesh network is available for joining. The joining device establishes a secure joiner communication session with the commissioning device. The commissioning device authenticates the joining device using a Pre-Shared Key for the Device (PSKd) for the joining device, and joins the joining device to the mesh network. The secure joiner communication session can be established by the commissioning device determining that the encrypted device identifier received from the joining device matches an encrypted device identifier derived by the commissioning device from a copy of the device identifier that is received as an input to the commissioning device from a user, and using the encrypted device identifier as a shared secret to secure the joiner communication session.

A request from a joining device to join the mesh network can be received via a joiner router, and the commissioning device transmits, to the joiner router, an indication that the joining device is to be entrusted to receive network credentials for the mesh network and a Key Encryption Key (KEK), which is shared between the commissioning device and the joining device. The transmission to the joining device via the joiner router is effective to enable the joiner router to use the received KEK to securely transmit the network credentials to the joining device to commission the joining device to the mesh network. The request that is received from the joining device can include an encrypted device identifier of the joining device, where the encrypted device identifier is derived from a device identifier of the joining device using Password Authentication Key Exchange by Juggling (J-PAKE).

Mesh network commissioning, generally related to provisioning a joining device, is described. In embodiments, a commissioning device can establish a commissioning communication session between the commissioning device and a border router of a mesh network, and also establish a joiner communication session between the joining device and the commissioning device. The commissioning device can then send commissioning information to the joining device, where the commissioning information is usable by the joining device to join the mesh network. The commissioning device receives an indication of a location of a commissioner application from the joining device, utilizes the received indication to retrieve the commissioner application, and executes the commissioner application to provision the joining device.

Mesh network commissioning, generally related to hunting and steering, is described. In embodiments, a commissioning device of a mesh network can determine steering data for the mesh network, where the steering data is an indication of a device identifier associated with a device that is allowed to join the mesh network. The commissioning device can then propagate the steering data from the commissioning device for the mesh network to one or more routers in the mesh network, and the steering data indicates that a commissioner is active on the mesh network. The commissioning device propagating the steering data enables the one or more routers to transmit the steering data in a beacon message, and the steering data is effective to enable the device associated with the device identifier to identify that the device is allowed to join the mesh network. In implementations, the steering data is a 16-bit Cyclic Redundancy Check (CRC16) of the device identifier, which is an IEEE 64-bit Extended Unique Identifier (EUI-64). The commissioning device can determine the steering data for the mesh network by determining the steering data for additional device identifiers associated with additional devices that are allowed to join the mesh network. The commissioning device propagating the steering data is effective to enable the device to distinguish the mesh network from other networks, where the other networks are IEEE 802.15.4 networks.

Mesh network commissioning, generally related to hunting and steering, is described. In embodiments, a commissioning device of a mesh network can determine steering data for the mesh network, where the steering data includes an indication of a device identifier associated with a device that is allowed to join the mesh network, and the indication is represented as a set of values in a Bloom filter that represent the device identifier. The commissioning device can then propagate the steering data from the commissioning device for the mesh network to one or more routers in the mesh network. Propagating the steering data enables the routers to transmit the steering data in a beacon message, where the steering data enables the device associated with the device identifier to compare the set of values in the Bloom filter to a second set of values determined at the device to identify that the device is allowed to join the mesh network.

In other aspects of mesh network commissioning, the commissioning device determines the steering data by applying a first hash function to the device identifier to produce a first hash value, and applying a second hash function to the device identifier to produce a second hash value. The device identifier can be an IEEE 64-bit Extended Unique Identifier (EUI-64), where the device identifier is the least significant twenty-four bits of the EUI-64. In implementations, the first and second hash functions are Cyclic Redundancy Checks (CRC), with the first hash function being a CRC16-CCITT, and the second hash function being a CRC16-ANSI. The commissioning device then performs a modulo operation on the first hash value to determine a first bit field location in the Bloom filter, and performs the modulo operation on the second hash value to determine a second bit field location in the Bloom filter. A divisor for the modulo operation can be the length of a bit array of the Bloom filter. The commissioning device can set a value in the first bit field location of the Bloom filter to one, and set the value in the second bit field location of the Bloom filter to one. The commissioning device can set all of the bit field values in the steering data to a value of one to indicate that the mesh network is joinable for any device. Alternatively, the commissioning device can set the bit field values of the steering data to a value of zero, which disables joining for the mesh network.

Mesh network commissioning, generally related to partitioning nodes in a mesh network, is described. In embodiments, a node device in a mesh network receives a commissioning dataset, and compares a timestamp in the received commissioning dataset with a stored timestamp in a commissioning dataset that is stored in the node. The node device can determine from the comparison that the stored timestamp is more recent than the received timestamp, and in response, transmit a message to a leader device of the mesh network, where the message includes the stored commissioning dataset. The leader device accepts the stored commissioning dataset as the most recent commissioning dataset for the mesh network, and propagates the stored commissioning dataset to the mesh network. Alternatively, the node device can determine that the received timestamp is more recent than the stored timestamp, and in response to the determination, update the stored commissioning dataset to match the received commissioning dataset.

In other aspects of mesh network commissioning, the received commissioning dataset includes the received timestamp, a commissioning credential, a network name of the mesh network, and a security policy that indicates which security-related operations are allowed in the mesh network. The received timestamp includes a time value, and an indication that the time value is traceable to Coordinated Universal Time (UTC). In implementations, the node device and the leader device were previously commissioned to the mesh network, and the previous commissioning stored identical commissioning datasets in the node device and the leader device. The stored commissioning dataset in the node device can be updated after a split of the mesh network that stops communication between the node device and the leader device over the mesh network. The split separates the mesh network and a first partition of the mesh network includes the leader device, and a second partition of the mesh network includes the node device. The node device can receive the commissioning dataset after a merge of the first partition and the second partition of the mesh network, where the merge reestablishes a communication path between the node device and the leader device over the mesh network.

BRIEF DESCRIPTION OF THE DRAWINGS

Embodiments of mesh network commissioning are described with reference to the following drawings. The same numbers are used throughout the drawings to reference like features and components.

DETAILED DESCRIPTION

Figure 1:
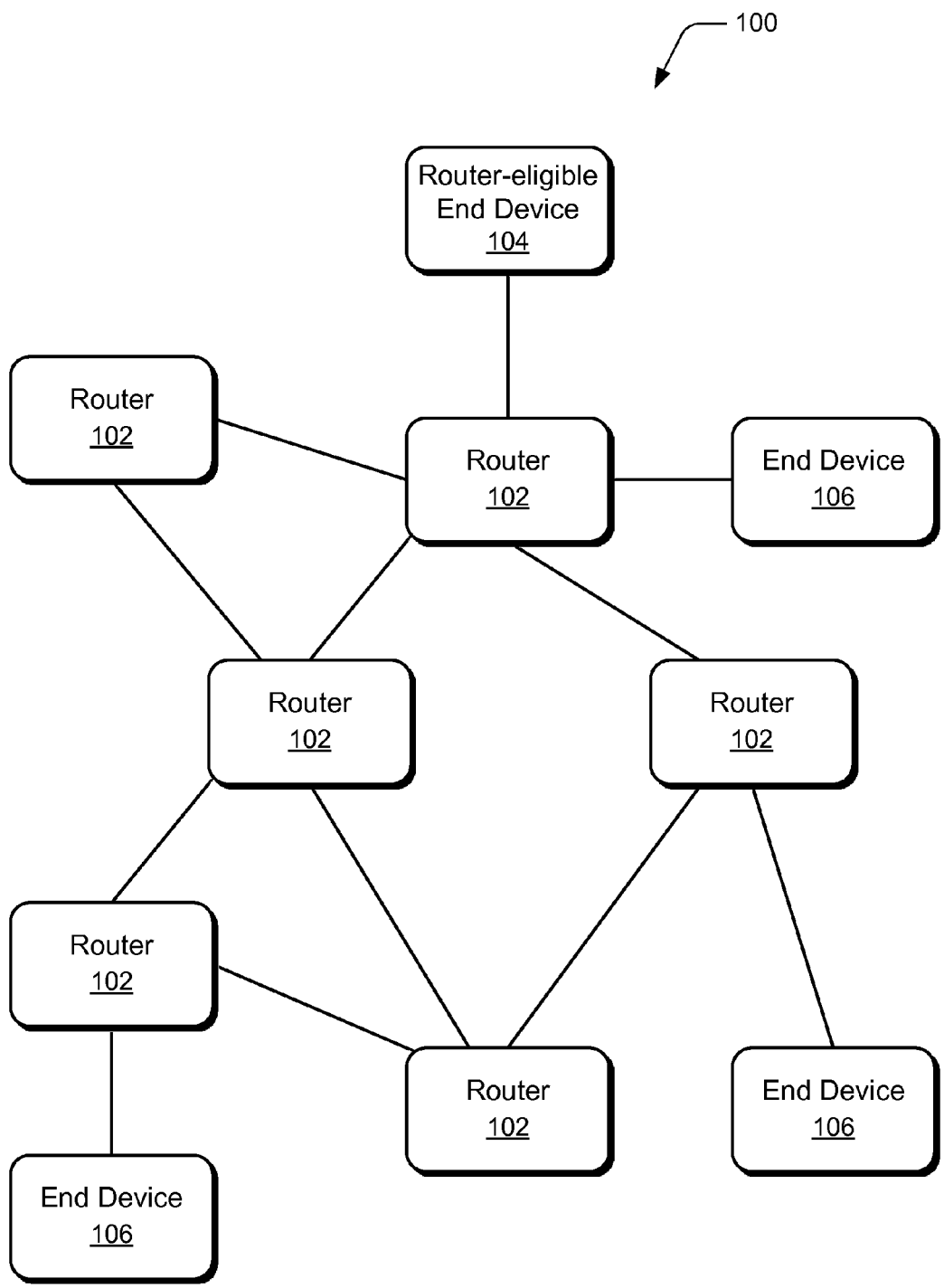
FIG. 1 illustrates an example mesh network system in which various embodiments of mesh network commissioning can be implemented.

Wireless mesh networks are communication networks having wireless nodes connected in a mesh topology that provides reliable and redundant communication paths for traffic within a mesh network. Wireless mesh networks use multiple radio links, or hops, to forward traffic between devices within the mesh network. This provides coverage for areas larger than the area covered by a single radio link.

Wireless mesh networks can be based on proprietary technologies, or standards-based technologies. For example, wireless mesh networks may be based on the IEEE 802.15.4 standard, which defines physical (PHY) layer and Media Access Control (MAC) layer features and services for use by applications at higher layers of a mesh networking stack. Upper-layer applications use these standards-defined services to implement application-level secure communication (e.g., encryption and authentication) across a mesh network.

While standards-based technologies for mesh networks provide services for secure communication, these technologies do not provide a complete solution for secure commissioning of mesh networks. Standards-based solutions may assume that devices are commissioned out-of-band of a secure mesh network, and are left to be designed by an application developer. For example, out-of-band commissioning solutions include injecting network credentials over a wired connection before the joining device attempts to make a radio-based connection to the mesh network. Alternatively, network credentials are transmitted over an unsecure radio link when the mesh network forms.

Securely commissioning a joining device over the mesh network eliminates the need for specialized commissioning tools, additional interfaces on the joining device for credential injection, and the risk of transmitting credentials over an unsecured communication link. Various embodiments provide mesh network commissioning techniques to improve the commissioning of devices joining a mesh network.

Authentication techniques, used in networks connected to the Internet, can rely on using certificates issued by a certificate authority. A certificate can be validated to authenticate the identity of another device on the network. Unlike devices on the Internet, devices in a mesh network may not have access to Internet-connected, certificate-based authentication in order to authenticate devices for commissioning. Mesh network commissioning techniques are described that provide secure authentication of the commissioning devices and the joining devices to the mesh network without the need for an external certificate authority.

Standards for mesh networks provide services for securing communications within mesh networks, such as defining a network key (network master key) and a MAC-layer encryption technique for communication between devices in the mesh network. However, the insertion of credentials, such as the network key, into a device joining the mesh network is beyond the scope of standards-defined PHY and MAC services. Often, out-of-band techniques, for initially loading the credentials into the joining device, are used before the joining device attempts to connect to the mesh network. Mesh network commissioning techniques are described that securely communicate network credentials to the joining device during commissioning over the mesh network.

Many devices designed for mesh networks have limited, or no, user interface capability. Limited user interfaces on mesh network devices makes entering information, such as passphrases, device identifiers, and/or device addresses, for the joining devices cumbersome and error-prone for users. Mesh network commissioning techniques are described that increase user efficiency and data entry accuracy during commissioning of the joining devices to the mesh network.

As systems that use mesh networking become increasingly ubiquitous, many joining devices may need to be added during commissioning of the mesh network. The limited resources and user interfaces of many mesh network devices results in lengthy and costly commissioning, especially when large numbers of joining devices need to be commissioned or recommissioned. Mesh network commissioning techniques are described that increase the scalability of commissioning the joining devices to the mesh network.

Wireless mesh networks may use licensed or unlicensed (also known as license-exempt or license-free) radio spectrum. Standards, such as IEEE 802.15.4, define usage of the unlicensed radio spectrum, such as channel frequencies, channel bandwidths, data rates, modulation, access techniques, and the like, which enable multiple mesh networks to operate within a band of the unlicensed spectrum. Mesh network commissioning techniques are described that securely join the joining device to the correct mesh network in an environment where multiple mesh networks share the same radio spectrum and/or underlying industry-standard networking protocols.

In addition to insertion of the network credentials into the joining device during commissioning, additional provisioning may be required for the joining device, in order to update or configure the joining device for use in the mesh network. This provisioning may require secure communication of information, such as linking the joining device to a user account of a cloud service, and so forth. Mesh network commissioning techniques are described for securely provisioning the joining device during commissioning.

While features and concepts of the described systems and methods for mesh network commissioning can be implemented in any number of different environments, systems, devices, and/or various configurations, embodiments of mesh network commissioning are described in the context of the following example devices, systems, and configurations.

FIG. 1 illustrates an example mesh network system 100 in which various embodiments of mesh network commissioning can be implemented. The mesh network 100 is a wireless mesh network that includes routers 102, a router-eligible end device 104, and end devices 106. The routers 102, the router-eligible end device 104, and the end devices 106, each include a mesh network interface for communication over the mesh network. The routers 102 receive and transmit packet data over the mesh network interface. The routers 102 also route traffic across the mesh network 100. The routers 102 and the router-eligible end devices 104 can assume various roles, and combinations of roles, for commissioning within the mesh network 100, as discussed below.

The router-eligible end devices 104 are located at leaf nodes of the mesh network topology and are not actively routing traffic to other nodes in the mesh network 100. The router-eligible device 104 is capable of becoming a router 102 when the router-eligible device 104 is connected to additional devices. The end devices 106 are devices that can communicate using the mesh network 100, but lack the capability, beyond simply forwarding to its parent router 102, to route traffic in the mesh network 100. For example, a battery-powered sensor is one type of end device 106.

The routers 102, the router-eligible end device 104, and the end devices 106 include network credentials that are used to authenticate the identity of these devices as being a member of the mesh network 100. The routers 102, the router-eligible end device 104, and the end devices 106 also use the network credentials to encrypt communications in the mesh network.

Figure 2:
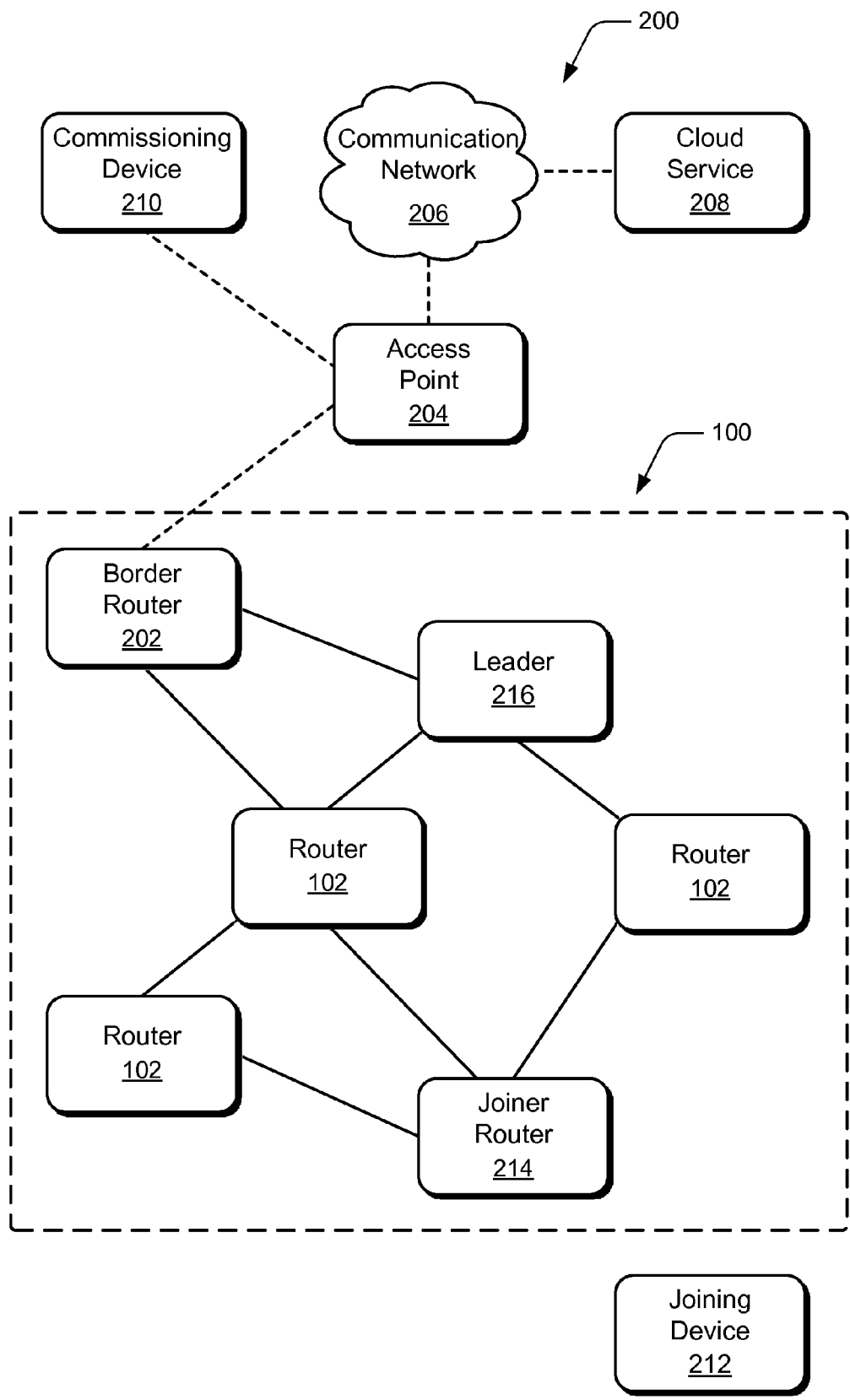
FIG. 2 illustrates an example environment in which various embodiments of mesh network commissioning can be implemented.

FIG. 2 illustrates an example environment 200 in which various embodiments of mesh networking commissioning techniques can be implemented. The environment 200 includes the mesh network 100, in which some routers 102 are performing specific roles in the mesh network 100. The devices within the mesh network 100, as illustrated by the dashed line, are communicating securely over the mesh network 100, using the network credentials. Devices shown outside the mesh network 100 do not have a copy of the network credentials for the mesh network 100 and cannot use mesh network layer security to securely communicate.

A border router 202 (also known as a gateway and/or an edge router) is one of the routers 102. The border router 202 includes a second interface for communication with an external network, outside the mesh network 100. The border router 202 connects to an access point 204 over the external network. For example, the access point 204 may be an Ethernet router, a Wi-Fi access point, or any other suitable device for bridging different types of networks. The access point 204 connects to a communication network 206, such as the Internet. A cloud service 208, which is connected via the communication network 206, provides services related to and/or using the devices within the mesh network 100. By way of example, and not limitation, the cloud service 208 provides applications that include connecting end user devices, such as smart phones, tablets, and the like, to devices in the mesh network 100, processing and presenting data acquired in the mesh network 100 to end users, linking devices in one or more mesh networks 100 to user accounts of the cloud service 208, provisioning and updating devices in the mesh network 100, and so forth.

A user choosing to commission a new device to join the mesh network 100 can use a commissioning device 210, which connects to the border router 202 via the external network technology of the access point 204, to commission the new device. The commissioning device 210 may be any computing device, such as a smart phone, tablet, notebook computer, and so forth, with a suitable user interface and communication capabilities to operate in the role of a commissioner to join devices to the mesh network 100. To become the commissioner for the mesh network 100, the commissioning device 210 petitions to become the commissioner, as described in detail below.

A joining device 212 is any router-eligible end device 104 or end device 106 that the user chooses to join to the mesh network 100. Before commissioning, the joining device 212 has not received the network credentials for the mesh network 100 and cannot be authenticated to, or securely communicate over, the mesh network 100. During commissioning, the joining device 212 performs the role of a joiner (or joining device), as described in detail below.

One of the routers 102 performs the role of a joiner router 214 during commissioning of the joining device 212 to join the mesh network 100. The role of the joiner router 214 can be performed by any router 102 that is within one radio link of the joining device 212. The joiner router 214 provides a local-only radio link to the joining device 212 for a joiner session, as described in detail below.

One of the routers 102 performs the role of a leader 216 for the mesh network 100. The leader 216 manages router identifier assignment and the leader 216 is the central arbiter of network configuration information for the mesh network 100. The leader 216 also controls which commissioning device 210 is accepted as a sole, active commissioner for the mesh network 100, at any given time.

The environment 200, as shown in FIG. 2, shows devices performing only a single role of the various roles described above. FIGS. 3A-3D as shown and described below illustrate, by way of example, and not limitation, other distributions of commissioning roles for mesh network commissioning techniques.

Figure 3A:
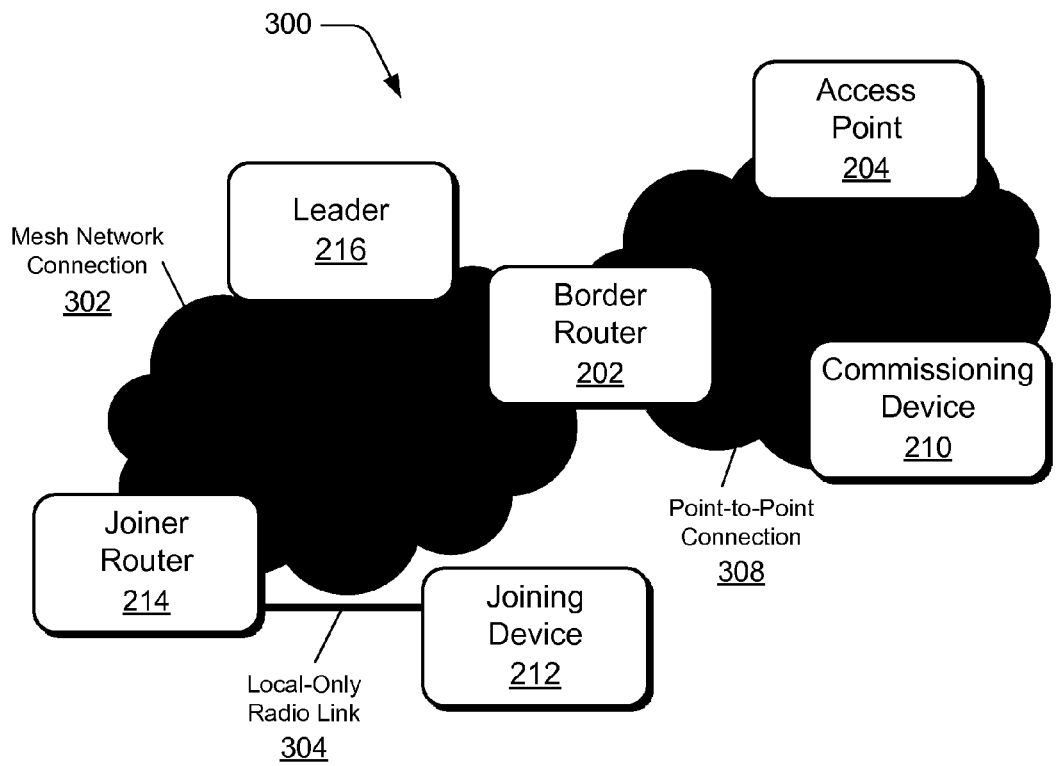
FIGS. 3A-3D illustrate simplified versions of the example mesh network environment, with devices implemented in accordance with embodiments of mesh network commissioning.

FIG. 3A illustrates a simplified version 300 of the example environment 200, with only those devices having commissioning-specific roles shown for the sake of clarity. In this example, each device in FIG. 3A is performing a single commissioning role in embodiments of mesh network commissioning. FIG. 3A also illustrates communication links used during the commissioning process. Secure mesh communication links 302 are used between devices that have been joined to the mesh network 100. A local-only radio link 304, which is unsecured, is established to connect the joining device 212 to the joiner router 214 for commissioning the joining device 212 to the mesh network 100. An external network 306 has communication links as shown, such as a point-to-point link 308 between the border router 202 and the commissioning device 210 over the external network.

Figure 3B:
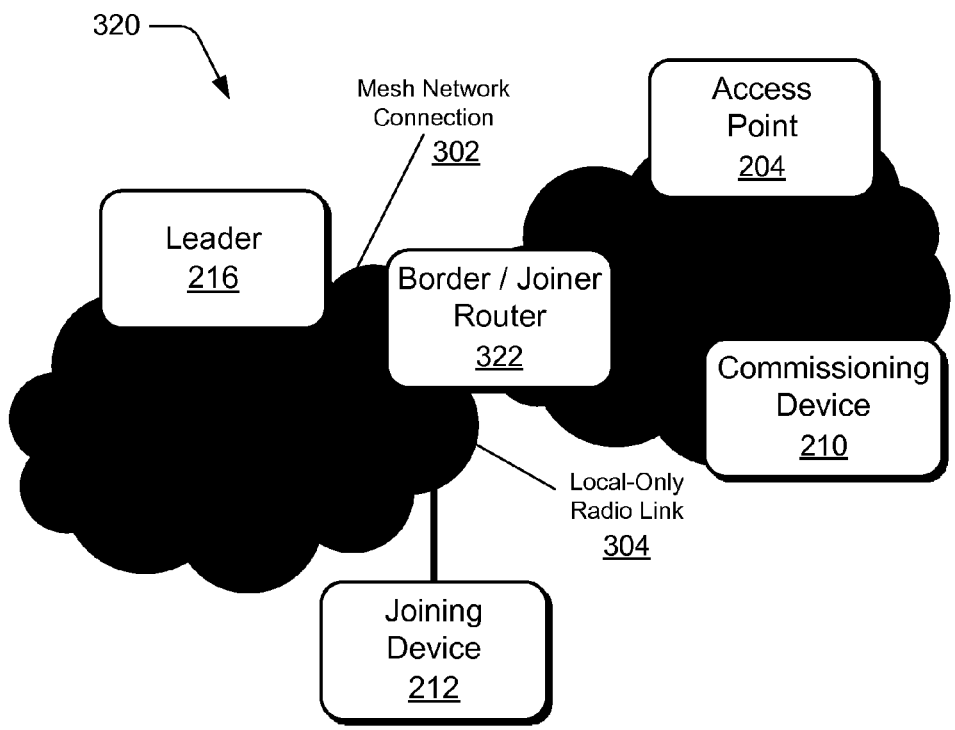
Figure 3C:
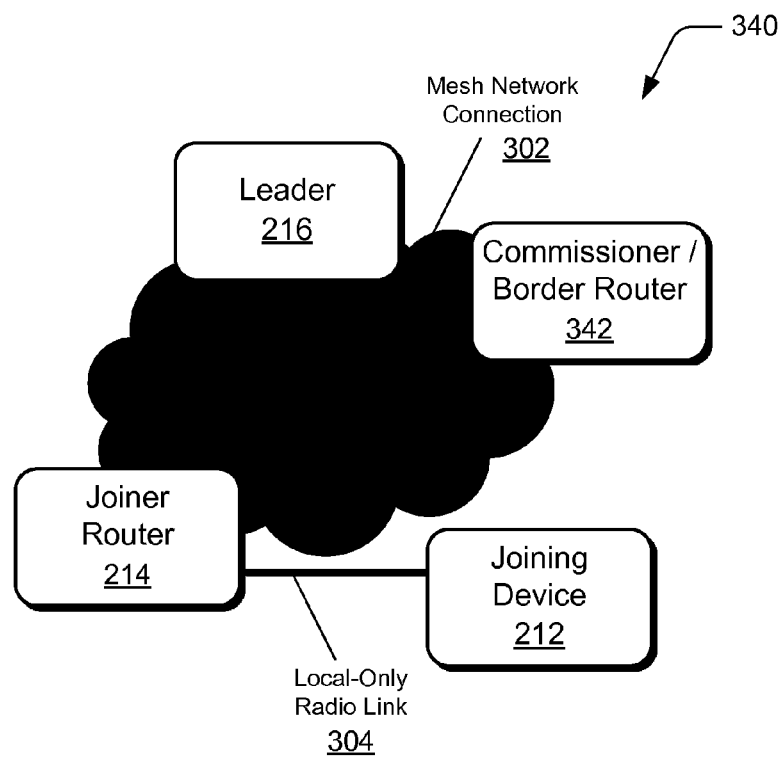

FIG. 3B also illustrates a simplified version 320 of the example environment 200, and shows a border/joiner router 322, which is the border router 202 additionally performing the role of the joiner router 214. FIG. 3C also illustrates a simplified version 340 of the example environment 200, and shows a commissioner/border router 342, which is the border router 202 additionally performing the role of the commissioning device 210. In this example, the commissioner/border router 342 includes the mesh network interface. The commissioner/border router 342 may also be referred to as an on-mesh commissioner, being that the commissioner/border router 342 is connected to the mesh network 100.

Figure 3D:
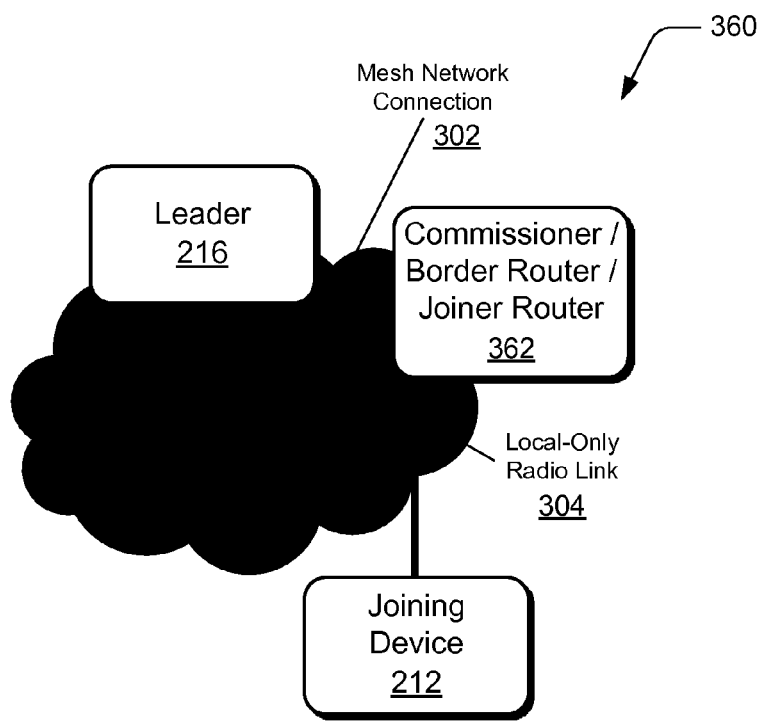

FIG. 3D also illustrates a simplified version 360 of the example environment 200, and shows a commissioner/border router/joiner router 362, which is the border router 202 additionally performing the role of the joiner router 214 and the commissioning device 210. FIGS. 3A-3D illustrate a sample of the possible combinations of mesh network commissioning roles, where any router-eligible end device 104 device can perform multiple roles (except for the role of the joining device 212).

Figure 4:
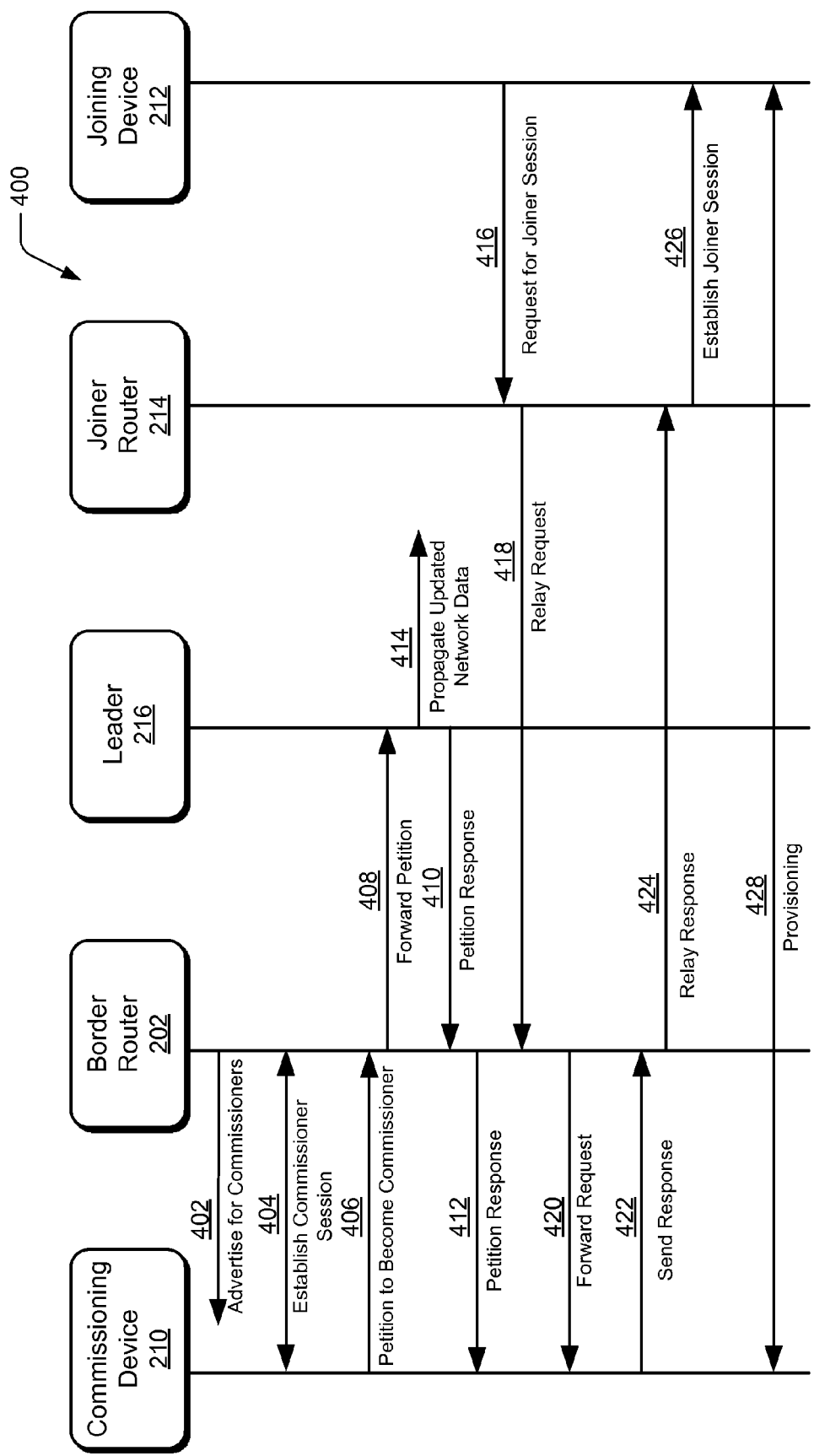
FIG. 4 illustrates an example of data transactions between devices in a mesh network environment in accordance with embodiments of mesh network commissioning.

FIG. 4 illustrates the commissioning process 400 by showing the transactions between the devices in the mesh network 100 that are performing the various mesh network commissioning roles. The commissioning process 400 begins when the commissioning device 210, for example a mobile phone, discovers the mesh network 100 is available for commissioners from an advertisement 402 from the border router 202. The commissioning device 210 then establishes a secure socket connection with the border router 202 using a Pre-Shared Key for the Commissioner (PSKc). This secure connection establishes a commissioning session 404. There can be only one active commissioner at a time, so the commissioning device 210 petitions the leader 216 to become the active commissioning device 210 for the mesh network 100, by sending a petition 406 to the border router 202, which in turn is forwarded as petition 408 by the border router 202 to the leader 216.

If the leader 216 accepts the commissioning device 210 as the active commissioner, the leader sends a petition response 410 to the border router 202, which in turn forwards the petition response 412 to the commissioning device. The leader 216 also indicates to devices on the mesh network 100 that the there is an active commissioner by propagating updated network data 414 over the mesh network 100.

Once active as the commissioner, the commissioning device 210 enables joining for the mesh network 100. Optionally, the commissioning device 210 provides steering data that indicates device identifiers of the joining devices 212 expected to join the mesh network 100. The commissioning device 210 may also query and set network parameters, such as a network name and a security configuration.

The joining device 212 sends a request 416 to establish a joiner session to the joiner router 214, which then relays the request 418 from the joining device 212 to the border router 202. It should be noted that the relay request 418 may be forwarded by any number of routers 102 in the mesh network, between the joiner router 214 and the border router 202. The border router 202 forwards the request 420 to establish the joiner session to the commissioning device 210. The commissioning device 210 sends a response 422 to the request for the joiner session to the border router 202, which in turn relays the response 424 to the joiner router 214. The joiner router 214 finishes the establishment of the joiner session at 426. The establishment of the joiner session in FIG. 4 is shown in a simplified manner for the sake of clarity; additional relayed DTLS messages may be exchanged as a part of the DTLS handshake to establish the joiner session.

As shown at 416 through 426, the joining device 212 and the commissioning device 210 perform a handshake, using Datagram Transport Layer Security (DTLS) or Transport Layer Security (TLS) using a Pre-Shared Key for the Device (PSKd) for the joining device 212. The handshake is performed over the relay thorough the mesh network 100, as described in detail below. The commissioning device 210 derives the PSKd from a joining device credential received out-of-band of the mesh network 100, typically entered through a user interface of the commissioning device 210, such as by scanning a QR code or bar code. Once the handshake is complete, a shared secret, produced from the PSKd, is used to establish the joiner session and pass the network credentials for the mesh network 100 from the joiner router 214 to the joining device 212. Optionally, in addition to passing the network credential for the mesh network 100, the commissioner session and the joiner session may be used to provision the joiner, as shown at 428.

Figure 5:
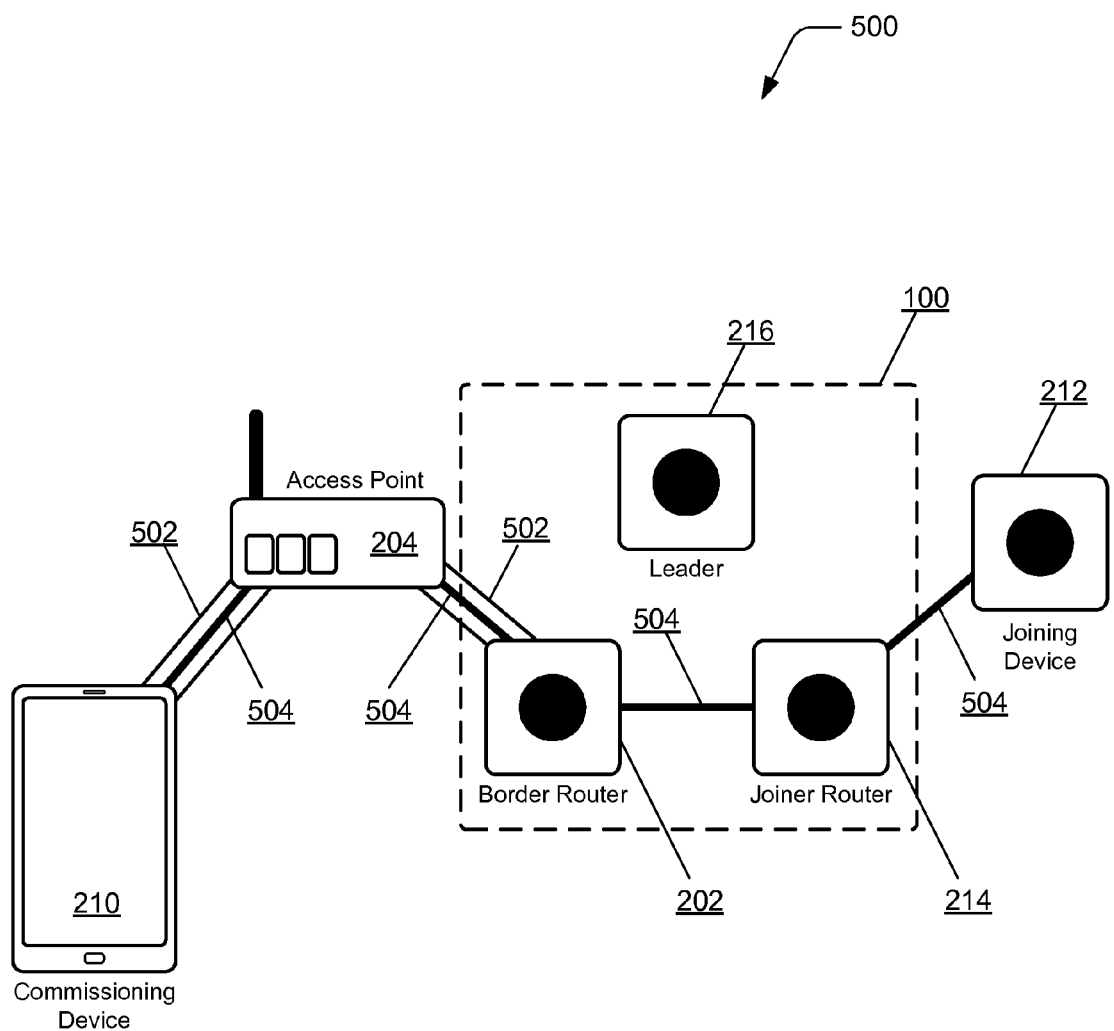
FIG. 5 illustrates an example of a commissioning environment with an established commissioner session and an established joiner session in accordance with embodiments of mesh network commissioning.

FIG. 5 illustrates a commissioning environment 500 with the established commissioner session and the established joiner session. The commissioner session 502 is a secure communication tunnel from the commissioning device 210 to the border router 202. The joiner session 504 is a secure communication tunnel from the commissioning device 210 to the joining device 212. Other mesh communication links and external network communication links are omitted for the sake of clarity.

First Device Pairing

In order to join devices to the mesh network 100, a first device is commissioned to establish a commissioning credential for commissioning devices to join the mesh network 100, and network credentials for secure operation of the mesh network 100. The commissioning device 210 connects to the first device, which can be any router-eligible end device 104. The first device is commissioned out-of-band of the mesh network 100. Any suitable connection may be used, such as USB, ad hoc Wi-Fi, Bluetooth, point-to-point IEEE 802.15.4, and the like, to connect the first device to the commissioning device 210.

Once the commissioning device 210 connects to the first device, the commissioning device programs the PSKc and the network name for the mesh network 100 into the first device. The PSKc is used to authenticate commissioning devices 210 to the mesh network 100 and establish the commissioning session, as described above and below. The network name is in human-readable form, similar to a Service Set Identifier (SSID) in Wi-Fi networks. Once the first device is commissioned, the first device becomes the leader 216 of the mesh network 100. The first device forms the mesh network 100, including determining a unique Personal Area Network Identifier (PAN ID) and a unique Extended PAN ID (XPANID) for the mesh network 100 and the network key for the mesh network 100.

The PSKc is derived from the commissioning credential, which is a human-scale passphrase, entered into the commissioning device 210, by the user administering the mesh network 100. The commissioning credential is hardened (e.g., by cryptographically hashing multiple times) to derive the PSKc, which is stored by the leader 216 and the commissioning device 210. Any suitable cryptographic hash technique may be used to derive the PSKc.

To improve the security of the PSKc, cryptographic techniques may be applied to increase the entropy of the commissioning credential in the derived PSKc, relative to the equivalent human-scaled commissioning credential passphrase entered by the user. By using key stretching, the derived key can be safely stored on embedded nodes which may be physically compromised, and the user's passphrase won't be compromised. This is helpful because users often reuse passphrases for multiple websites and accounts. For example, any suitable cryptographic technique, such as applying a cryptographic hash multiple times, is be used to stretch the key. For example, Password-Based Key Derivation Function 2 (PBKDF2) can be used to apply Advanced Encryption Standard-Cipher-based Message Authentication Code-Pseudo-Random Function-128 (AES-CMAC-PRF-128). For example, the PSKc may be derived as shown in equation 1:

$$PSKc=PBKDF2(PRF,P,S,c,dkLen) \qquad (1)$$

where, PRF is a type Pseudo-Random Function to use by the PBKDF2, P is the commissioning credential, S is a salt for the cryptographic function (e.g., a string such as a network type concatenated with the network name), c is a number of iterations of the PRF, and dkLen is the desired length of the derived key (PSKc).

Establishing the Commissioning Session

Figure 6:
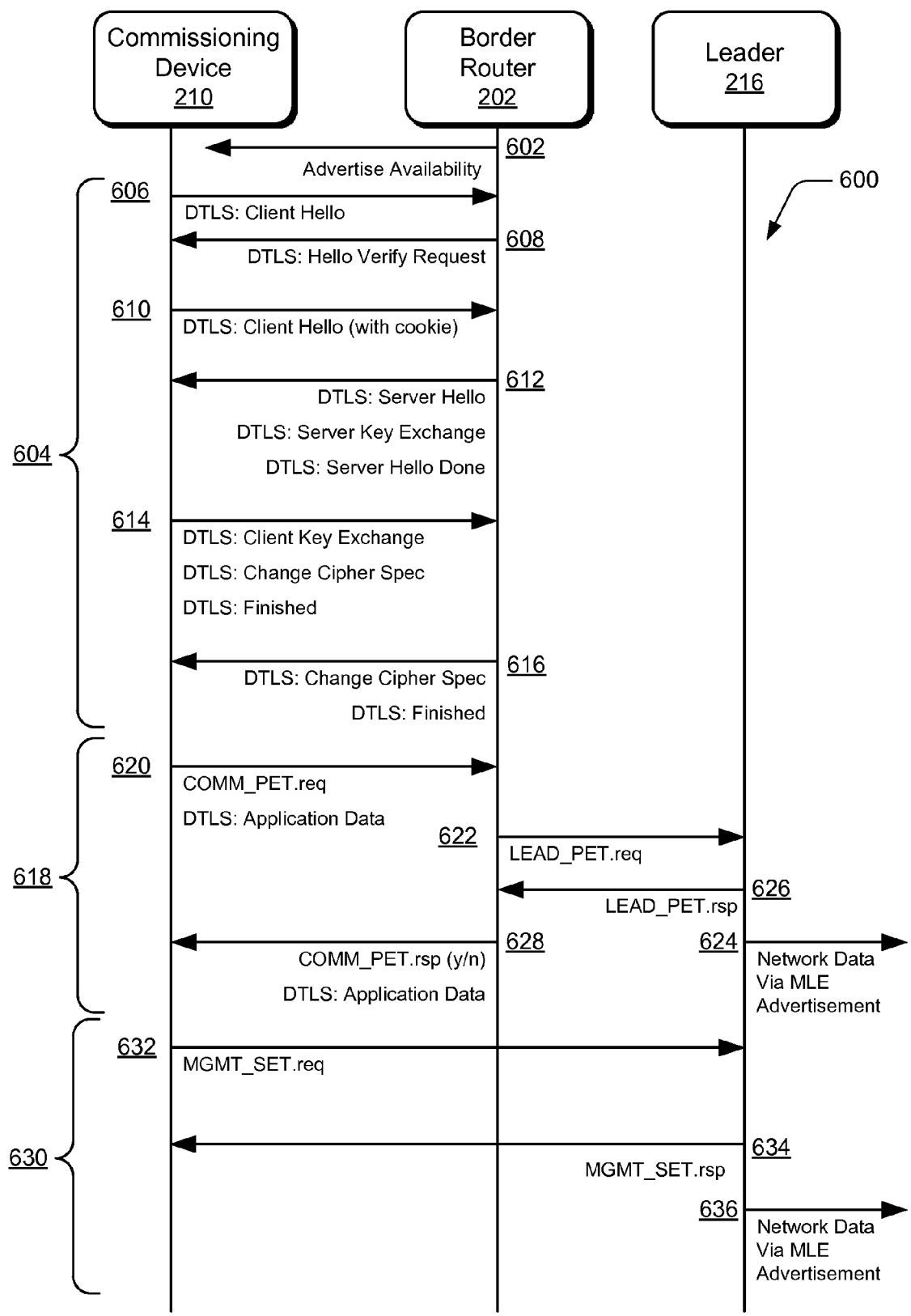
FIG. 6 illustrates an example of data transactions between devices in a mesh network environment to establish a commissioner session in accordance with embodiments of mesh network commissioning.

FIG. 6 illustrates the process 600 of establishing the commissioner session by showing the transactions between the commissioning device 210, the border router 202, and the leader 216. The mesh network 100 may have a limited number of active commissioning devices 210, but there may be multiple potential commissioning devices 210 that can perform the role of the commissioner. The leader 216 is responsible for assuring that there is only a finite set of active commissioners for the mesh network 100. By way of example, and not limitation, the finite set of active commissioners may be limited to a single active commissioner. To become the active commissioner, the commissioning device 210 petitions the leader 216 to become the commissioner for the mesh network.

At 602, the border router 202 advertises, on the external network interface, that the mesh network 100 is available for commissioning devices 210. The border router 202 may make the advertisement in response to a multicast request (i.e., a scan or a query) within a service discovery protocol. For example, the advertisement 602 may be done using any suitable service discovery, such as Multicast Domain Name Service (mDNS). Specifically, for wireless networks, the border routers 202 advertise a commissioning service using DNS Service Discovery (DNS-SD) via a Uniform Resource Locator (URL). A lookup server would then respond with all the different wireless networks that are accessible, the network name of the mesh network 100, and a commissioning port.

The commissioning device 210 responds 604 to the advertisement from the border router 202 by requesting a secure connection for the commissioning session between the commissioning device 210 and the border router 202. For example, the commissioning session can be established in any suitable manner, such as using the PSKc to establish the commissioning session using DTLS or TLS. By way of example, and not limitation, the commissioning device 210 and the border router 202 exchange DTLS messages 606-616 to identify and authenticate the commissioning device to the mesh network 100, and to establish the secure connection for the commissioner session.

The commissioning session may use any suitable network port, such as a User Datagram Protocol (UDP) or a Transmission Control Protocol (TCP) port as both the source and destination port for the commissioning session. For example, the commissioning session uses the commissioning port discovered during network discovery. Each border router 202 can assign the commissioning port or use a default commissioning port.

In order to become the active commissioner for the mesh network 100, the commissioning device 210 petitions 618 the leader 216 to request to become the commissioner. Using the commissioning session, the commissioning device 210 sends the border router 202, a petition 620 to become the active commissioner for the mesh network 100. The border router 202 forwards the petition 622 to the leader 216. For example, after the commissioning device 210 is authenticated and identified, the border router 202 unicasts to the leader 216, a Commissioner Petition Request message 620 (e.g., COMM_PET.req). The Commissioner Petition Request is forwarded, by the border router 202 to the leader 216, as request 622 (e.g., as the LEAD_PET.req) requesting that the commissioning device 210 be accepted as the active commissioning device 210 for the mesh network 100. For example, the commissioner petition request message, including a commissioner identification string, is sent securely over the mesh network 100.

The leader 216 determines if there is an active commissioner for the mesh network 100. If there is an active commissioner, the leader rejects the petition from the commissioning device 210. If there is no active commissioner for the mesh network 100, the leader 216 accepts the petition from the commissioning device 210. The leader 216 updates its copy if the commissioning dataset to reflect that there is an active commissioner and the identity of the commissioning device 210. The leader 216 sets a permit-join flag for the mesh network 100 to true. The leader 216 then propagates 624 the network data and the updated commissioning dataset to the mesh network 100, which indicates that the mesh network 100 is joinable.

For example, the leader 216 will respond to the Commissioner Petition Request message by either accepting or rejecting the commissioning device 210 as the active commissioner for the mesh network 100. Upon acceptance, the leader 216 will update its copy of the network data with the new commissioner information, set a permit-join flag to true, and propagate the updated network data and commissioning dataset over the mesh network 100 using any suitable protocol, such as Multicast Protocol for Low Power and Lossy Networks (MPL), or multicasting an MLE-UPDATE message.

Potential joiner routers 214 (i.e., routers 102 and router-eligible end devices 104) store the updated network information and commissioning dataset propagated by the leader 216. The updated network information and commissioning dataset allows for direct communication with the commissioning device 210 for use when commissioning any joining device 212. The commissioning dataset includes a border router locator (RLOC) that allows any device to send a message to the current, active border router 202, which is acting as a proxy for the active commissioner.

After determining whether to accept or reject the petition from the commissioning device 210, the leader 216 responds 626 with an indication of its decision to the border router 202. The border router 202 sends a response 628 to the commissioning device 210 that includes the indication of the decision to accept or reject the petition by the leader 216. For example, the leader 216 sends a Leader Petition Response message (e.g., LEAD_PET.rsp) to the border router 202 indicating the decision of the leader 216 to accept or reject the commissioning device 210 as the active commissioner for the mesh network 100. In response to receiving the Leader Petition Response message from the leader 216, the border router 202 will send a Commissioner Petition Response message (e.g., COMM_PET.rsp) to the commissioning device 210 indicating the decision of the leader 216 to accept or reject the commissioning device 210 as the active commissioner for the mesh network 100.

Alternatively as shown at 630, the leader 216, after accepting the petition for the commissioning device 210 to become the active commissioner, sets the permit-join flag to true, but waits to receive a Set Management Data Request message 632 (e.g., MGMT_SET.req) that includes an indication from the commissioning device 210 to allow the leader 216 to propagate the updated network data to the mesh network 100. The leader 216 replies to the commissioning device with a Set Management Data Response message 634 (e.g., MGMT_SET.rsp) to acknowledge the request to propagate the updated network data. The leader 216 propagates 636 the network data and the updated commissioning dataset to the mesh network 100, which indicates that the mesh network 100 is joinable.

Before the commissioning device 210 sends the Set Management Data Request message to allow the leader 216 to propagate the updated network information, the commissioning device 210 may administer the mesh network 100, such as configuring devices, changing network settings, and so forth, without making the mesh network 100 joinable. The commissioning dataset includes a commissioner session identifier, a commissioning dataset timestamp, and the PSKc. When the commissioning device 210 is the active commissioner on the mesh network 100, the commissioning dataset also includes a location of the border router 202. When the mesh network 100 is joinable, the commissioning dataset also includes steering data that indicates which joining devices 212 are allowed to join the mesh network 100. When the mesh network 100 is joinable, the routers 102 in the mesh network 100 include the permit-join flag and the steering data in beacons transmitted by the routers 102.

The commissioning device 210 may include the mesh network interface, enabling the commissioning device 210 to operate as a native commissioner on the mesh network 100. When a native commissioner bit is set in a beacon, and the commissioning device 210 includes the mesh network interface, the commissioning device 210 may petition the leader 216 to become the active commissioner for the mesh network 100.

Once accepted as the active commissioner, the commissioning device 210 may manage the network using Set Management Data Request messages and Get Management Data Response messages to get and set network parameters of the mesh network 100. The network parameters include the PSKc, the network name, the network key, a network key sequence number, a network PAN ID, a network extended PAN ID, a network Unique Local Address (ULA), and/or a radio channel for the mesh network 100. Additional management capabilities are contemplated, such as facilities for ejecting previously joined devices from the mesh network 100. Set Management Data Request messages and Get Management Data Response messages are relayed to the leader 216 via the border router 202 over the commissioning session. As the messages to get and set the network parameters commands affect global network-wide state, the messages are forwarded to, and stored by, the leader 216. Any device can directly address a request to obtain the network information to the leader 216 and avoid multi-hop addressing.

Establishing the Joiner Session

In order to securely commission a new device to the mesh network 100, the joiner session is established between the commissioning device 210 and the joining device 212. The joiner session, is a communication tunnel through the mesh network 100 between the commissioning device 210 and the joining device 212. The joining device credential is a human-scaled passphrase that is used to authenticate that the joining device 212 is eligible to join the mesh network 100. The joining device credential is communicated between the joining device 212 and the commissioning device 210 by any suitable out-of-band mechanism. For example, the joining device credential may be communicated by scanning a QR code or a barcode, located on the joining device 212, with a camera included in the commissioning device 210, by entering a serial number of the joining device 212, into the user interface of the commissioning device 210, and so forth.

Figure 7:
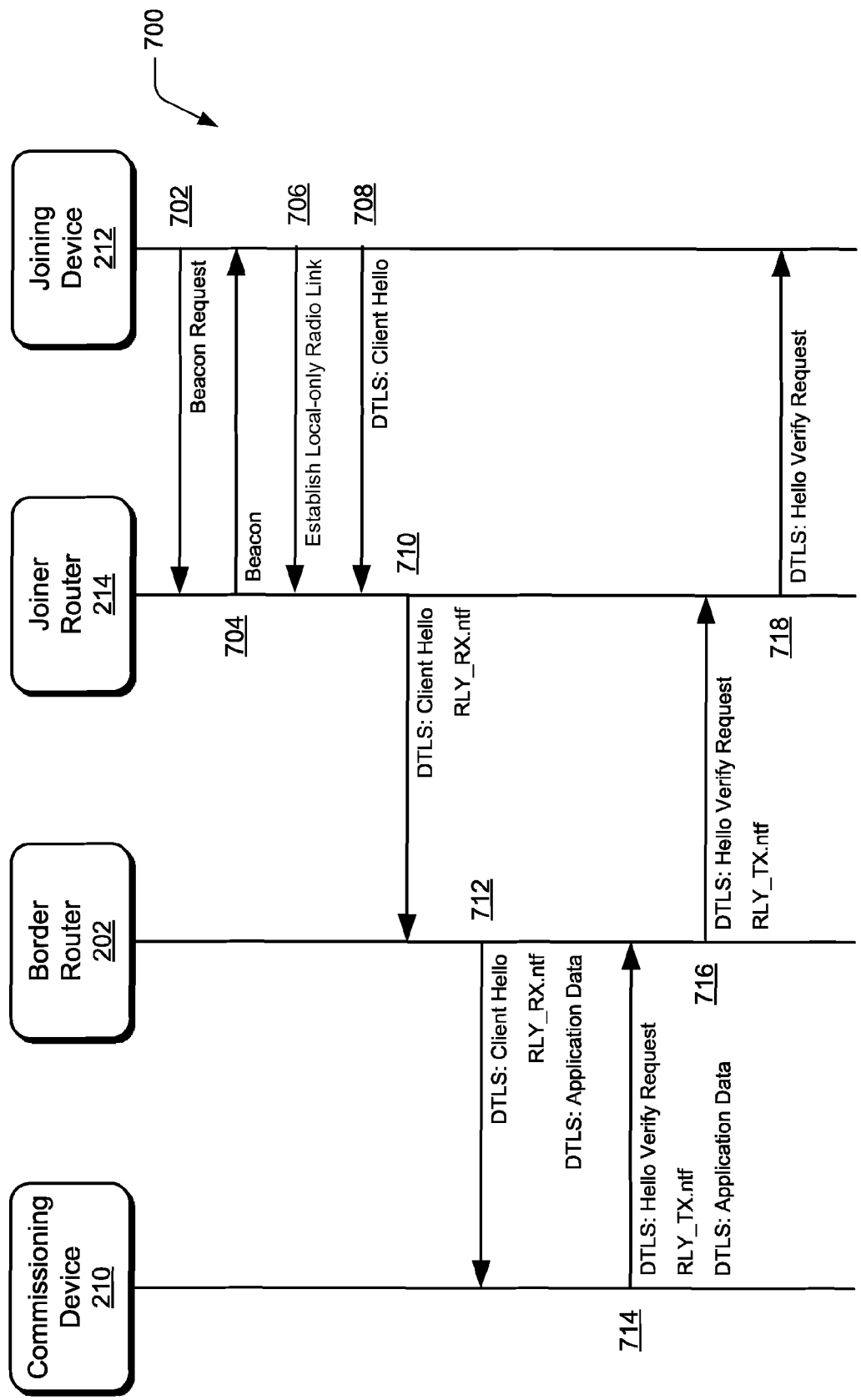
FIG. 7 illustrates an example of data transactions between devices in a mesh network environment to establish a joiner session in accordance with embodiments of mesh network commissioning.

FIG. 7 illustrates the process 700 of establishing the joiner session by showing the transactions between the commissioning device 210, the border router 202, the joiner router 214, and the joining device 212. In some embodiments, establishing the joiner session begins with the joining device 212 scanning radio channels, such as channels defined in the IEEE 802.15.4 specification, to find potential mesh networks 100 to join. The joining device 212 issues a beacon request 702 to each mesh network 100 found during the channel scan, to which all mesh networks 100 will respond.

For example, the joining device 212 performs an active scan by transmitting an 802.15.4 MAC-BEACON.request on every channel. In response to receiving the beacon request, the joiner router 214 transmits a beacon response 704 that includes the steering data to assist the joining device 212 to discover the correct mesh network 100 to join. The joiner router 214 transmits an 802.15.4 MAC-BEACON.response that includes the steering data in the payload of the 802.15.4 MAC-BEACON.response. Details of generating, transmitting, and using the steering data are described in further detail below. Once the joining device 212 has found the mesh network 100 to join, the joining device 212 establishes the local-only radio link, which is an unsecured, point-to-point communication link, to the joiner router 214.

For example the joining device 212 establishes the local-only radio link 706 to the joiner router 214 by configuring MAC-layer network parameters (e.g., channel, PAN ID, etc.) gleaned from the beacon received from the channel scan. The joining device 212 sends packets to a joiner port (e.g. a UDP port) on an unsecured interface, (e.g., port number 5684 ":coaps") of the joiner router 214, to establish the local-only radio link. The joiner port is also communicated in the beacon. If the joiner port is missing, a default port is used by the joining device 212.

The joining device 212 sends a request to the joiner router 214 to join the mesh network 100. Upon receipt of the request to join the mesh network 100, the joiner router 214 sends the request for authority to join to the commissioning device 210. The joiner router 214 forwards all traffic sent by the joining device 212 on the unsecured joiner port. The joiner router 214 does not process or understand the contents of the DTLS Handshake, which is understood by the commissioning device 210. In some embodiments, the joiner router 214 may store a location of the commissioning device 210, or the border router 202 that is a proxy for the commissioning device 210, in its memory, retrieve the location of the commissioning device 210 from another device (e.g., the leader 216, or the border router 202), or some other location (e.g., remote service). The PSKd is used to authenticate the joining device 212 to the mesh network 100 and to secure the joiner session between the commissioning device 210 and the joining device 212. The PSKd is derived from the joining device credential.

In some embodiments, the joiner session may be established using DTLS, as well as an authentication protocol, such as Password Authenticated Key Exchange by Juggling (J-PAKE), Secure Remote Password (SRP) protocol, and/or any other suitable password authenticated key exchange protocol. For example, an elliptic curve variant of J-PAKE (EC-JPAKE), using the NIST P-256 elliptic curve may be used for authentication and key agreement. Using J-PAKE with the PSKd proves that the user, who is commissioning the joining device 212, has physical possession of the joining device 212, as well as proving that the commissioning device 210 is connected to the correct joining device 212 over the joiner session.

The joiner router 214 forwards the request to join the mesh network 100, which is received from the joining device 212 over the joiner session, to the commissioning device 210. Upon authorization to join the mesh network 100, from the commissioning device 210, the network key is transferred securely to the joining device 214 using the joiner session.

For example, the joining device 212 may send a joiner identification message to the joiner router 214 to provide a human-readable name for the joining device 212. The joiner router 214 encapsulates information in the joiner identification message in a relay message and forwards the relay message to the border router 202, using a commissioner prefix, an anycast address, or the border router locator. Upon receipt of the relay message, the border router 202 appends a sender address (in this case, the address of the joiner router 214) to a list of next relay addresses at the end of the relay message, and forwards the relay message over the joiner session.

For example, the joining device 212 sends handshake messages 708 using DTLS and UDP to the joiner router 214. The joiner router 214 relays the DTLS handshake messages 710 to the border router 202 for delivery to the commissioning device 210. The joiner router 214 has no knowledge of the content of the relayed DTLS handshake messages. The joiner router 214 filters the received DTLS handshake messages, received from the joining device 212 over the unsecured local-only radio link, based on an agreed upon the joiner UDP port, described above. The joiner router 214 relays all messages received on the specified joiner UDP port. The joiner router 214 may rate limit forwarding of unsecured messages to prevent Denial of Service (DOS) attacks on the mesh network 100.

By way of further example, the joining device 212 initially identifies itself to the commissioning device 210 by sending a DTLS-ClientHello message to the joiner router 214. This initial DTLS-ClientHello is intended to allow the commissioning device 210 to assign the joining device 212 a DTLS cookie for use during the remainder of the commissioning exchange. The joiner router 214 encapsulates the DTLS-ClientHello UDP payload in a DTLS Relay Receive Notification message (e.g., RLY_RX.ntf), adding a source address of the encapsulated packet as a relay hop, in this case a link local 64-bit address of the joining device 212. The DTLS cookie is sent to the joining device 212, which the joining device 212 then returns to the commissioning device 210 to ensure that the joining device 212 is genuine.

The joiner router 214 also adds its address as a relay point to the DTLS Relay Receive Notification message. The joiner router 214 sends the DTLS Relay Receive Notification message to the border router 202. The border router 202, upon receipt of the DTLS Relay Receive Notification message, forwards the DTLS Relay Receive Notification message 712 over the commissioning session to the commissioning device 210.

Based on the joiner identification message received from the joining device 212, the commissioning device 210 uses the joiner identification message to initiate a DTLS-HelloVerify message based on the PSKd. The DTLS-HelloVerify message and a DTLS Relay Transmit Notification message (e.g., RLY_TX.ntf) are sent to the border router 202, at 714. The border router 202 relays the DTLS-HelloVerify message and the DTLS Relay Transmit Notification message to the joiner router 214, at 716. The joiner router 214 sends the DTLS-HelloVerify message to the joining device 212, at 718.

Alternatively, the commissioning device 210 may have information for multiple joining devices 212 that are to be commissioned. The commissioning device 210, upon reception of the DTLS-ClientHello message from a particular one of the multiple joining devices 212, examines the IEEE 64-bit Extended Unique Identifier (EUI-64) address of the joining device 212 that sent the DTLS-ClientHello message. The commissioning device 210 looks for the PSKd, in the information for multiple joining devices 212 that are to be commissioned, to continue the DTLS handshake for the particular joining device 212. The commissioning device 210 relays a combined DTLS-ServerHello, DTLS-ServerKeyEx, and DTLS-ServerHelloDone back to the joining device 212, via the joiner router 214. Upon completion of this DTLS handshake, the establishment of the joiner session is complete.

Once the commissioning device 210 has authenticated the joining device 212, the commissioning device 210 entrusts the joining device 212 with the network credentials for the mesh network 100. For example, the commissioning device 210 requests the network credentials from the border router 202, and sends the network credentials to the joining device 212 in a joiner entrust message over the joiner session, transported by the DTLS Relay Transmit Notification message over the commissioning session. Alternatively, the commissioning device 210 entrusts the joining device 212 with the network credentials for the mesh network 100 using a Key Exchange Key (KEK) as a shared secret between the commissioning device 210 and the joining device 212. The KEK is sent to the joiner router 214 for the joining device 212 and is used to encrypt the network credentials for transmission over the local-only radio link.

Joining Device Provisioning

When the joining device 212 is joined to the mesh network 100, the joining device 212 may also require provisioning. Provisioning may include updating the firmware in the joining device 212, configuring the joining device 212, providing a local configuration related to other devices on the mesh network 100, linking the joining device 212 to an account of the user on the cloud service 208, linking the joining device 212 to a cloud-based application server, and so forth. While still established, the commissioner session and the joiner session are used to provide a secure connection for provisioning the joining device 212, before the joining device 212 uses the network credentials to join the mesh network 100.

The joining device 212 sends an indication of a location for a commissioner application to be executed by the commissioning device 210 to perform the provisioning of the joining device 212. The indication of the location may be used to find the commissioner application in the memory of the commissioning device 210, or may be used by the commissioning device 210 to retrieve the commissioner application from the cloud service 208. The indication may be in any suitable form, for example a Uniform Resource Locator (URL). When the provisioning of the joining device 212 is finalized, the joining device 212 terminates the joiner session and the local-only radio link. The joining device 212 uses the network credentials to join the mesh network 100.

Steering Data

Wireless mesh networks may share radio spectrum. Standards, such as IEEE 802.15.4, define multiple channels, which enables multiple networks to operate within a band of radio spectrum. Additionally, when there are many devices to commission to the mesh network 100, it is desirable to efficiently communicate multiple device identifiers for the many joining devices 212, using the steering data in the beacon, to assist the joining devices 212 in hunting for the correct mesh network 100 to join. Mesh network commissioning techniques are described that securely join multiple joining devices 212 to the correct mesh network 100, in an environment where multiple mesh networks share the same radio spectrum and/or underlying industry-standard networking protocols.

When the commissioning device 210 obtains the PSKd and the EUI-64 MAC address for a desired joining device 212, the commissioning device 210 constructs the steering data that will signal to the desired joining device 212 which mesh network 100 to join. The steering data will include some way to distinguish the mesh network 100 from other 802.15.4-based networks, a way to communicate whether or not there is an active commissioner on the mesh network 100, and a way to specify which joining devices 212 are currently allowed to join the mesh network 100.

The steering data is determined by the commissioning device 210 and indicates the device identifiers of one or more joining devices 212 that are allowed to join the mesh network 100. The commissioning device 210 propagates the steering data to the routers 102 in the mesh network 100. The routers 102, in turn, include the steering data in the beacon for the mesh network 100, transmit the beacon to provide the steering data to potential joining devices 212, with an indication that the mesh network 100 is joinable, and if the potential joining devices 212 are allowed to join the mesh network 100. For example, the commissioning device 210 obtains the PSKd and the EUI-64 MAC address for the desired joining device 212, as discussed above. From this EUI-64, the commissioning device 210 constructs the steering data to signal to the desired joining device 212 that the desired joining device 212 is allowed to join the mesh network 100.

In a further example, the steering data may include a list of 16-bit Cyclic Redundancy Check (CRC16) encoded EUI-64 addresses of the joining devices 212 that are allowed to join the mesh network 100. The CRC16 provides a compact representation of the EUI-64 addresses, with a low chance of collisions between two different EUI-64 addresses in the CRC16-encoded addresses. The use of the CRC16 enables the proper joining device 212 to efficiently find the correct mesh network 100 to join, while efficiently using resources of the mesh network 100, by reducing the size of the required beacon payload for the device identifiers of the joining devices 212.

In the case where multiple mesh networks 100 have active commissioners, the joining device 212 hunts for the correct mesh network 100 by collecting the beacons from the active scan. The joining device 212 discards collected beacons from non-mesh networks, beacons with a wrong protocol, beacons with a wrong version, beacons with a wrong XPA-NID, beacons with a wrong network name, and/or beacons with beacons with joining disabled. The joining device 212 prioritizes collected beacons with an exact match to the device identifier of the joining device 212 in the steering data of the collected beacons, and sub-prioritizes the matching, collected beacons in order of a best signal strength. The joining device 212 attempts to join the prioritized networks, one at a time (as described above), until the joining device 212 successfully joins the mesh network 100. If the joining device exhausts the prioritized list of networks without successfully joining the mesh network 100, the joining device 212 may perform the active scan to begin hunting for the mesh network 100 again, either immediately or after a delay period.

The steering data guides which joining devices 212 may, or may not, attempt to join the mesh network 100. Additionally, all bits in the steering data may be set to a value of zero to indicate that the mesh network 100 is not available for joining. Alternatively, all bits in the steering data may be set to a value of one to indicate that that the mesh network 100 is available for joining by any joining device 212.

Some commissioning devices 210 may lack resources to extract the EUI-64 and the joining device credential easily by scanning a QR code. In this case, the least significant 24 bits of the EUI-64 are used as the device identifier for the joining device 212, when determining the steering data. An S-bit in the beacon signifies whether a short or a long device identifier for the joining device 212 is used to determine the steering data. The S-bit is set to a value of zero when the EUI-64 is used as the device identifier for determining the steering data. The S-bit is set to a value of one when the least significant 24-bits of the EUI-64 are used as the device identifier for determining the steering data.

Figure 8:
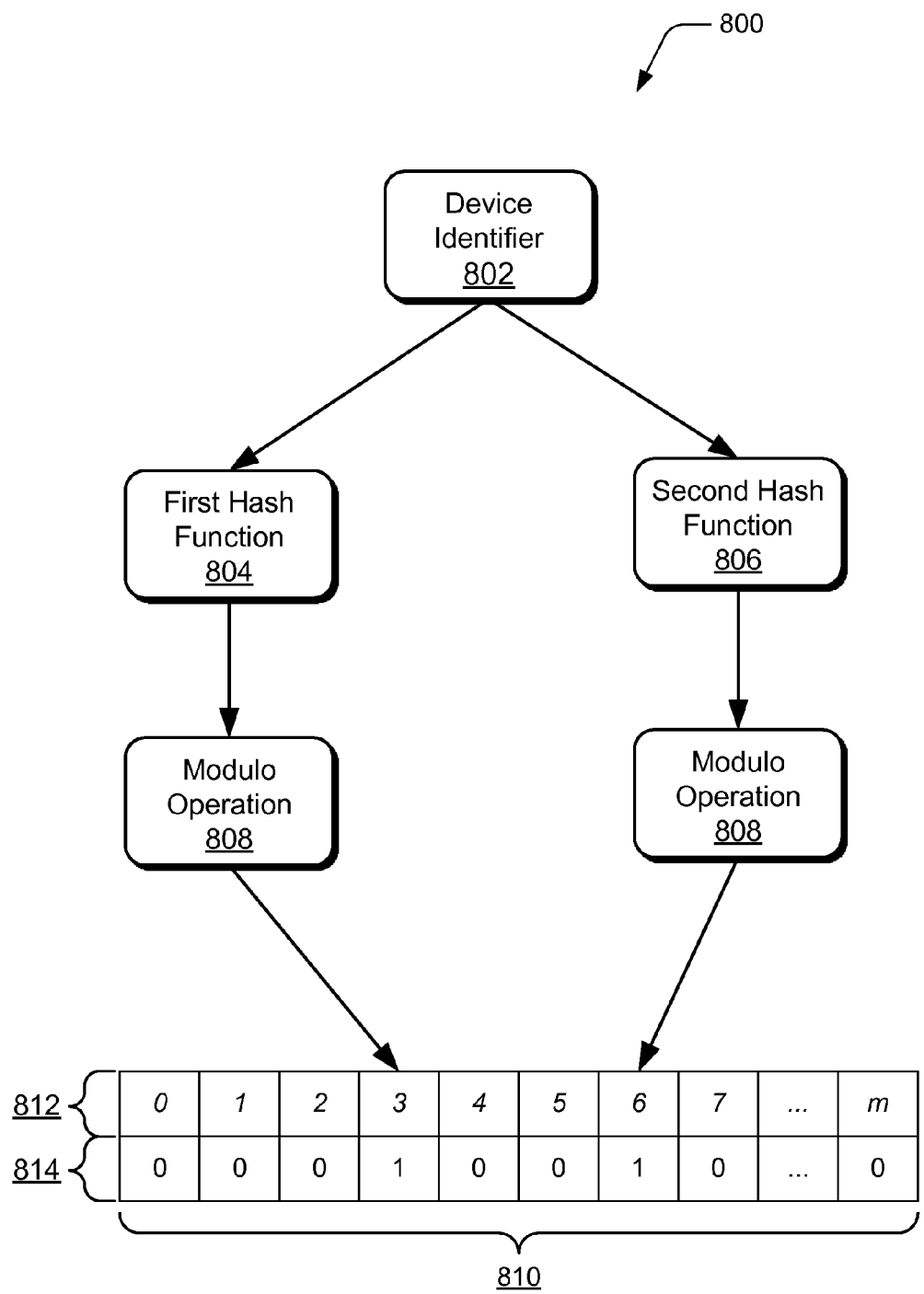
FIG. 8 illustrates an example of steering data generated using a Bloom filter to encode device identifiers for joining devices in accordance with embodiments of mesh network commissioning.

FIG. 8 illustrates an example 800 of steering data generated using a Bloom filter, which is used to encode the device identifiers for the joining devices 212 into the steering data. The Bloom filter provides an efficient encoding of the devices identifiers with a low probability of collisions between the encoded values of different device identifiers. Each device identifier 802, to include in the steering data, is encoded by a first hash function 804 to produce a first hash value and is encoded by a second hash function 806 to produce a second hash value. For example, the first hash function 804 is a CRC16-CCITT and the second hash function 806 is a CRC16-ANSI. The device identifier 802 is the EUI-64 of the joining device 212. Alternatively, the twenty-four least significant bits of the EUI-64 are used as the device identifier 802.

A modulo operation 808 is performed on the first hash value and on the second hash value. A divisor, for the modulo operation, is a length of a bit array 810 of the Bloom filter (bit positions in the bit array 810 are shown at 812, and bit values are shown at 814.) Each bit in the bit array is initialized to a value of zero before determining the steering data. The result of each modulo operation determines a location in the bit array. The value in the two determined locations in the bit array are set to a value of one, and the two determined bit fields provide a mapping to the device identifier.

For example, for a hypothetical device identifier 802, performing the modulo operation 808 on the result of the first hash function 804 results in a value of three for the device identifier 802. Performing the modulo operation 808 on the result of the second hash function 806 results in a value of six for the device identifier 802. The values at the bit positions three (3) and six (6) are set to a value of one to indicate the Bloom-filtered value of the hypothetical device identifier 802.

The joining device 212 also calculates the Bloom filter bit locations that represent the device identifier of the joining device 212. The joining device 212 determines if the calculated bit positions both contain a value of one in the steering data in the collected beacons. A positive determination indicates, to the joining device 212, that the joining device 212 is allowed to join the mesh network 100. The values of the bits in the bit array of the Bloom filter may all be set to a value of one to indicate that any joining device 212 is allowed to join the mesh network 100. Setting all the bits in the Bloom filter bit array to a value of zero indicates that there is no active commissioner for the mesh network 100 and that the mesh network 100 is not available for joining. The Bloom filter provides a compact representation with anonymity for the device identifiers, while allowing the proper joining devices 212 to efficiently find the correct mesh network 100 to join, with a low probability of false positives indicating that a particular joining device 212 is allowed to join the mesh network 100 when the particular joining device is not allowed to join.

Parameters for the Bloom filter are: k, a number of hash functions used to hash the device identifier; m, a number of bits in the bit array of the Bloom filter; and n, a number of the joining devices 212 to represent in the steering data. As an example, and not a limitation, the parameter k is set to two, indicating that two hash functions are used, such as a CRC16-CCITT with polynomial 0x1021 and a CRC16-ANSI with polynomial 0x8005. Other values of k, hash functions, and polynomials are contemplated.

The probability of collisions, p, for the Bloom filter can be calculated as follows:

$$p = \left(1 - e^{\left(-k\frac{n}{m}\right)}\right)^k \quad (2)$$

The commissioning device 212 may set the length of the bit array, m, as required to get a reasonably low collision probability in the steering data. The use of the Bloom filter allows the steering data to scale to support joining large numbers of the joining devices 212 to the mesh network 100, while maintaining a low probability of collisions. The following table shows for various values of n, and a probability of collisions p, when m=127 (i.e., 16 bytes):

| n | p |
|---|---|
| 1 | 0.000 |
| 2 | 0.001 |
| 3 | 0.002 |
| 4 | 0.004 |
| 5 | 0.006 |
| 10 | 0.021 |
| 12 | 0.030 |
| 20 | 0.073 |
| 25 | 0.106 |
| 30 | 0.142 |
| 50 | 0.297 |
| 100 | 0.629 |
| 200 | 0.916 |
| 1000 | 1.000 |

In order to join large numbers of joining devices 212 (e.g., 1000), the commissioning device 210 may break the large set into smaller sets, such that each smaller set has a lower probability of collisions (false positives) in the steering data.

Managing Commissioning Data Across Mesh Network Partitions

Figure 9:
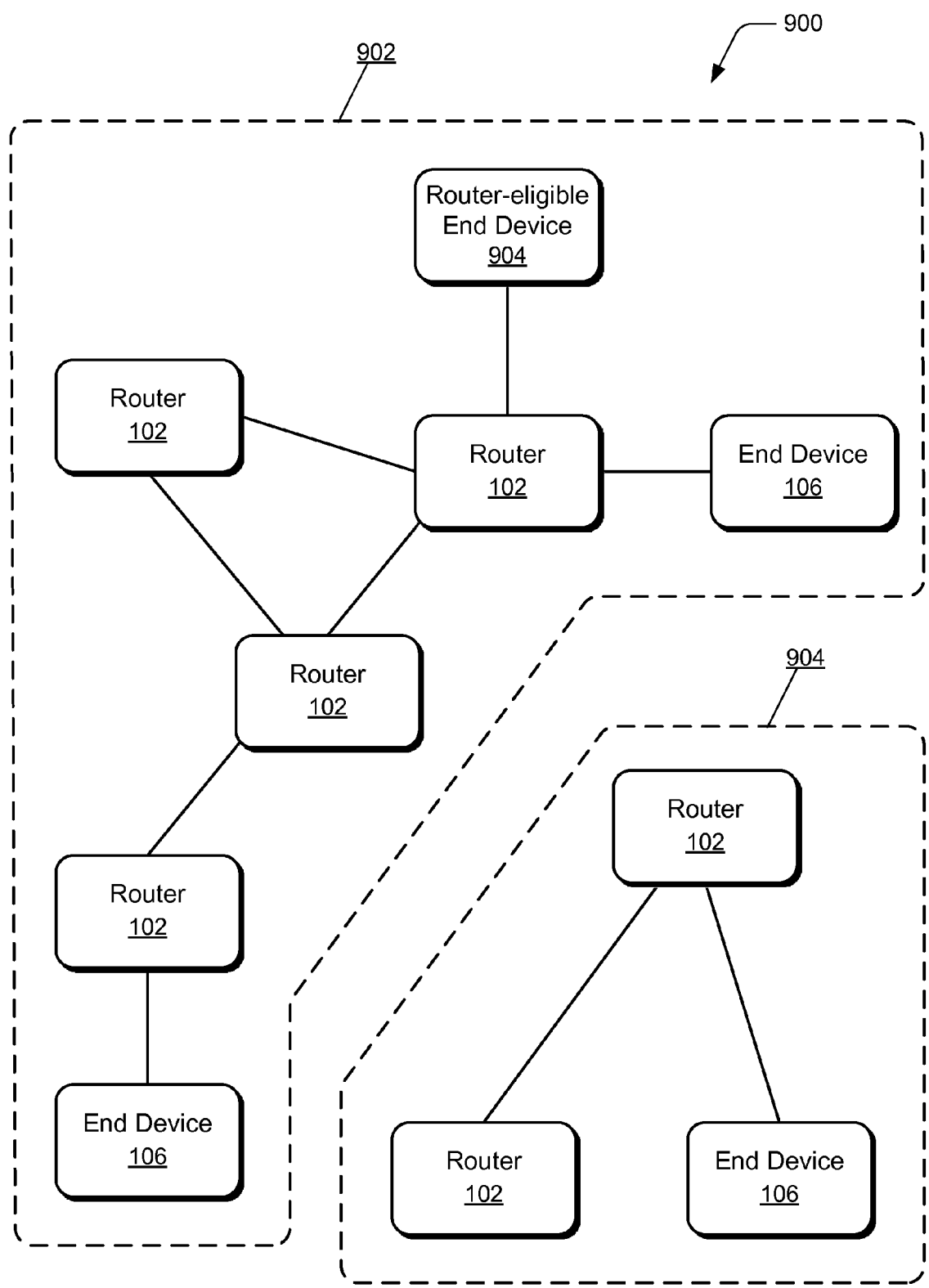
FIG. 9 illustrates an example of partitioning a mesh network in accordance with embodiments of mesh network commissioning.

FIG. 9 illustrates the mesh network 100 when a split or partitioning of the mesh network 100 has occurred. For instance, one of the routers 102 may have lost power, resulting in a split of the mesh network 100 that prevents one partition or fragment of the mesh network 100 from communicating with another partition. On the other hand, radio interference may have blocked communications in a portion of the mesh network 100 creating the split of the mesh network 100. When the mesh network 100 splits into two network fragments 902 and 904, the network fragment 904 will choose a leader for the fragment 904, and may also accept a commissioner for the fragment 904, which is different than the commissioner for the fragment 902. Either, or both, of the fragments may update network credentials during the split.

The mesh network 100 can cleanly and reliably partition into two disparate fragments, which are fully functional networks when connectivity between the two partitions is severed. The partitions can continue any outstanding communications that are fully contained within a partition uninterrupted and can continue with normal key rotation. The two mesh network partitions, formerly part of the single, mesh network 100 can autonomously merge when connectivity between the two partitions is restored.

If the commissioning credential is changed in the network fragment 902 during the split, the commissioning credential change will be propagated to the devices within the network fragment 904 when connectivity is restored between the network fragments 902 and 904. In other words, in some embodiments, the commissioning credential is updated to the most recently adopted credential. However, if both network fragments 902 and 904 authorize different commissioners, and receive new and different commissioning credentials during the split, it may be more difficult to determine the most recent credential.

Resolution of commissioning credentials between any two mesh network fragments, previously fragmented but now merging, propagates the most recently changed commissioning dataset to the devices in the mesh network 100. If there is a change on the fragment 902, the user believes he or she is changing the commissioning credential on the entire mesh network 100 but, due to the partitioning, is only effectively changing the credential on the fragment 902. At some later point in time, the fragments 902 and 904 merge. Because the original credential on the fragment 904 remained unchanged following the fragmentation, whereas the credential on the fragment 902 was changed, the merged fragments assume the new credential established on the fragment 902 during the fragmentation. If there is a change to the commissioning credential on the fragment 904 during the split, the change made on the fragment 904, is propagated to the devices in the fragment 902 after the merge.

In the case where, two users change the commissioning credentials on the respective two fragments 902 and 904 during the split, the two users each believe they are changing the commissioning credential on the entire mesh network 100. However, because the mesh network 100 is fragmented, both users are able to establish themselves as the network commissioner and change the commissioning credential on their respective network fragments. At some later point in time, the fragments 902 and 904 merge, but it may not be known which leader, from the two fragments, will prevail as the leader for the merged mesh network. The leader that prevails may not have a copy of the most recently changed commissioning credentials. Since the commissioning credentials were changed independently on the two fragments, the fragment with the most recently updated commissioning credential takes precedence.

To determine which network credential of the two is the most recent, the commissioning dataset includes timestamp information, as well as the commissioning credential to resolve differences between the commissioning credentials when the mesh network merges. The timestamp information enables nodes in the mesh network 100 to determine the most recent update to the commissioning credentials in any fragment, and synchronize the commissioning dataset in the devices in the mesh network 100 to the most recently updated commissioning credentials.

The timestamp information includes a timestamp and an indication of whether the timestamp is traceable to Coordinated Universal Time (UTC), or is a relative time reference within the mesh network 100. For example, if the commissioning device 210 is a device, such as a smart phone or computer that has access to network time, such as using Network Time Protocol (NTP), access to time provided over a cellular network, timing information from a Global Positioning System (GPS) receiver, and so forth, the timestamp is traceable to UTC. By way of example and not limitation, the timestamp being traceable to UTC, the timestamp is expressed in units of seconds traceable to a known epoch, for example in units of $2^{-15}$ seconds since the start of UNIX® time. When the timestamp is UTC-traceable time, the indication, such as a U-bit, is set to indicate that the timestamp is traceable to UTC.

In the event that the commissioning device 210 is an embedded system, such as the native commissioner, which does not have access to UTC-traceable time, then the timestamp contains a relative time value. The relative time value is determined by using a previous value of the timestamp, as provided by the leader 216, and adding an increment of clock ticks to the previous timestamp to produce the timestamp for the updated commissioning dataset. By way of example and not limitation, the time ticks may be a 15-bit representation of sub-second time ticks derived from a 32 kHz clock of the native commissioner. When the timestamp is the relative time, the indication, such as the U-bit is set to a value of zero, to indicate that the timestamp is expressed as relative time. The increment of the timestamp for relative time allows changes to the commissioning data to be detected. When the partitions merge, if one of the commissioning timestamps is traceable to UTC and a second is relative time, the commissioning data with the UTC-traceable timestamp will be given a higher priority.

In the event that the timestamps are identical between the commissioning credentials, which were updated separately during the split, alternative means may be used to break the tie between the timestamps. In some embodiments, a lexicographical comparison (e.g., memcmp) may be performed to determine which credential is more recent. In certain embodiments, network fragments may be prioritized, such that changes to the commissioning credential on one network fragment will be adopted in the event of the tie between the timestamps. For example, the network fragment with the border router 202 may be deemed as the highest priority fragment, such that if the network fragments 902 and 904 each receive commissioning credential changes that include identical timestamps, the change in the network fragment 902 change will be adopted in the event of identical timestamps values in the commissioning dataset of the two fragments.

Example methods 1000 through 1800 are described with reference to respective FIGS. 10-18 in accordance with one or more embodiments of mesh network commissioning. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 10:
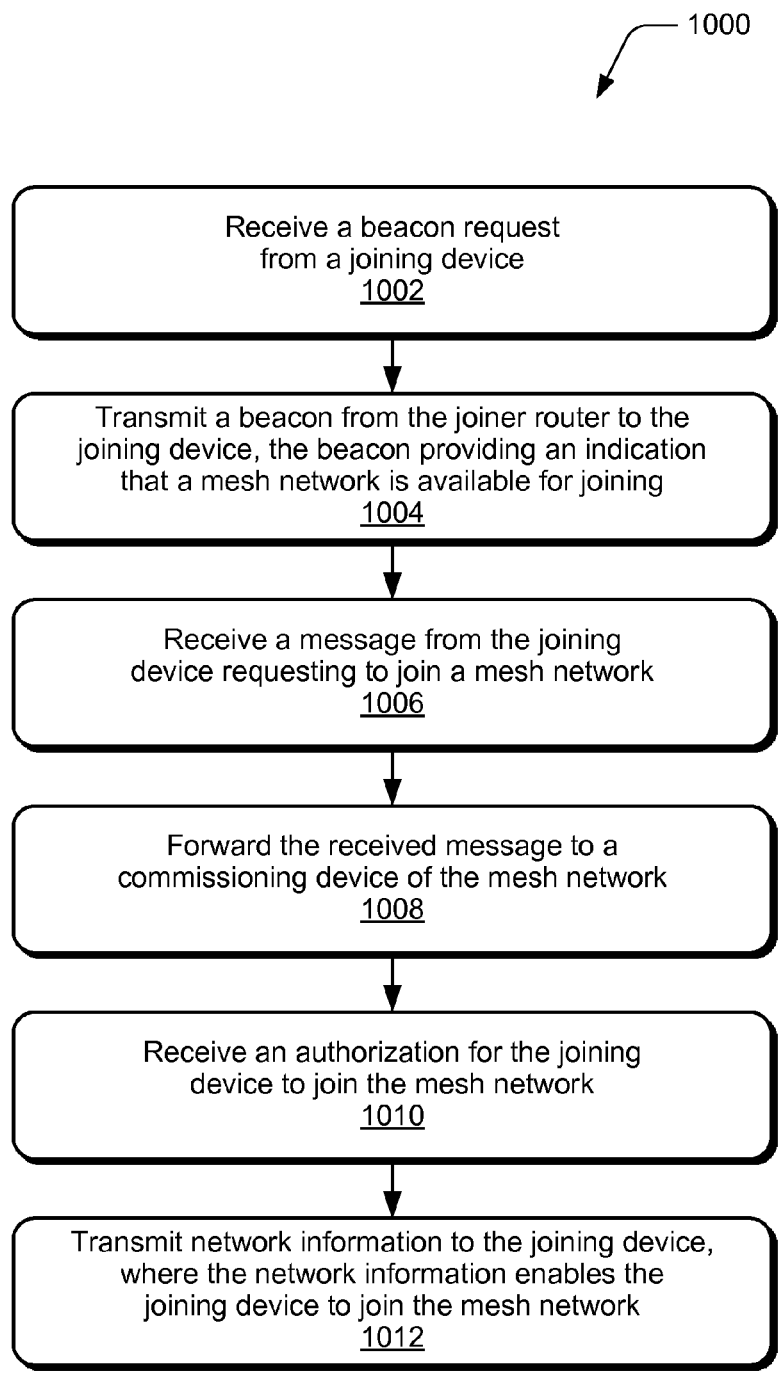
FIG. 10 illustrates an example method of mesh network commissioning as generally related to joining nodes in a mesh network in accordance with embodiments of the techniques described herein.

FIG. 10 illustrates example method(s) 1000 of mesh network commissioning as generally related to joining nodes in a mesh network. The order in which the method blocks are described are not intended to be construed as a limitation, and any number of the described method blocks can be combined in any order to implement a method, or an alternate method.

At block 1002, a beacon request is received from a joining device and, at block 1004, a beacon is transmitted from the joiner router to the joining device, where the beacon provides an indication that a mesh network is available for joining. For example, a joiner router 214 in a mesh network 100 receives a beacon request from a joining device 212 and then transmits a beacon to the joining device, where the beacon provides an indication that the mesh network 100 is available for joining. The transmitted beacon is effective to enable the joining device 212 to establish a local link between the joining device and the joiner router.

At block 1006, a message is received from the joining device requesting to join a mesh network. For example, a joiner router 214 in a mesh network 100 receives a message from a joining device 212 requesting to join the mesh network. The message that is received from the joining device 212 can include an encrypted device identifier that is usable to authenticate the joining device, which is authenticated using Password Authenticated Key Exchange by Juggling (J-PAKE), and the authentication is effective to establish a secure communication session between a commissioning device 210 of the mesh network 100 and the joining device.

At block 1008, the received message is forwarded to a commissioning device of the mesh network. For example, the joiner router 214 forwards the received message from the joining device 212 to the commissioning device 210 of the mesh network 100. In implementations, the message can be received and forwarded using Datagram Transport Layer Security (DTLS), or using User Datagram Protocol (UDP). Additionally, the joiner router 214 forwarding the received message to the commissioning device 210 can include forwarding the received message through one or more routers of the mesh network 100 in a communication path between the joiner router 214 and the commissioning device 210. In implementations, one of the routers may be a border router 202 that connects the mesh network 100 to an external network, and the commissioning device is attached to the external network.

At block 1010, an authorization is received for the joining device to join the mesh network and, at block 1012, network information is transmitted to the joining device, the network information effective to enable the joining device to join the mesh network 100. For example, the joiner router 214 receives an authorization for the joining device 212 to join the mesh network 100 from the commissioning device 210, and the joiner router 214 transmits network information to the joining device, where the network information is effective to enable the joining device 212 to join the mesh network.

Figure 11:
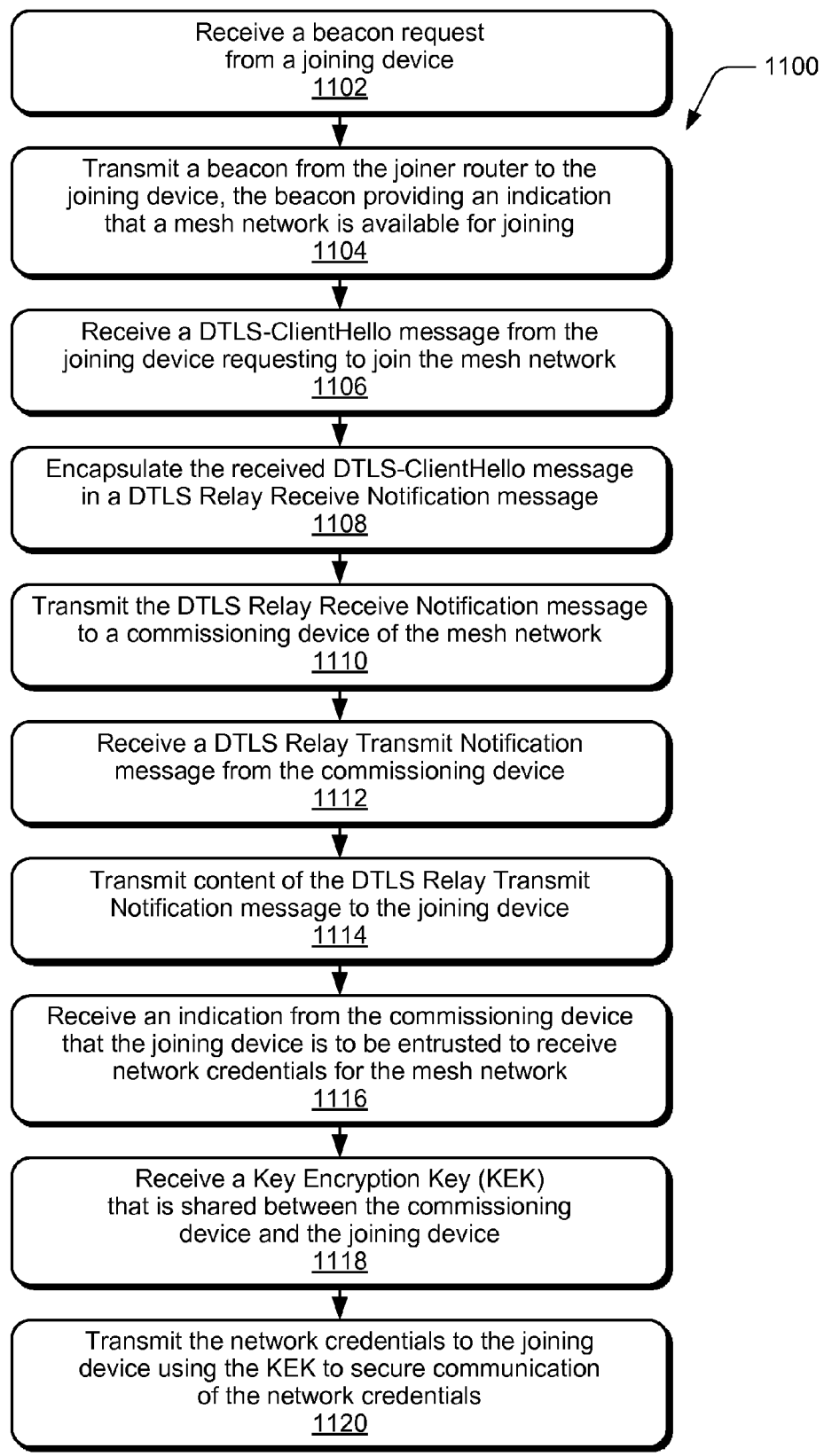
FIG. 11 illustrates another example method of mesh network commissioning as generally related to joining nodes in a mesh network in accordance with embodiments of the techniques described herein.

FIG. 11 illustrates example method(s) 1100 of mesh network commissioning as generally related to joining nodes in a mesh network. The order in which the method blocks are described are not intended to be construed as a limitation, and any number of the described method blocks can be combined in any order to implement a method, or an alternate method.

At block 1102, a beacon request is received from a joining device and, at block 1104, a beacon is transmitted from the joiner router to the joining device, where the beacon provides an indication that a mesh network is available for joining. For example, a joiner router 214 in a mesh network 100 receives a beacon request from a joining device 212 and then transmits a beacon to the joining device, where the beacon provides an indication that the mesh network 100 is available for joining. The beacon includes a network name of the mesh network 100 and steering data that indicates one or more joining devices 212 that are allowed to join the mesh network. The transmitted beacon is effective to enable the joining device to establish a local link between the joining device and the joiner router.

At block 1106, a DTLS-ClientHello message is received from the joining device requesting to join the mesh network and, at block 1108, the received DTLS-ClientHello message is encapsulated in a DTLS Relay Receive Notification message. For example, the joiner router receives a DTLS-ClientHello message from the joining device 212 requesting to join the mesh network 100 and encapsulates the received DTLS-ClientHello message in a DTLS Relay Receive Notification message. The DTLS-ClientHello message can be received from the joining device 212 utilizing User Datagram Protocol (UDP), and the DTLS Relay Receive Notification message includes an address of the joining device 212, an address of the joiner router 214, and the received DTLS-ClientHello message.

At block 1110, the DTLS Relay Receive Notification message is transmitted to a commissioning device of the mesh network. For example, the joiner router transmits the DTLS Relay Receive Notification message to the commissioning device 210 of the mesh network 100. In implementations, the joiner router may apply rate limiting to the transmission of DTLS Relay Receive Notification messages transmitted to the commissioning device 210 from joining devices.

At block 1112, a DTLS Relay Transmit Notification message is received from the commissioning device and, at block 1114, content of the DTLS Relay Transmit Notification message is transmitted to the joining device, where the content enables the joining device to join the mesh network. For example, the joiner router receives a DTLS Relay Transmit Notification message from the commissioning device 210 and transmits content of the DTLS Relay Transmit Notification message to the joining device 212, where the content enables the joining device to join the mesh network 100 and the content is effective to establish a secure communication session between the commissioning device 210 and the joining device. The DTLS Relay Transmit Notification message includes the address of the joining device 212, the address of the joiner router 214, and a DTLS-HelloVerify message.

At block 1116, an indication is received from the commissioning device that the joining device is to be entrusted to receive network credentials for the mesh network and, at block 1118, a Key Encryption Key (KEK) is received that is shared between the commissioning device and the joining device. For example, the joiner router 214 receives an indication from the commissioning device 210 that the joining device 212 is to be entrusted to receive network credentials for the mesh network 100, as well as receives a Key Encryption Key (KEK) that is shared between the commissioning device 210 and the joining device.

At block 1120, the network credentials are transmitted to the joining device using the KEK to secure communication of the network credentials. For example, the joiner router transmits the network credentials, which include a network master key, to the joining device 212 using the KEK to secure communication of the network credentials, and the secure communication session is usable to perform provisioning of the joining device.

Figure 12:
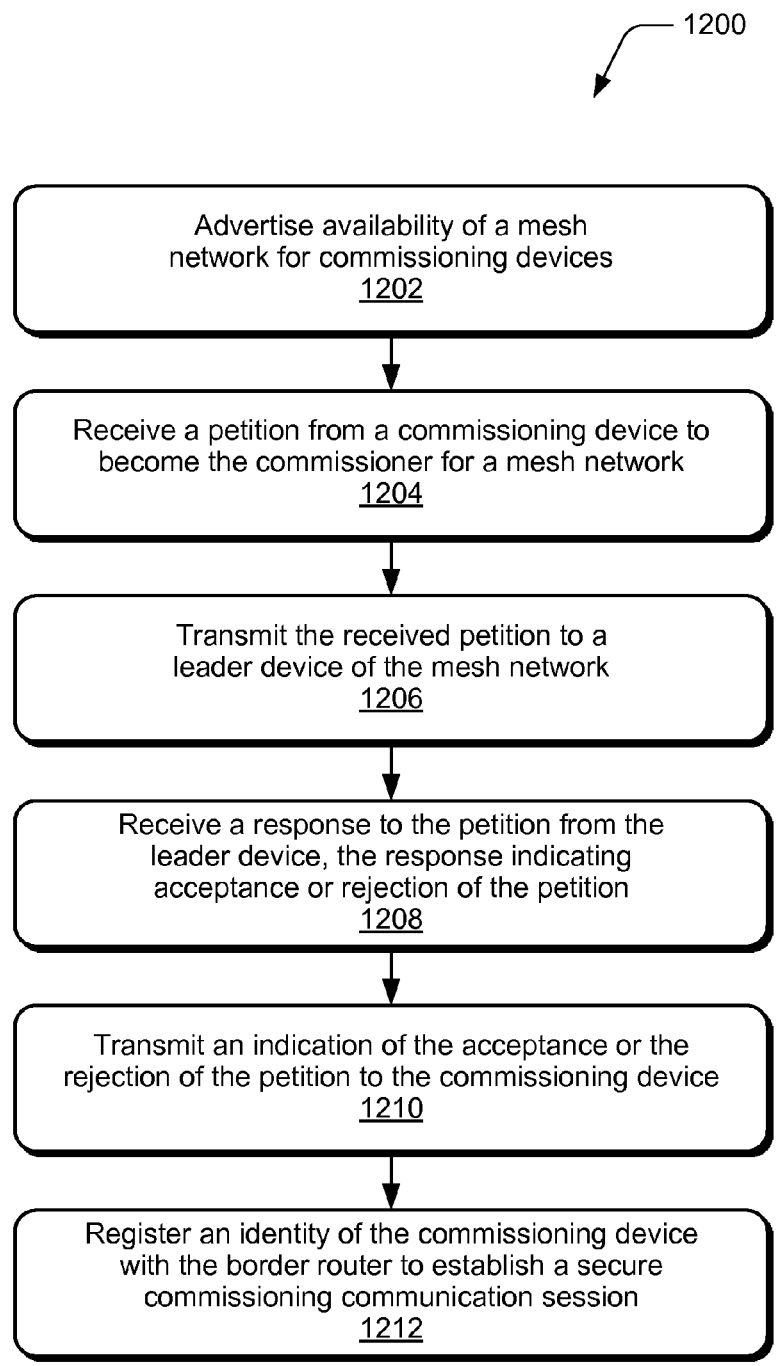
FIG. 12 illustrates an example method of mesh network commissioning as generally related to establishing a commissioning session in a mesh network in accordance with embodiments of the techniques described herein.

FIG. 12 illustrates example method(s) 1200 of mesh network commissioning as generally related to establishing a commissioning session in a mesh network. The order in which the method blocks are described are not intended to be construed as a limitation, and any number of the described method blocks can be combined in any order to implement a method, or an alternate method.

At block 1202, the availability of a mesh network is advertised for commissioning devices and, at block 1204, a petition is received from a commissioning device to become the commissioner for a mesh network. For example, a border router 202 of a mesh network 100 advertises the availability of the mesh network for commissioning devices, and receives a petition from a commissioning device 210 to become the commissioner for the mesh network. The petition can be received from the commissioning device 210 in response to advertising the availability of the mesh network. The commissioning device 210 to can also request to securely connect to the border router 202, and the secure connection is established using Datagram Transport Layer Security (DTLS). Additionally, the commissioning device 210 and the border router 202 can communicate over a network other than the mesh network, such as over a Wi-Fi network or an Ethernet network.

At block 1206, the received petition is transmitted to a leader device of the mesh network and, at block 1208, Receive a response to the petition from the leader device, the response indicating acceptance or rejection of the petition. For example, the border router 202 transmits the received petition from the commissioning device 210 to a leader device 216 of the mesh network 100 and, then receives a response to the petition from the leader device 216, where the response indicates acceptance or rejection of the petition.

The advertising can be performed using a service discovery protocol that is Multicast Domain Name System (mDNS).

At block 1210, an indication of the acceptance or the rejection of the petition is transmitted to the commissioning device. For example, the border router 202 transmits an indication of the acceptance or the rejection of the petition to the commissioning device 210, and acceptance of the petition by the leader device 216 authorizes the commissioning device 210 to be the commissioner for the mesh network. The acceptance of the petition establishes a secure commissioning session, and the acceptance of the petition enables the leader device 216 to update an internal state that tracks an active commissioner for the mesh network, set a permit-join flag for the mesh network to true, and propagate a commissioning dataset within the mesh network.

At block 1212, an identity of the commissioning device is registered with the border router to establish a secure commissioning communication session. For example, the border router 202 registers the identity of the commissioning device 210 with the border router 202 to establish the secure commissioning communication session. Registering the identity of the commissioning device 210 includes providing an encrypted commissioning credential to the border router 202, wherein the encrypted commissioning credential was derived from a commissioning credential input to the commissioning device 210 by a user. The border router 202 includes a copy of the encrypted commissioning credential usable to authenticate the commissioning device 210 to the mesh network 100, where the copy of the encrypted commissioning credential was previously derived from the commissioning credential, the commissioning credential was injected into the leader device 216 of the mesh network 100 that derived the copy of the encrypted commissioning credential, and the leader device 216 communicated the copy of the encrypted commissioning credential securely to the border router.

Figure 13:
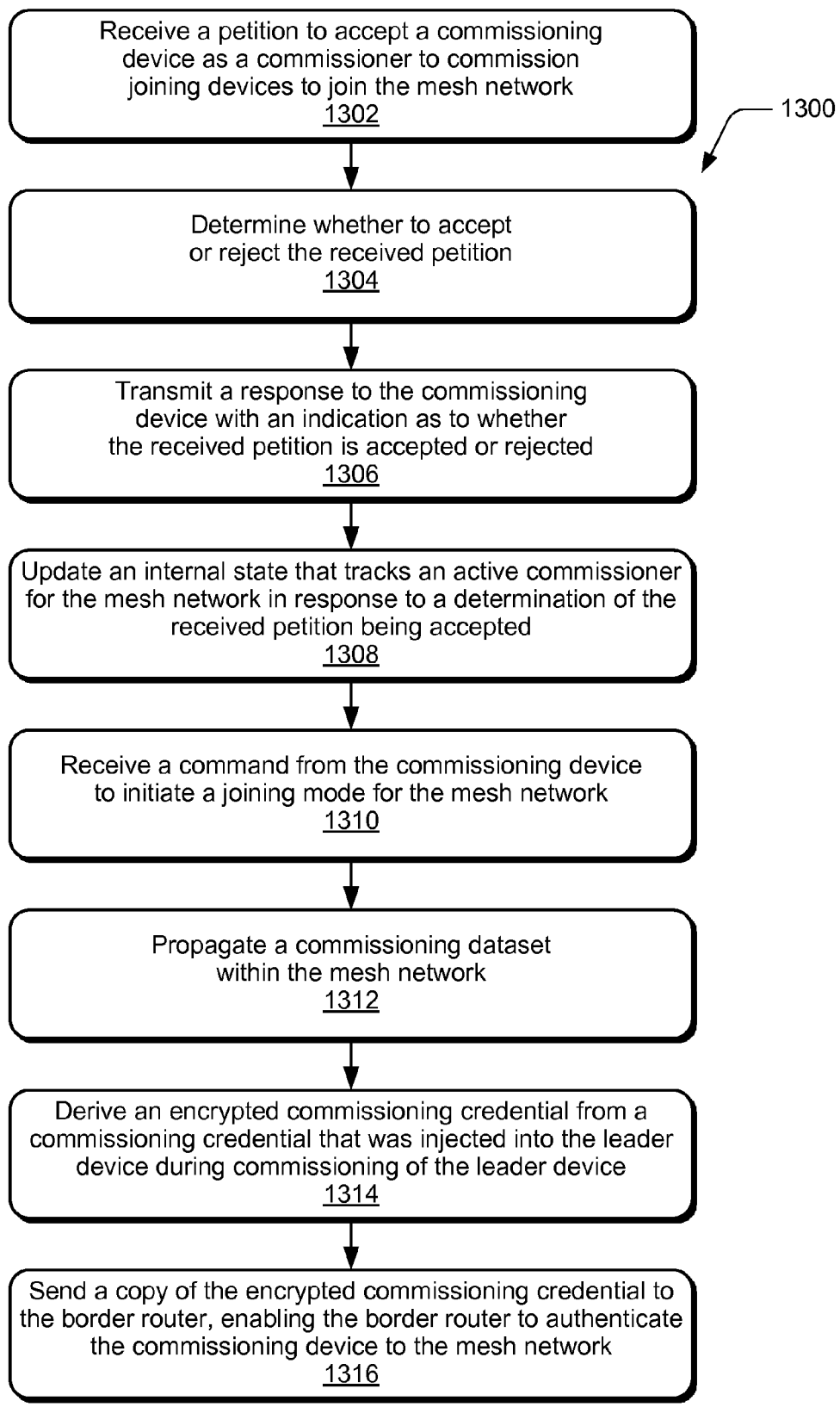
FIG. 13 illustrates another example method of mesh network commissioning as generally related to establishing a commissioning session in a mesh network in accordance with embodiments of the techniques described herein.

FIG. 13 illustrates example method(s) 1300 of mesh network commissioning as generally related to establishing a commissioning session in a mesh network. The order in which the method blocks are described are not intended to be construed as a limitation, and any number of the described method blocks can be combined in any order to implement a method, or an alternate method.

At block 1302, a petition is received to accept a commissioning device as a commissioner to commission joining devices to join the mesh network. For example, a leader device 216 of the mesh network 100 receives a petition to accept a commissioning device 210 as a commissioner to commission joining devices 212 to join the mesh network. The petition is received from a border router 202 that is connected to the leader device 216 over the mesh network, and the commissioning device 210 is connected to the border router 202 over another network, such as a Wi-Fi network or an Ethernet network. Further, the petition is received using a secure communication session between the border router 202 and the commissioning device 210, where the secure communication session is established using Datagram Transport Layer Security (DTLS). The leader device 216 can receive the petition over the mesh network 100 from the commissioning device 210 that includes a network interface for the mesh network, and the commissioning device 210 petitions to be the commissioner by setting a native commissioner bit to true in a network beacon. The commissioning device 210 can communicate the petition using an IEEE 802.15.4 interface over a Constrained Application Protocol (CoAP) port to the leader device.

At block 1304, a determination is made as to whether to accept or reject the received petition and, at block 1306, a response is transmitted to the commissioning device with an indication as to whether the received petition is accepted or rejected. For example, the leader device 216 determines whether to accept or reject the received petition and, then transmits a response to the commissioning device 210 with an indication as to whether the received petition is accepted or rejected. The leader device 216 determines whether to accept or reject the received petition based on ensuring that there is a single active commissioner for the mesh network 100.

At block 1308, an internal state that tracks an active commissioner for the mesh network is updated in response to a determination of the received petition being accepted. For example, the leader device 216 updates an internal state that tracks an active commissioner for the mesh network.

At block 1310, a command is received from the commissioning device to initiate a joining mode for the mesh network and, at block 1312, a commissioning dataset is propagated within the mesh network. For example, the leader device 216 receives a command from the commissioning device 210 to initiate a joining mode for the mesh network 100, and propagates a commissioning dataset within the mesh network. The commissioning dataset includes a commissioner session identifier, a commissioner timestamp, an encrypted commissioner credential, and a security policy that indicates which security-related operations are allowed in the mesh network. When the commissioner is active on the mesh network 100, the commissioning dataset further comprises a location of the border router 202. When a joining mode is enabled in the mesh network, the commissioning data set further comprises steering data that indicates which of the joining devices 212 are allowed to join the mesh network.

At block 1314, an encrypted commissioning credential is derived from a commissioning credential that was injected into the leader device 216 during commissioning of the leader device. For example, the leader device 216 derives an encrypted commissioning credential from a commissioning credential that was injected into the leader device during commissioning of the leader device. The derivation of the encrypted commissioning credential is performed by applying a key derivation function, where the key derivation function performs a hashing multiple times using a Cipher-based Message Authentication Code (CMAC). In implementations, the commissioning credential is a human-scaled passphrase, and the derivation of the encrypted commissioning credential is effective to stretch the length of the commissioning credential.

At block 1316, a copy of the encrypted commissioning credential is sent to the border router, enabling the border router to authenticate the commissioning device to the mesh network. For example, the leader device 216 sends a copy of the encrypted commissioning credential to the border router 202, enabling the border router 202 to authenticate the commissioning device 210 to the mesh network.

Figure 14:
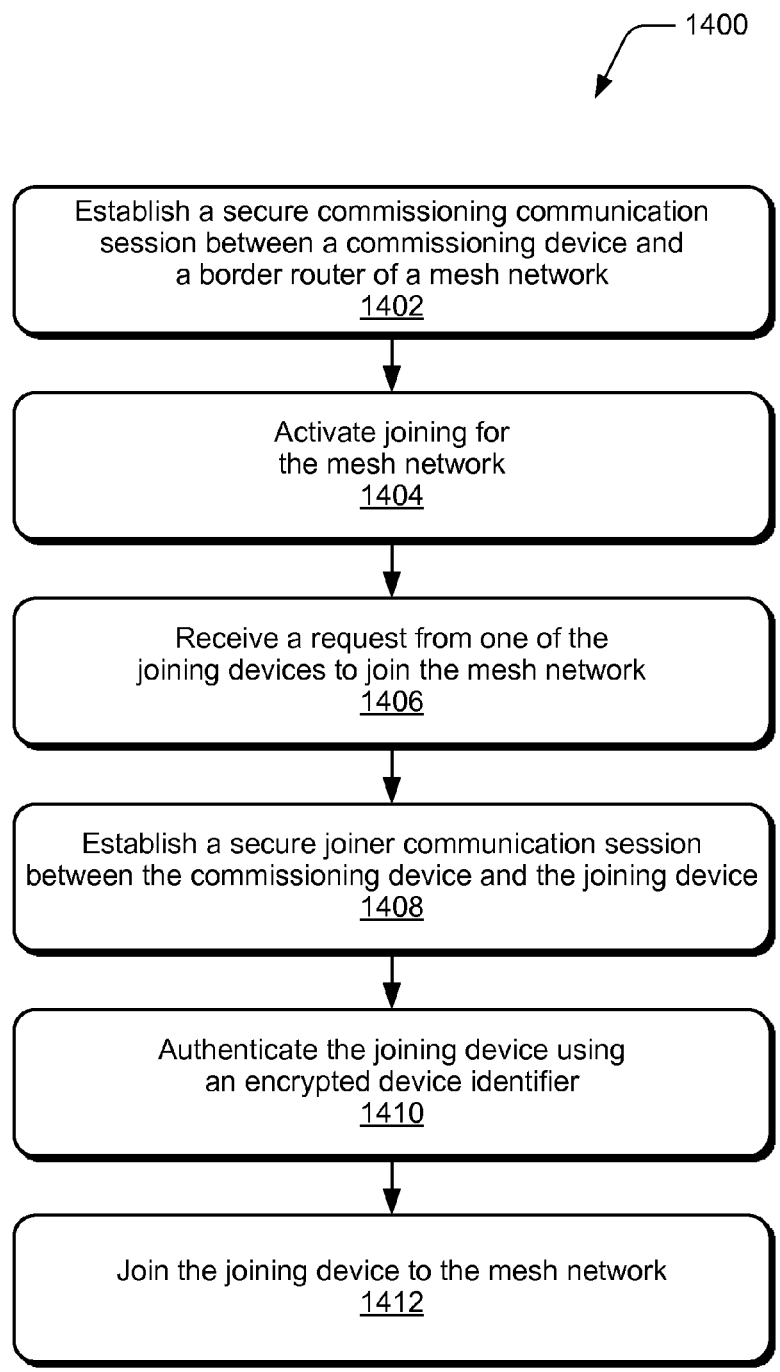
FIG. 14 illustrates an example method of mesh network commissioning as generally related to managing multiple commissioning sessions in a mesh network in accordance with embodiments of the techniques described herein.

FIG. 14 illustrates example method(s) 1400 of mesh network commissioning as generally related to managing multiple commissioning sessions in a mesh network. The order in which the method blocks are described are not intended to be construed as a limitation, and any number of the described method blocks can be combined in any order to implement a method, or an alternate method.

At block 1402, a secure commissioning communication session is established between a commissioning device and a border router of a mesh network. For example, a commissioning device 210 establishes a secure commissioning communication session between the commissioning device and a border router 202 of a mesh network 100 to securely establish network communication sessions for joining one or more joining devices 212 to the mesh network. The commissioning device 210 establishes the secure commissioning communication session by sending a petition from the commissioning device to a leader device 216 of the mesh network 100 to request acceptance of the commissioning device 210 as an active commissioner for the mesh network, and the commissioning device receives an indication of an acceptance of the petition from the leader device.

At block 1404, joining for the mesh network is activated. For example, the commissioning device activates joining for the mesh network by initiating a joining mode that causes one or more routers in the mesh network to advertise the mesh network is accepting joining requests. The commissioning device 210 can also activate joining for the mesh network 100 by sending a management message to a leader device 216 to make the mesh network joinable, where the management message enables the leader device 216 to update network data for the mesh network. The network data is propagated to one or more router devices in the mesh network, where the network data includes an indication that the mesh network 100 is available for joining. The network data can be broadcast in a beacon by the router devices, and the management message includes steering data that indicates one or more joining devices 212 that the commissioning device 210 is configured to join to the mesh network.

At block 1406, a request is received from one of the joining devices to join the mesh network. For example, the commissioning device 210 receives a request from one of the joining devices 212 to join the mesh network 100, and the request may be received via a joiner router. The commissioning device 210 can transmit, to the joiner router 214, an indication that the joining device 212 is to be entrusted to receive network credentials for the mesh network 100 and a Key Encryption Key (KEK), which is shared between the commissioning device 210 and the joining device. The indication that is transmitted to the joiner router 214 enables the joiner router to use the received KEK to securely transmit the network credentials to the joining device 212 to commission the joining device to the mesh network. The request received from the joining device 212 can include an encrypted device identifier of the joining device, where the encrypted device identifier is derived from a device identifier of the joining device using Password Authentication Key Exchange by Juggling (J-PAKE).

At block 1408, a secure joiner communication session is established between the commissioning device and the joining device. For example, the commissioning device 210 establishes a secure joiner communication session between the commissioning device and the joining device 212. The commissioning device 210 can establish the secure joiner communication session by determining that the encrypted device identifier received from the joining device 212 matches an encrypted device identifier derived by the commissioning device 210 from a copy of the device identifier that is received as an input to the commissioning device from a user, and the commissioning device 210 uses the encrypted device identifier as a shared secret to secure the joiner communication session.

At block 1410, the joining device is authenticated using an encrypted device identifier and, at block 1412, the joining device is joined to the mesh network. For example, the commissioning device 210 authenticates the joining device 212 using an encrypted device identifier, and joins the joining device 212 to the mesh network.

Figure 15:
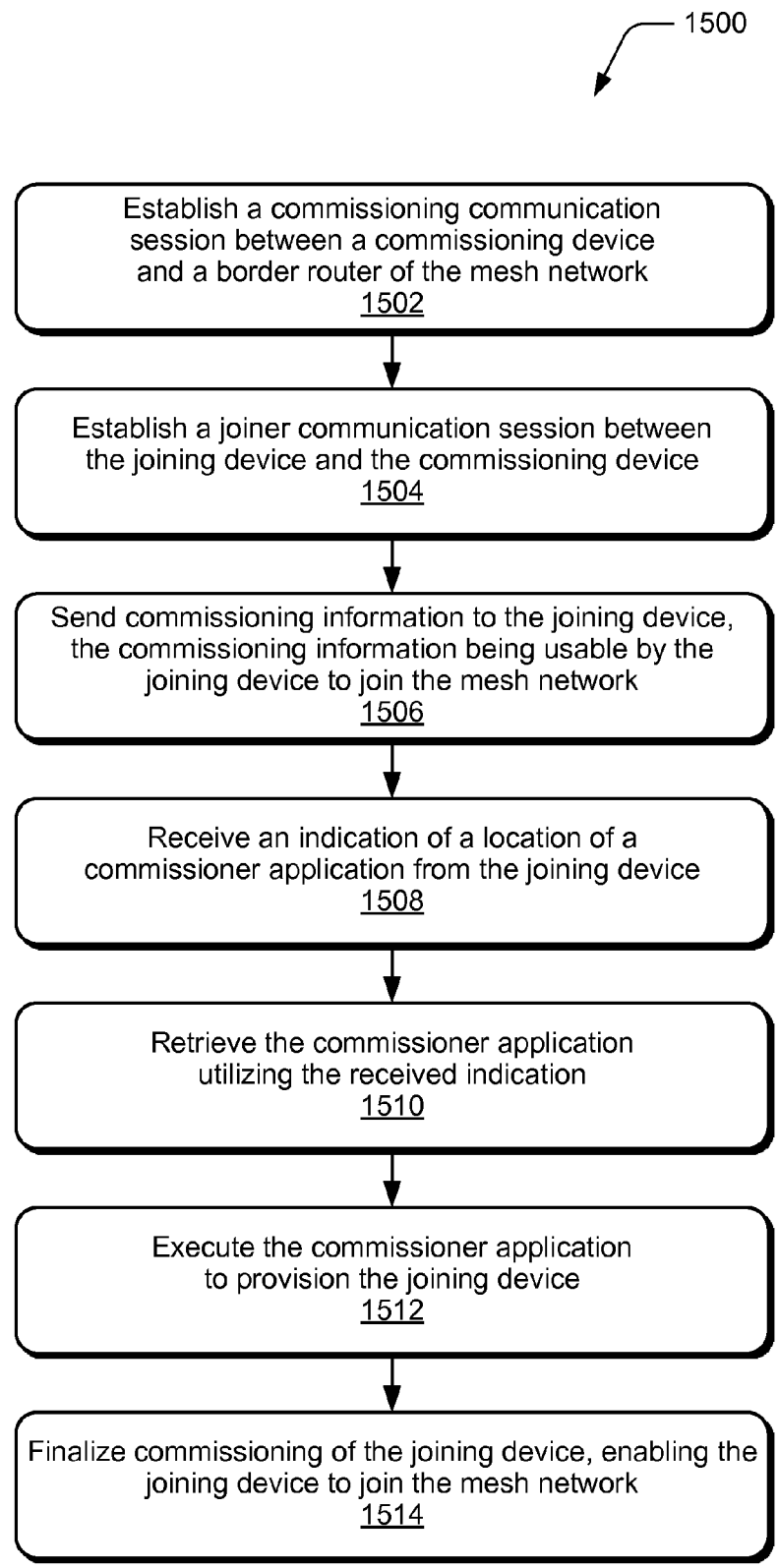
FIG. 15 illustrates an example method of mesh network commissioning as generally related to provisioning a joining device in a mesh network in accordance with embodiments of the techniques described herein.

FIG. 15 illustrates example method(s) 1500 of mesh network commissioning as generally related to provisioning a joining device in a mesh network. The order in which the method blocks are described are not intended to be construed as a limitation, and any number of the described method blocks can be combined in any order to implement a method, or an alternate method.

At block 1502, a commissioning communication session is established between a commissioning device and a border router of a mesh network. For example, the commissioning device 210 of the mesh network 100 establishes a commissioning communication session between the commissioning device 210 and a border router 202 of the mesh network. At block 1504, a joiner communication session is established between the joining device and the commissioning device. For example, the commissioning device 210 of the mesh network 100 stablishes a joiner communication session between the joining device 212 and the commissioning device.

At block 1506, commissioning information is sent to the joining device, where the commissioning information is usable by the joining device to join the mesh network. For example, the commissioning device 210 of the mesh network 100 sends the joining device the commissioning information that the joining device 212 can use to join the mesh network.

At block 1508, an indication of a location of a commissioner application is received from the joining device and, at 1510, the commissioner application is retrieved utilizing the received indication. For example, the commissioning device 210 receives a location indication of the commissioner application from the joining device, where the received location indication can be a Uniform Resource Locator (URL) and the commissioning application retrieves the commissioner application over the Internet from a cloud service. The commissioning device 210 can also use the received URL to determine if the commissioner application is stored in a memory of the commissioning device.

At block 1512, the commissioner application is executed to provision the joining device. For example, the commissioning device 210 utilizes the commissioner application to provision the joining device. The provisioning of the joining device 212 can include updating software on the joining device, linking the joining device to a user account on a cloud service, and/or configuring the joining device, where the configuration is a local configuration related to other devices in the mesh network. At block 1514, commissioning of the joining device is finalized, enabling the joining device to join the mesh network. For example, the commissioning device 210 of the mesh network 100 finalizes the commissioning, enabling the joining device 212 to join the mesh network.

Figure 16:
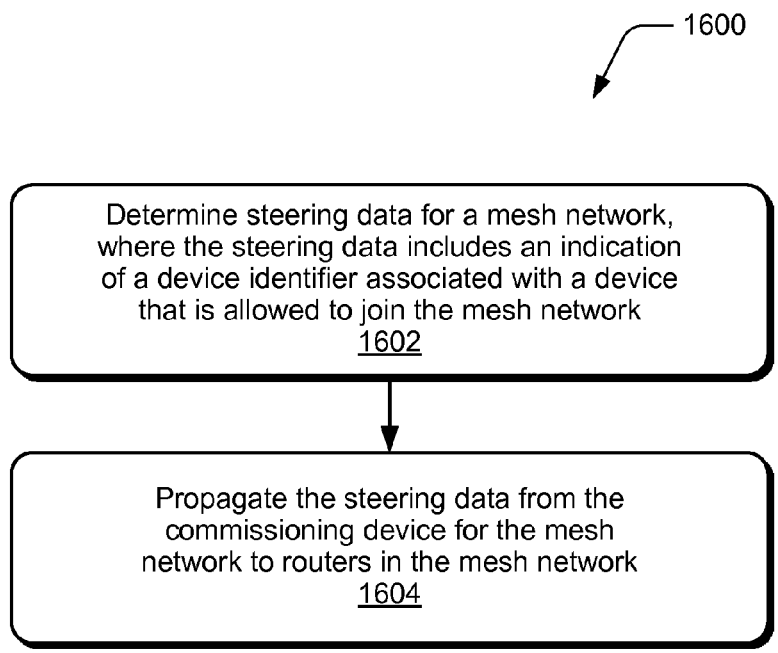
FIG. 16 illustrates an example method of mesh network commissioning as generally related to hunting and steering in a mesh network in accordance with embodiments of the techniques described herein.

FIG. 16 illustrates example method(s) 1600 of mesh network commissioning as generally related to hunting and steering in a mesh network. The order in which the method blocks are described are not intended to be construed as a limitation, and any number of the described method blocks can be combined in any order to implement a method, or an alternate method.

At block 1602, steering data for a mesh network is determined, where the steering data includes an indication of a device identifier associated with a device that is allowed to join the mesh network. For example, the commissioning device 210 of the mesh network 100 determines the steering data for the mesh network, and the steering data includes an indication of a device identifier associated with a device that is allowed to join the mesh network. In implementations, the steering data is a 16-bit Cyclic Redundancy Check (CRC16) of the device identifier, which is an IEEE 64-bit Extended Unique Identifier (EUI-64). The commissioning device 210 may also determine the steering data for the mesh network 100 by determining the steering data for additional device identifiers associated with additional devices that are allowed to join the mesh network.

At block 1604, the steering data is propagated from the commissioning device for the mesh network to routers in the mesh network. For example, the commissioning device 210 of the mesh network 100 propagates the steering data to routers in the mesh network, and the steering data indicates that a commissioner is active on the mesh network. Propagating the steering data enables the routers 102 to transmit the steering data in a beacon message, and the steering data is effective to enable the device associated with the device identifier to identify that the device is allowed to join the mesh network. The commissioning device 210 propagating the steering data is effective to enable the device to distinguish the mesh network from other networks, where the other networks are IEEE 802.15.4 networks.

Figure 17:
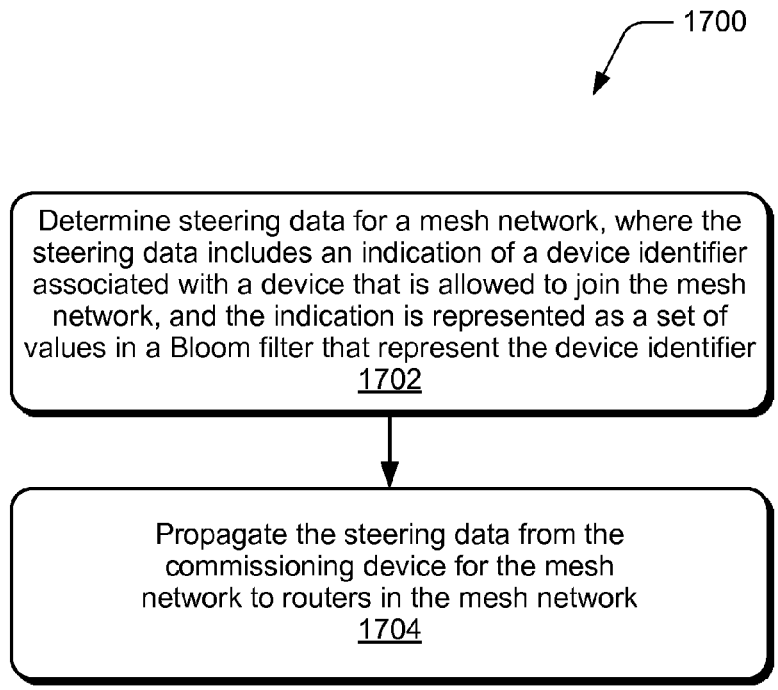
FIG. 17 illustrates another example method of mesh network commissioning as generally related to hunting and steering in a mesh network in accordance with embodiments of the techniques described herein.

FIG. 17 illustrates example method(s) 1700 of mesh network commissioning as generally related to hunting and steering in a mesh network. The order in which the method blocks are described are not intended to be construed as a limitation, and any number of the described method blocks can be combined in any order to implement a method, or an alternate method.

At block 1702, steering data for a mesh network is determined, where the steering data includes an indication of a device identifier associated with a device that is allowed to join the mesh network, and the indication is represented as a set of values in a Bloom filter that represent the device identifier. For example, the commissioning device 210 of the mesh network 100 determines the steering data for the mesh network, and the steering data includes an indication represented as a set of values in a Bloom filter that represent the device identifier. In implementations, the commissioning device 210 determines the steering data by applying a first hash function to the device identifier to produce a first hash value, and applying a second hash function to the device identifier to produce a second hash value. The device identifier can be an IEEE 64-bit Extended Unique Identifier (EUI-64), where the device identifier is the least significant twenty-four bits of the EUI-64. In implementations, the first and second hash functions are Cyclic Redundancy Checks (CRC), with the first hash function being a CRC16-CCITT, and the second hash function being a CRC16-ANSI.

The commissioning device 210 then performs a modulo operation on the first hash value to determine a first bit field location in the Bloom filter, and performs the modulo operation on the second hash value to determine a second bit field location in the Bloom filter. A divisor for the modulo operation can be the length of a bit array of the Bloom filter. The commissioning device 210 can set a value in the first bit field location of the Bloom filter to one, and set the value in the second bit field location of the Bloom filter to one. The commissioning device 210 can set all of the bit field values in the steering data to a value of one to indicate that the mesh network is joinable for any device. Alternatively, the commissioning device 210 can set the bit field values of the steering data to a value of zero, which disables joining for the mesh network.

At block 1704, the steering data is propagated from the commissioning device for the mesh network to routers in the mesh network. For example, the commissioning device 210 of the mesh network 100 propagates the steering data to routers in the mesh network, and the steering data indicates that a commissioner is active on the mesh network. Propagating the steering data enables the routers 102 to transmit the steering data in a beacon message, and the steering data enables the device associated with the device identifier to compare the set of values in the Bloom filter to a second set of values determined at the device to identify that the device is allowed to join the mesh network.

Figure 18:
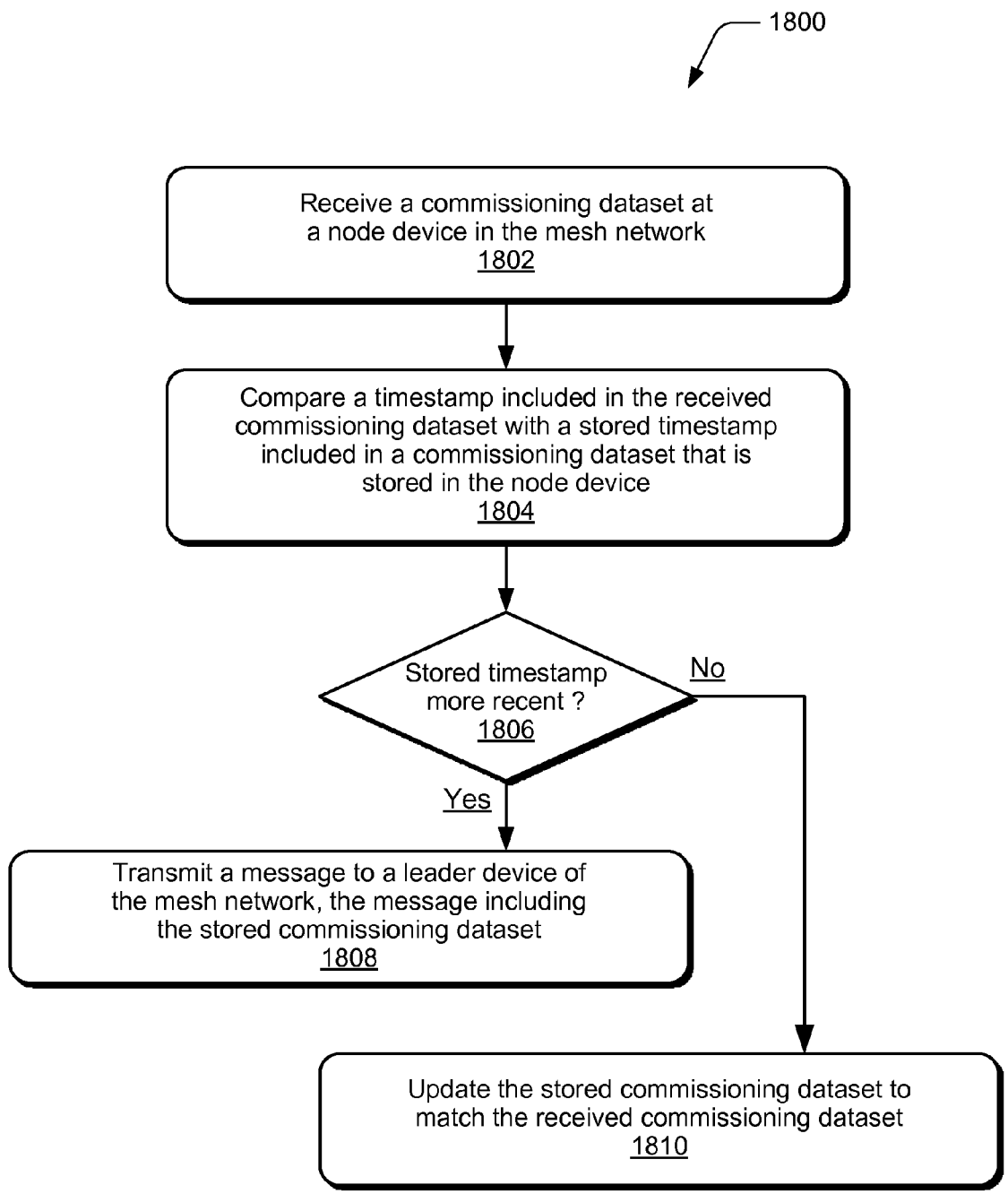
FIG. 18 illustrates an example method of mesh network commissioning as generally related to partitioning nodes in a mesh network in accordance with embodiments of the techniques described herein.

FIG. 18 illustrates example method(s) 1800 of mesh network commissioning as generally related to partitioning nodes in a mesh network. The order in which the method blocks are described are not intended to be construed as a limitation, and any number of the described method blocks can be combined in any order to implement a method, or an alternate method.

At block 1802, a commissioning dataset is received at a node device in the mesh network. For example, a node device (e.g., a router 102 or an end device 106) at a node in a mesh network 100 receives a commissioning dataset that includes a received timestamp, a commissioning credential, a network name of the mesh network, and a security policy that indicates which security-related operations are allowed in the mesh network. The received timestamp includes a time value, and an indication that the time value is traceable to Coordinated Universal Time (UTC).

At block 1804, the received timestamp that is included in the received commissioning dataset is compared with a stored timestamp included in a commissioning dataset that is stored in the node device. For example, the node device in the mesh network 100 compares the received timestamp in the received commissioning dataset with a stored timestamp included in the commissioning dataset that is stored in the node device. In implementations, the node device and the leader device were previously commissioned to the mesh network, and the previous commissioning stored identical commissioning datasets in the node device and the leader device. The stored commissioning dataset in the node device can be updated after a split of the mesh network that stops communication between the node device and the leader device over the mesh network. The split separates the mesh network and a first partition of the mesh network includes the leader device, and a second partition of the mesh network includes the node device. The node device can receive the commissioning dataset after a merge of the first partition and the second partition of the mesh network, where the merge reestablishes a communication path between the node device and the leader device over the mesh network.

At block 1806, a determination is made as to whether the stored timestamp that is included in the commissioning dataset stored in the node device is more recent than the timestamp included in the received commissioning dataset. For example, based on the comparison (at block 1806), the node device determines whether the stored timestamp that is included in the commissioning dataset stored in the node device is more recent than the timestamp included in the received commissioning dataset.

Figure 19:
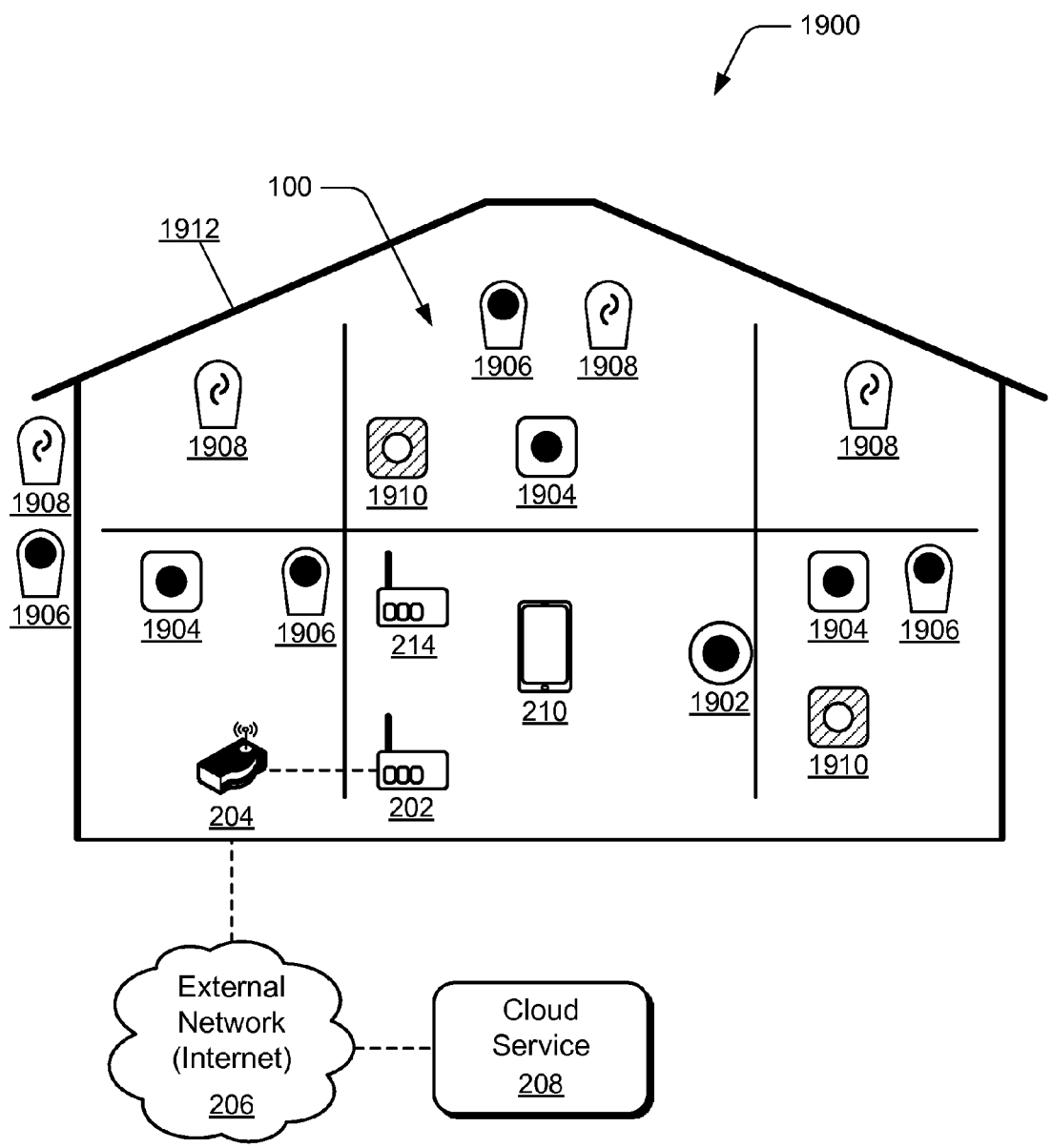
FIG. 19 illustrates an example environment in which a mesh network can be implemented in accordance with embodiments of the techniques described herein.

If the stored timestamp is more recent than the received timestamp (i.e., "Yes" from 1806), then at 1808, a message is transmitted to a leader device of the mesh network, the message including the stored commissioning dataset. For example, the node device in the mesh network transmits a message that includes the stored commissioning dataset to a leader device of the mesh network 100. The transmitted message enables the leader device to accept the stored commissioning dataset as the most recent commissioning dataset for the mesh network, and propagate the stored commissioning dataset to the mesh network. Alternatively, if the received timestamp is more recent than the stored timestamp (i.e., "No" from 1806), then at 1810, the stored commissioning dataset is updated to match the received commissioning dataset. For example, the node device in the mesh network updates the stored commissioning dataset to match the received commissioning dataset FIG. 19 illustrates an example environment 1900 in which the mesh network 100 (as described with reference to FIG. 1), and embodiments of mesh network commissioning can be implemented. Generally, the environment 1900 includes the mesh network 100 implemented as part of a smart-home or other type of structure with any number of mesh network devices that are configured for communication in a mesh network. For example, the mesh network devices can include a thermostat 1902, hazard detectors 1904 (e.g., for smoke and/or carbon monoxide), cameras 1906 (e.g., indoor and outdoor), lighting units 1908 (e.g., indoor and outdoor), and any other types of mesh network devices 1910 that are implemented inside and/or outside of a structure 1912 (e.g., in a smart-home environment). In this example, the mesh network devices can also include any of the previously described devices, such as a commissioning device 210, a border router 202, a joiner router 214, as well as any of the devices implemented as a router 102, an end device 106, and/or a joining device 212.

In the environment 1900, any number of the mesh network devices can be implemented for wireless interconnection to wirelessly communicate and interact with each other. The mesh network devices are modular, intelligent, multi-sensing, network-connected devices, that can integrate seamlessly with each other and/or with a central server or a cloud-computing system to provide any of a variety of useful smart-home objectives and implementations. An example of a mesh network device that can be implemented as any of the devices described herein is shown and described with reference to FIG. 20.

In implementations, the thermostat 1902 may include a Nest® Learning Thermostat that detects ambient climate characteristics (e.g., temperature and/or humidity) and controls a HVAC system in the smart-home environment. The learning thermostat 1902 and other smart devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 1904 can be implemented to detect the presence of a hazardous substance or a substance indicative of a hazardous substance (e.g., smoke, fire, or carbon monoxide). In examples of wireless interconnection, a hazard detector 1904 may detect the presence of smoke, indicating a fire in the structure, in which case the hazard detector that first detects the smoke can broadcast a low-power wake-up signal to all of the connected mesh network devices. The other hazard detectors 1904 can then receive the broadcast wake-up signal and initiate a high-power state for hazard detection and to receive wireless communications of alert messages. Further, the lighting units 1908 can receive the broadcast wake-up signal and activate in the region of the detected hazard to illuminate and identify the problem area. In another example, the lighting units 1908 may activate in one illumination color to indicate a problem area or region in the structure, such as for a detected fire or break-in, and activate in a different illumination color to indicate safe regions and/or escape routes out of the structure.

In various configurations, the mesh network devices 1910 can include an entryway interface device that functions in coordination with a network-connected door lock system, and that detects and responds to a person's approach to or departure from a location, such as an outer door of the structure 1912. The entryway interface device can interact with the other mesh network devices based on whether someone has approached or entered the smart-home environment. An entryway interface device can control doorbell functionality, announce the approach or departure of a person via audio or visual means, and control settings on a security system, such as to activate or deactivate the security system when occupants come and go. The mesh network devices 1910 can also include other sensors and detectors, such as to detect ambient lighting conditions, detect room-occupancy states (e.g., with an occupancy sensor), and control a power and/or dim state of one or more lights. In some instances, the sensors and/or detectors may also control a power state or speed of a fan, such as a ceiling fan. Further, the sensors and/or detectors may detect occupancy in a room or enclosure, and control the supply of power to electrical outlets or devices, such as if a room or the structure is unoccupied.

The mesh network devices 1910 may also include connected appliances and/or controlled systems, such as refrigerators, stoves and ovens, washers, dryers, air conditioners, pool heaters, irrigation systems, security systems, and so forth, as well as other electronic and computing devices, such as televisions, entertainment systems, computers, intercom systems, garage-door openers, ceiling fans, control panels, and the like. When plugged in, an appliance, device, or system can announce itself to the mesh network as described above, and can be automatically integrated with the controls and devices of the mesh network, such as in the smart-home. It should be noted that the mesh network devices 1910 may include devices physically located outside of the structure, but within wireless communication range, such as a device controlling a swimming pool heater or an irrigation system.

As described above, the mesh network 100 includes a border router 202 that interfaces for communication with an external network, outside the mesh network 100. The border router 202 connects to an access point 204, which connects to the communication network 206, such as the Internet. A cloud service 208, which is connected via the communication network 206, provides services related to and/or using the devices within the mesh network 100. By way of example, the cloud service 208 can include applications for connecting end user devices, such as smart phones, tablets, and the like, to devices in the mesh network, processing and presenting data acquired in the mesh network 100 to end users, linking devices in one or more mesh networks 100 to user accounts of the cloud service 208, provisioning and updating devices in the mesh network 100, and so forth. For example, a user can control the thermostat 1902 and other mesh network devices in the smart-home environment using a network-connected computer or portable device, such as a mobile phone or tablet device. Further, the mesh network devices can communicate information to any central server or cloud-computing system via the border router 202 and the access point 204. The data communications can be carried out using any of a variety of custom or standard wireless protocols (e.g., Wi-Fi, ZigBee for low power, 6LoWPAN, etc.) and/or by using any of a variety of custom or standard wired protocols (CAT6 Ethernet, HomePlug, etc.).

Any of the mesh network devices in the mesh network 100 can serve as low-power and communication nodes to create the mesh network 100 in the smart-home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the mesh network. The mesh network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor detects that the room is dark and when the occupancy sensor detects that someone is in the room. Further, the sensor can include a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment as well as over the Internet to a central server or cloud-computing system.

In other configurations, various ones of the mesh network devices can function as "tripwires" for an alarm system in the smart-home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the mesh network. In other implementations, the mesh network can be used to automatically turn on and off the lighting units 1908 as a person transitions from room to room in the structure. For example, the mesh network devices can detect the person's movement through the structure and communicate corresponding messages via the nodes of the mesh network. Using the messages that indicate which rooms are occupied, other mesh network devices that receive the messages can activate and/or deactivate accordingly. As referred to above, the mesh network can also be utilized to provide exit lighting in the event of an emergency, such as by turning on the appropriate lighting units 1908 that lead to a safe exit. The light units 1908 may also be turned-on to indicate the direction along an exit route that a person should travel to safely exit the structure.

The various mesh network devices may also be implemented to integrate and communicate with wearable computing devices, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other mesh network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the mesh network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the mesh network, conforming to the wireless interconnection protocols for communicating on the mesh network.

The mesh network devices 1910 may also include a smart alarm clock for each of the individual occupants of the structure in the smart-home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the mesh network based on a unique signature of the person, which is determined based on data obtained from sensors located in the mesh network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 1902 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other mesh network devices can use the data to provide other smart-home objectives, such as adjusting the thermostat 1902 so as to pre-heat or cool the environment to a desired setting, and turning-on or turning-off the lights 1908.

In implementations, the mesh network devices can also be utilized for sound, vibration, and/or motion sensing such as to detect running water and determine inferences about water usage in a smart-home environment based on algorithms and mapping of the water usage and consumption. This can be used to determine a signature or fingerprint of each water source in the home, and is also referred to as "audio fingerprinting water usage." Similarly, the mesh network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

Figure 20:
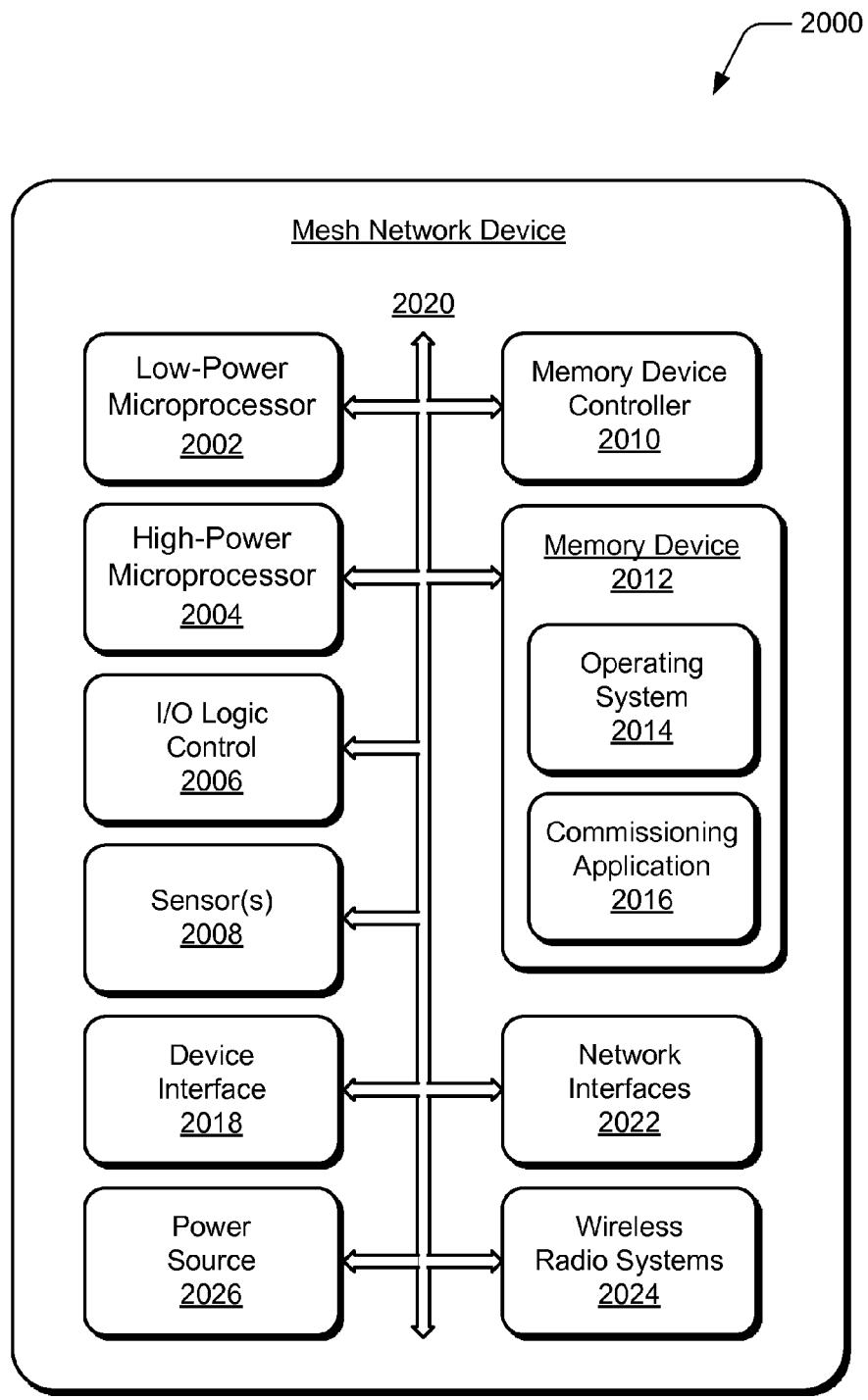
FIG. 20 illustrates an example mesh network device that can be implemented in a mesh network environment in accordance with one or more embodiments of the techniques described herein.

FIG. 20 illustrates an example mesh network device 2000 that can be implemented as any of the mesh network devices in a mesh network in accordance with one or more embodiments of mesh network commissioning as described herein. The device 2000 can be integrated with electronic circuitry, microprocessors, memory, input output (I/O) logic control, communication interfaces and components, as well as other hardware, firmware, and/or software to implement the device in a mesh network. Further, the mesh network device 2000 can be implemented with various components, such as with any number and combination of different components as further described with reference to the example device shown in FIG. 21.

In this example, the mesh network device 2000 includes a low-power microprocessor 2002 and a high-power microprocessor 2004 (e.g., microcontrollers or digital signal processors) that process executable instructions. The device also includes an input-output (I/O) logic control 2006 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 2002 and the high-power microprocessor 2004 can also support one or more different device functionalities of the device. For example, the high-power microprocessor 2004 may execute computationally intensive operations, whereas the low-power microprocessor 2002 may manage less complex processes such as detecting a hazard or temperature from one or more sensors 2008. The low-power processor 2002 may also wake or initialize the high-power processor 2004 for computationally intensive processes.

The one or more sensors 2008 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 2008 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the mesh network device 2000 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The mesh network device 2000 includes a memory device controller 2010 and a memory device 2012, such as any type of a nonvolatile memory and/or other suitable electronic data storage device. The mesh network device 2000 can also include various firmware and/or software, such as an operating system 2014 that is maintained as computer executable instructions by the memory and executed by a microprocessor. The device software may also include a commissioning application 2106 that implements embodiments of mesh network commissioning. The mesh network device 2000 also includes a device interface 2018 to interface with another device or peripheral component, and includes an integrated data bus 2020 that couples the various components of the mesh network device for data communication between the components. The data bus in the mesh network device may also be implemented as any one or a combination of different bus structures and/or bus architectures.

The device interface 2018 may receive input from a user and/or provide information to the user (e.g., as a user interface), and a received input can be used to determine a setting. The device interface 2018 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 2018 may also receive inputs from any number of peripherals, such as buttons, a keypad, a switch, a microphone, and an imager (e.g., a camera device).

The mesh network device 2000 can include network interfaces 2022, such as a mesh network interface for communication with other mesh network devices in a mesh network, and an external network interface for network communication, such as via the Internet. The mesh network device 2000 also includes wireless radio systems 2024 for wireless communication with other mesh network devices via the mesh network interface and for multiple, different wireless communications systems. The wireless radio systems 2024 may include Wi-Fi, Bluetooth™, Mobile Broadband, and/or point-to-point IEEE 802.15.4. Each of the different radio systems can include a radio device, antenna, and chipset that is implemented for a particular wireless communications technology. The mesh network device 2000 also includes a power source 2026, such as a battery and/or to connect the device to line voltage. An AC power source may also be used to charge the battery of the device.

Figure 21:
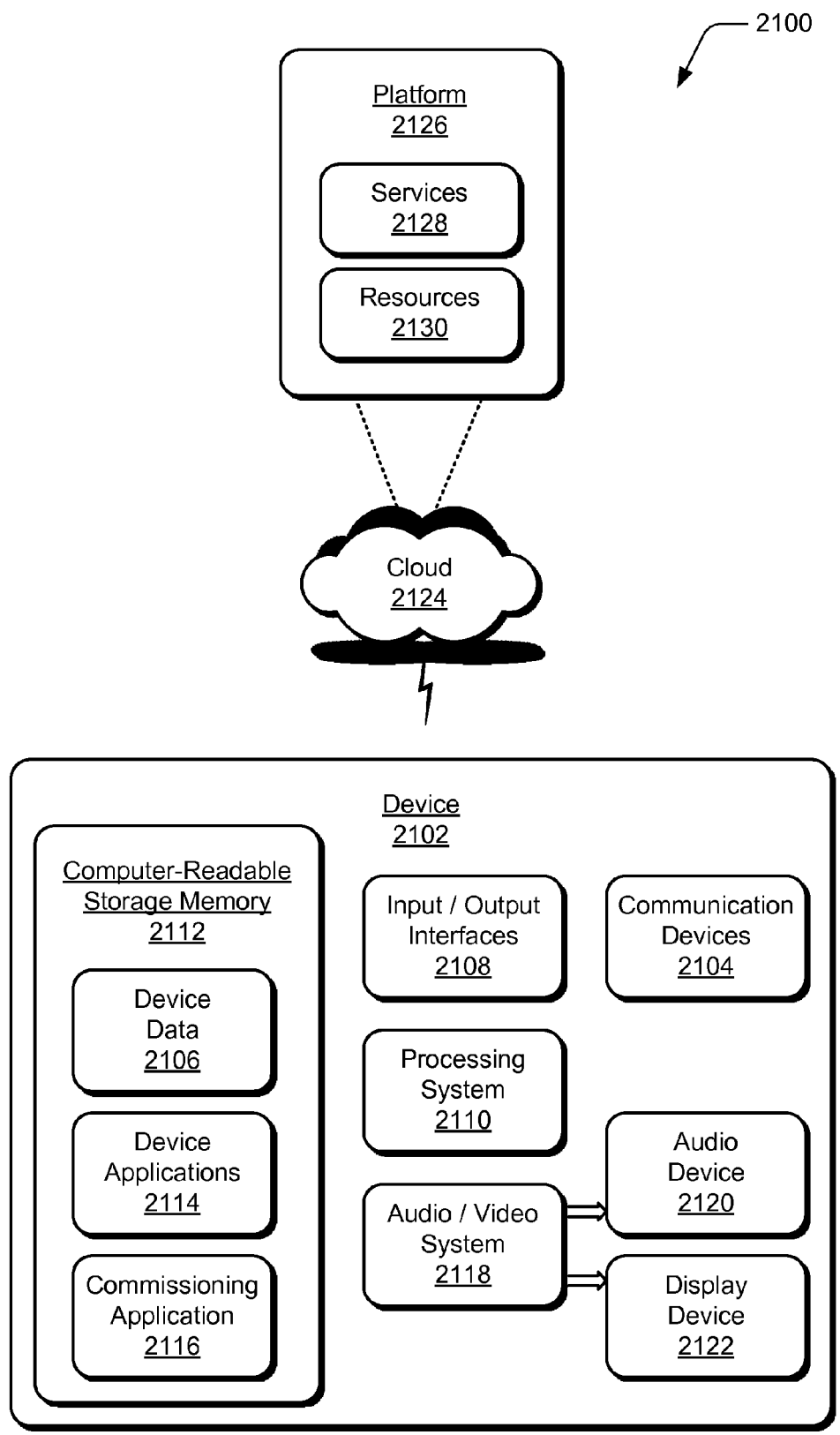
FIG. 21 illustrates an example system with an example device that can implement embodiments of mesh network commissioning.

FIG. 21 illustrates an example system 2100 that includes an example device 2102, which can be implemented as any of the mesh network devices that implement embodiments of mesh network commissioning as described with reference to the previous FIGS. 1-20. The example device 2102 may be any type of computing device, client device, mobile phone, tablet, communication, entertainment, gaming, media playback, and/or other type of device. Further, the example device 2102 may be implemented as any other type of mesh network device that is configured for communication on a mesh network, such as a thermostat, hazard detector, camera, light unit, commissioning device, router, border router, joiner router, joining device, end device, leader, access point, and/or other mesh network devices.

The device 2102 includes communication devices 2104 that enable wired and/or wireless communication of device data 2106, such as data that is communicated between the devices in a mesh network, data that is being received, data scheduled for broadcast, data packets of the data, data that is synched between the devices, etc. The device data can include any type of communication data, as well as audio, video, and/or image data that is generated by applications executing on the device. The communication devices 2104 can also include transceivers for cellular phone communication and/or for network data communication.

The device 2102 also includes input/output (I/O) interfaces 2108, such as data network interfaces that provide connection and/or communication links between the device, data networks (e.g., a mesh network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 2102 includes a processing system 2110 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 2102 may further include any type of a system bus or other data and command transfer system that couples the various components within the device. A system bus can include any one or combination of different bus structures and architectures, as well as control and data lines.

The device 2102 also includes computer-readable storage memory 2112, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 2112 provides storage of the device data 2106 and various device applications 2114, such as an operating system that is maintained as a software application with the computer-readable storage memory and executed by the processing system 2110. The device applications may also include a device manager, such as any form of a control application, software application, signal processing and control module, code that is native to a particular device, a hardware abstraction layer for a particular device, and so on. In this example, the device applications also include a commissioning application 2116 that implements embodiments of mesh network commissioning, such as when the example device 2102 is implemented as any of the mesh network devices described herein.

The device 2102 also includes an audio and/or video system 2118 that generates audio data for an audio device 2120 and/or generates display data for a display device 2122. The audio device and/or the display device include any devices that process, display, and/or otherwise render audio, video, display, and/or image data, such as the image content of a digital photo. In implementations, the audio device and/or the display device are integrated components of the example device 2102. Alternatively, the audio device and/or the display device are external, peripheral components to the example device. In embodiments, at least part of the techniques described for mesh network commissioning may be implemented in a distributed system, such as over a "cloud" 2124 in a platform 2126. The cloud 2124 includes and/or is representative of the platform 2126 for services 2128 and/or resources 2130.

The platform 2126 abstracts underlying functionality of hardware, such as server devices (e.g., included in the services 2128) and/or software resources (e.g., included as the resources 2130), and connects the example device 2102 with other devices, servers, etc. The resources 2130 may also include applications and/or data that can be utilized while computer processing is executed on servers that are remote from the example device 2102. Additionally, the services 2128 and/or the resources 2130 may facilitate subscriber network services, such as over the Internet, a cellular network, or Wi-Fi network. The platform 2126 may also serve to abstract and scale resources to service a demand for the resources 2130 that are implemented via the platform, such as in an interconnected device embodiment with functionality distributed throughout the system 2100. For example, the functionality may be implemented in part at the example device 2102 as well as via the platform 2126 that abstracts the functionality of the cloud 2124.

Although embodiments of mesh network commissioning have been described in language specific to features and/or methods, the subject of the appended claims is not necessarily limited to the specific features or methods described. Rather, the specific features and methods are disclosed as example implementations of mesh network commissioning, and other equivalent features and methods are intended to be within the scope of the appended claims. Further, various different embodiments are described and it is to be appreciated that each described embodiment can be implemented independently or in connection with one or more other described embodiments.

A method of securely joining a joining device to a mesh network comprises receiving, at a joiner router, a message from the joining device requesting to join the mesh network; forwarding the received message to a commissioning device of the mesh network; receiving, from the commissioning device, an authorization for the joining device to join the mesh network; and transmitting network information to the joining device, the network information effective to enable the joining device to join the mesh network.

Alternatively or in addition to the above described method, any one or combination of: receiving a beacon request from the joining device, and transmitting a beacon from the joiner router to the joining device, the beacon providing an indication that the mesh network is available for joining; said transmitting the beacon is effective to enable the joining device to establish a local link between the joining device and the joiner router; said receiving the message and said forwarding the received message is performed using Datagram Transport Layer Security (DTLS); said receiving the message and said forwarding the received message is performed using User Datagram Protocol (UDP); the message received from the joining device comprises an encrypted device identifier that is usable to authenticate the joining device, the joining device is authenticated using Password Authenticated Key Exchange by Juggling (J-PAKE), and the authentication is effective to establish a secure communication session between the commissioning device and the joining device; said forwarding the received message to the commissioning device includes forwarding the received message through one or more routers of the mesh network in a communication path between the joiner router and the commissioning device; and one of the one or more routers is a border router that connects the mesh network to an external network, and wherein the commissioning device is attached to the external network.

A mesh network device implemented as a joiner router, the mesh network device comprises a mesh network interface configured for communication in a mesh network; a memory and processor system to implement a commissioning application that is configured to: receive, via the mesh network interface, a message from a joining device requesting to join the mesh network; forward the received message to a commissioning device of the mesh network; receive, from the commissioning device, an authorization for the joining device to join the mesh network; and initiate network information being transmitted to the joining device, the network information effective to enable the joining device to join the mesh network.

Alternatively or in addition to the above described mesh network device, any one or combination of: the commissioning application is configured to receive, via the mesh network interface, a beacon request from the joining device, and initiate a beacon being transmitted from the joiner router to the joining device, the beacon providing an indication that the mesh network is available for joining; the beacon is effective to enable the joining device to establish a local link between the joining device and the joiner router; the commissioning application is configured to receive the message and forward the received message using Datagram Transport Layer Security (DTLS); the commissioning application is configured to receive the message and forward the received message using User Datagram Protocol (UDP); the message received from the joining device comprises an encrypted device identifier that is usable to authenticate the joining device, the joining device is authenticated using Password Authenticated Key Exchange by Juggling (J-PAKE), and the authentication is effective to establish a secure communication session between the commissioning device and the joining device; the commissioning application is configured to forward the received message through one or more routers of the mesh network in a communication path between the joiner router and the commissioning device; and one of the one or more routers is a border router that connects the mesh network to an external network, and wherein the commissioning device is attached to the external network.

A mesh network system comprises a joining device configured to request joining a mesh network, and a joiner router configured to: receive a message from the joining device requesting to join the mesh network; forward the received message to a commissioning device of the mesh network; receive, from the commissioning device, an authorization for the joining device to join the mesh network; and transmit network information to the joining device, the network information effective to enable the joining device to join the mesh network.

Alternatively or in addition to the above described mesh network system, any one or combination of: the joiner router is configured to: receive a beacon request from the joining device, and transmit a beacon to the joining device, the beacon providing an indication that the mesh network is available for joining and the beacon effective to enable the joining device to establish a local link between the joining device and the joiner router; the message received from the joining device comprises an encrypted device identifier that is usable to authenticate the joining device, the joining device is authenticated using Password Authenticated Key Exchange by Juggling (J-PAKE), and the authentication is effective to establish a secure communication session between the commissioning device and the joining device; and the joiner router is configured to forward the received message to the commissioning device through one or more routers of the mesh network in a communication path between the joiner router and the commissioning device, and wherein one of the routers is a border router that connects the mesh network to an external network.

A method of securely joining a joining device to a mesh network comprises receiving, at a joiner router, a DTLS-ClientHello message from the joining device requesting to join the mesh network; encapsulating the received DTLS-ClientHello message in a DTLS Relay Receive Notification message; transmitting the DTLS Relay Receive Notification message to a commissioning device of the mesh network; receiving, from the commissioning device, a DTLS Relay Transmit Notification message; transmitting content of the DTLS Relay Transmit Notification message to the joining device, the content effective to enable the joining device to join the mesh network; receiving, from the commissioning device, an indication that the joining device is to be entrusted to receive network credentials for the mesh network; receiving, from the commissioning device, a Key Encryption Key (KEK) that is shared between the commissioning device and the joining device; and responsive to the receiving the indication, transmitting the network credentials from the joiner router to the joining device using the KEK to secure communication of the network credentials.

Alternatively or in addition to the above described method, any one or combination of: receiving a beacon request from the joining device, and transmitting a beacon from the joiner router to the joining device; the beacon comprises a network name, and steering data that indicates one or more joining devices that are allowed to join the mesh network; said receiving the DTLS-ClientHello message from the joining device utilizing User Datagram Protocol (UDP); the DTLS Relay Receive Notification message comprises: an address of the joining device, an address of the joiner router, and the received DTLS-ClientHello message; the DTLS Relay Transmit Notification message comprises: the address of the joining device, the address of the joiner router, and a DTLS-HelloVerify message; transmitting the content of the DTLS Relay Transmit Notification message to the joining device is effective to establish a secure communication session between the commissioning device and the joining device; the secure communication session is usable to perform provisioning of the joining device; and applying rate limiting to transmission of DTLS Relay Receive Notification messages transmitted to the commissioning device from joining devices.

A mesh network device implemented as a joiner router, the mesh network device comprises a mesh network interface configured for communication in a mesh network; a memory and processor system to implement a commissioning application that is configured to: receive, via the mesh network interface, a DTLS-ClientHello message from a joining device requesting to join the mesh network; encapsulate the received DTLS-ClientHello message in a DTLS Relay Receive Notification message; initiate the DTLS Relay Receive Notification message being transmitted to a commissioning device of the mesh network; receive, from the commissioning device, a DTLS Relay Transmit Notification message; initiate content of the DTLS Relay Transmit Notification message being transmitted to the joining device, the content effective to enable the joining device to join the mesh network; receive, from the commissioning device, an indication that the joining device is to be entrusted to receive network credentials for the mesh network; receive, from the commissioning device, a Key Encryption Key (KEK) that is shared between the commissioning device and the joining device; and responsive to the indication, initiate the network credentials being transmitted from the joiner router to the joining device using the KEK to secure communication of the network credentials.

Alternatively or in addition to the above described mesh network device, any one or combination of: receive, via the mesh network interface, a beacon request from the joining device, and initiate a beacon being transmitted from the joiner router to the joining device; the commissioning application is configured to receive the DTLS-ClientHello message from the joining device utilizing User Datagram Protocol (UDP); the DTLS Relay Receive Notification message comprises: an address of the joining device, an address of the joiner router, the received DTLS-ClientHello message, and wherein the DTLS Relay Transmit Notification message comprises: the address of the joining device, the address of the joiner router, and a DTLS-HelloVerify message; the content of the DTLS Relay Transmit Notification message transmitted to the joining device is effective to establish a secure communication session between the commissioning device and the joining device; the secure communication session is usable to perform provisioning of the joining device.

A mesh network system comprises a joining device configured to request joining a mesh network, and a joiner router configured to: receive a DTLS-ClientHello message from the joining device requesting to join the mesh network; encapsulate the received DTLS-ClientHello message in a DTLS Relay Receive Notification message; transmit the DTLS Relay Receive Notification message to a commissioning device of the mesh network; receive, from the commissioning device, a DTLS Relay Transmit Notification message; transmit content of the DTLS Relay Transmit Notification message to the joining device, the content effective to enable the joining device to join the mesh network; receive, from the commissioning device, an indication that the joining device is to be entrusted to receive network credentials for the mesh network; receive, from the commissioning device, a Key Encryption Key (KEK) that is shared between the commissioning device and the joining device; and responsive to the indication, transmit the network credentials from the joiner router to the joining device using the KEK to secure communication of the network credentials.

Alternatively or in addition to the above described mesh network system, any one or combination of: receive a beacon request from the joining device, and transmit a beacon from the joiner router to the joining device; the beacon comprises a network name, and steering data that indicates one or more joining devices that are allowed to join the mesh network; the joiner router is configured to receive the DTLS-ClientHello message from the joining device utilizing User Datagram Protocol (UDP); and the DTLS Relay Receive Notification message comprises: an address of the joining device, an address of the joiner router, the received DTLS-ClientHello message, and wherein the DTLS Relay Transmit Notification message comprises: the address of the joining device, the address of the joiner router, and a DTLS-HelloVerify message.

A method of authorizing a commissioning device to become a commissioner to commission one or more joining devices to join a mesh network comprises receiving, at a border router, a petition from the commissioning device to become the commissioner for the mesh network; transmitting, to a leader device of the mesh network, the received petition; receiving, from the leader device, a response to the petition, the response indicating acceptance or rejection of the petition; and in response to said receiving the response, transmitting to the commissioning device an indication of the acceptance or the rejection of the petition.

Alternatively or in addition to the above described method, any one or combination of: advertising, by the border router, availability of the mesh network for commissioning devices, said receiving the petition being in response to the commissioning device receiving said advertising; receiving, at the border router, a request from the commissioning device to securely connect to the border router; the secure connection is established using Datagram Transport Layer Security (DTLS); transmitting the indication of the acceptance of the petition establishes a secure commissioning session; registering an identity of the commissioning device with the border router to establish a secure commissioning communication session, said registering including providing an encrypted commissioning credential to the border router, wherein the encrypted commissioning credential was derived from a commissioning credential input to the commissioning device by a user; the border router includes a copy of the encrypted commissioning credential usable to authenticate the commissioning device to the mesh network; and the copy of the encrypted commissioning credential was previously derived from the commissioning credential, the commissioning credential was injected into the leader device of the mesh network that derived the copy of the encrypted commissioning credential, and the leader device communicated the copy of the encrypted commissioning credential securely to the border router.

A mesh network device implemented as a border router, the mesh network device comprises a mesh network interface configured for communication in a mesh network; a memory and processor system to implement a commissioning application that is configured to: receive, via the mesh network interface, a petition from a commissioning device to become a commissioner for the mesh network to commission one or more joining devices to join the mesh network; initiate the received petition being transmitted to a leader device of the mesh network; receive, from the leader device, a response to the petition, the response indicating acceptance or rejection of the petition; and responsive to the received response to the petition, initiate an indication of the acceptance or the rejection of the petition being transmitted to the commissioning device.

Alternatively or in addition to the above described mesh network device, any one or combination of: the commissioning application is configured to advertise availability of the mesh network for commissioning devices, and receive the petition in response to the commissioning device receiving the advertised availability, and the advertised availability is performed using a service discovery protocol comprising Multicast Domain Name System (mDNS); the commissioning application is configured to receive a request from the commissioning device to securely connect to the border router, and a secure connection is established using Datagram Transport Layer Security (DTLS); the acceptance of the petition by the leader device authorizes the commissioning device to be the commissioner for the mesh network, the acceptance of the petition enabling the leader device to update an internal state that tracks an active commissioner for the mesh network, set a permit-join flag for the mesh network to true, and propagate a commissioning dataset within the mesh network, and the transmitted indication of the acceptance of the petition establishes a secure commissioning session; the commissioning application is configured to register an identity of the commissioning device with the border router to establish a secure commissioning communication session, including an encrypted commissioning credential provided to the border router, the encrypted commissioning credential was derived from a commissioning credential input to the commissioning device by a user, and the border router includes a copy of the encrypted commissioning credential usable to authenticate the commissioning device to the mesh network; the commissioning device and the border router communicate over a network other than the mesh network; and the other network is one of a Wi-Fi network or an Ethernet network.

A mesh network system, comprises a commissioning device configured to petition to become a commissioner to commission one or more joining devices to join a mesh network, and a border router configured to: receive a petition from the commissioning device to become the commissioner for the mesh network; transmit the received petition to a leader device of the mesh network; receive a response to the petition from the leader device, the response indicating acceptance or rejection of the petition; and transmit an indication of the acceptance or the rejection of the petition to the commissioning device.

Alternatively or in addition to the above described mesh network system, any one or combination of: the border router is configured to advertise availability of the mesh network for commissioning devices, and received the petition in response to the commissioning device receiving the advertising; the commissioning device and the border router communicate over a network other than the mesh network; the other network is one of a Wi-Fi network or an Ethernet network; and the border router is configured to transmit the indication of the acceptance of the petition to establish a secure commissioning session.

A method implemented by a leader device of a mesh network comprises receiving, by a leader device, a petition to accept a commissioning device as a commissioner to commission joining devices to join the mesh network; determining whether to accept or reject the received petition; transmitting a response including an indication of said determination; and in response to said determination being an acceptance, updating an internal state that tracks an active commissioner for the mesh network.

Alternatively or in addition to the above described method, any one or combination of: receiving, from the commissioning device, a command to initiate a joining mode for the mesh network; propagating a commissioning dataset within the mesh network; the commissioning dataset comprises: a commissioner session identifier, a commissioner timestamp, an encrypted commissioner credential, and a security policy that indicates which security-related operations are allowed in the mesh network; deriving the encrypted commissioning credential from a commissioning credential that was injected into the leader device during commissioning of the leader device; the derivation of the encrypted commissioning credential is performed by applying a key derivation function, the key derivation function performing a hashing multiple times using a Cipher-based Message Authentication Code (CMAC); sending a copy of the encrypted commissioning credential to the border router, effective to enable the border router to authenticate the commissioning device to the mesh network; and when the commissioner is active on the mesh network, the commissioning dataset further comprises a location of the border router.

A mesh network device implemented as a leader device of a mesh network, the mesh network device comprises a mesh network interface configured for communication in the mesh network; a memory and processor system to implement a commissioning application that is configured to: receive, via the mesh network interface, a petition to accept a commissioning device as a commissioner to commission joining devices to join the mesh network; determine whether to accept or reject the received petition; initiate a response being transmitted, including an indication of the determination of whether to accept or reject the received petition; and responsive to the determination being an acceptance of the received petition, update an internal state that tracks an active commissioner for the mesh network.

Alternatively or in addition to the above described mesh network device, any one or combination of: the commissioning application is configured to receive, from the commissioning device, a command to initiate a joining mode for the mesh network; the commissioning application is configured to propagate a commissioning dataset within the mesh network; the commissioning dataset comprises: a commissioner session identifier, a commissioner timestamp, an encrypted commissioner credential, and a security policy that indicates which security-related operations are allowed in the mesh network, the commissioning application further configured to derive the encrypted commissioning credential from a commissioning credential that was injected into the leader device during commissioning of the leader device, wherein the derivation of the encrypted commissioning credential is performed by applying a key derivation function, the key derivation function performing a hashing multiple times using a Cipher-based Message Authentication Code (CMAC); the commissioning application is configured to send a copy of the encrypted commissioning credential to the border router, effective to enable the border router to authenticate the commissioning device to the mesh network; and when the commissioner is active on the mesh network, the commissioning dataset further comprises a location of the border router.

A mesh network system comprises a commissioning device configured to petition to become a commissioner to commission one or more joining devices to join a mesh network, and a leader device of the mesh network, the leader device configured to: receive a petition to accept the commissioning device as the commissioner to commission the joining devices to join the mesh network; determine whether to accept or reject the received petition; transmit a response including an indication of the determination as to whether to accept or reject the received petition; and in response to the determination being an acceptance, update an internal state that tracks an active commissioner for the mesh network.

Alternatively or in addition to the above described mesh network system, any one or combination of: the leader device is configured to receive, from the commissioning device, a command to initiate a joining mode for the mesh network; the leader device is configured to propagate a commissioning dataset within the mesh network; the commissioning dataset comprises: a commissioner session identifier, a commissioner timestamp, an encrypted commissioner credential, and a security policy that indicates which security-related operations are allowed in the mesh network, the leader device further configured to derive the encrypted commissioning credential from a commissioning credential that was injected into the leader device during commissioning of the leader device, wherein the derivation of the encrypted commissioning credential is performed by applying a key derivation function, the key derivation function performing a hashing multiple times using a Cipher-based Message Authentication Code (CMAC); the leader device is configured to send a copy of the encrypted commissioning credential to the border router, effective to enable the border router to authenticate the commissioning device to the mesh network; and when the commissioner is active on the mesh network, the commissioning dataset further comprises a location of the border router.

A method of securely establishing network communication sessions for joining one or more joining devices to a mesh network comprises establishing a secure commissioning communication session between a commissioning device and a border router of the mesh network; activating joining for the mesh network; receiving, by the commissioning device, a request from one of the joining devices to join the mesh network; establishing a secure joiner communication session between the commissioning device and the joining device; and joining the joining device to the mesh network.

Alternatively or in addition to the above described method, any one or combination of: establishing the secure commissioning communication session comprises: sending a petition from the commissioning device to a leader device of the mesh network to request acceptance of the commissioning device as an active commissioner for the mesh network, and receiving an indication of an acceptance of the petition from the leader device; activating joining for the mesh network comprises the commissioning device initiating a joining mode that causes one or more routers in the mesh network to advertise that the mesh network is accepting joining requests; activating joining for the mesh network comprises sending a management message to a leader device to make the mesh network joinable, the management message effective to enable the leader device to update network data for the mesh network, and propagate the network data to one or more router devices in the mesh network, the network data comprising an indication that the mesh network is available for joining; authenticating the joining device, using an encrypted device identifier; receiving the request from one of the joining devices to join the mesh network is received via a joiner router, the method further comprising: transmitting, to the joiner router, an indication that the joining device is to be entrusted to receive network credentials for the mesh network and a Key Encryption Key (KEK), which is shared between the commissioning device and the joining device, said transmitting being effective to enable the joiner router to use the received KEK to securely transmit the network credentials to the joining device to commission the joining device to the mesh network; receiving the request from the joining device comprises receiving an encrypted device identifier of the joining device, and wherein the encrypted device identifier is derived from a device identifier of the joining device using Password Authentication Key Exchange by Juggling (J-PAKE); establishing the secure joiner communication session comprises: determining, by the commissioning device, that the encrypted device identifier received from the joining device matches an encrypted device identifier derived by the commissioning device from a copy of the device identifier that is received as an input to the commissioning device from a user, and using the encrypted device identifier as a shared secret to secure the joiner communication session.

A mesh network device implemented as a commissioning device for joining one or more joining devices to a mesh network, the mesh network device comprises a mesh network interface configured for communication in the mesh network; a memory and processor system to implement a commissioning application that is configured to: establish a secure commissioning communication session between the commissioning device and a border router of the mesh network; activate joining for the mesh network; receive, via the mesh network interface, a request from one of the joining devices to join the mesh network; establish a secure joiner communication session between the commissioning device and the joining device; and join the joining device to the mesh network.

Alternatively or in addition to the above described mesh network device, any one or combination of: the commissioning application is configured to: send a petition from the commissioning device to a leader device of the mesh network to request acceptance of the commissioning device as an active commissioner for the mesh network, and receive an indication of an acceptance of the petition from the leader device; the commissioning application is configured to said activate joining for the mesh network by initiating a joining mode that causes one or more routers in the mesh network to advertise that the mesh network is accepting joining requests; the commissioning application is configured to said activate joining for the mesh network by sending a management message to a leader device to make the mesh network joinable, the management message enabling the leader device to update network data for the mesh network, and propagate the network data to one or more router devices in the mesh network, the network data comprising an indication that the mesh network is available for joining; the request received from the joining device comprises an encrypted device identifier of the joining device, and wherein the encrypted device identifier is derived from a device identifier of the joining device using Password Authentication Key Exchange by Juggling (J-PAKE); the commissioning application is configured to establish the secure joiner communication session further configured to: determine that the encrypted device identifier received from the joining device matches an encrypted device identifier derived by the commissioning device from a copy of the device identifier that is received as an input to the commissioning device from a user, and use the encrypted device identifier as a shared secret to secure the joiner communication session; the commissioning application is configured to forward the request from the joining device to join the mesh network, the request forwarded to the commissioning device by one or more router devices in the mesh network.

A mesh network system comprises one or more joining devices configured to request joining a mesh network, and a commissioning device of the mesh network, the commissioning device configured to: establish a secure commissioning communication session between the commissioning device and a border router of the mesh network; activate joining for the mesh network; receive a request from one of the joining devices to join the mesh network; establish a secure joiner communication session between the commissioning device and the joining device; and join the joining device to the mesh network.

Alternatively or in addition to the above described mesh network system, any one or combination of: the commissioning device, to establish the secure commissioning communication session, is configured to: send a petition from the commissioning device to a leader device of the mesh network to request acceptance of the commissioning device as an active commissioner for the mesh network, and receive an indication of an acceptance of the petition from the leader device; the commissioning device is configured to said activate joining for the mesh network by initiating a joining mode that causes one or more routers in the mesh network to advertise that the mesh network is accepting joining requests; the commissioning device is configured to said activate joining for the mesh network by sending a management message to a leader device to make the mesh network joinable, the management message enabling the leader device to update network data for the mesh network, and propagate the network data to one or more router devices in the mesh network, the network data comprising an indication that the mesh network is available for joining; the commissioning device is configured to: said receive the request from one of the joining devices to join the mesh network via a joiner router, and transmit, to the joiner router, an indication that the joining device is to be entrusted to receive network credentials for the mesh network and a Key Encryption Key (KEK), which is shared between the commissioning device and the joining device, the transmitted indication enabling the joiner router to use the received KEK to securely transmit the network credentials to the joining device to commission the joining device to the mesh network.

A method of provisioning a joining device in a mesh network comprises establishing a commissioning communication session between a commissioning device and a border router of the mesh network; establishing a joiner communication session between the joining device and the commissioning device; sending commissioning information to the joining device, the commissioning information being usable by the joining device to join the mesh network; receiving an indication of a location of a commissioner application from the joining device; and executing the commissioner application to provision the joining device.

Alternatively or in addition to the above described method, any one or combination of: retrieving the commissioner application utilizing the received indication; the received indication of the location of the commissioner application is a Uniform Resource Locator (URL); the commissioner application is retrieved over the Internet from a cloud service; the commissioning device uses the received URL to determine if the commissioner application is stored in a memory of the commissioning device; responsive to completing the provisioning of the joining device, finalizing commissioning of the joining device, the finalizing being effective to enable the joining device to join the mesh network; the provisioning of the joining device comprises updating software on the joining device; the provisioning of the joining device comprises linking the joining device to a user account on a cloud service; the provisioning of the joining device comprises configuring the joining device; and the configuration is a local configuration related to other devices in the mesh network.

A mesh network device implemented as a commissioning device, the mesh network device comprises a mesh network interface configured for communication in a mesh network; a memory and processor system to implement a commissioning application that is configured to: establish a commissioning communication session between the commissioning device and a border router of the mesh network; establish a joiner communication session between the joining device and the commissioning device; send commissioning information to the joining device, the commissioning information being usable by the joining device to join the mesh network; receive an indication of a location of a commissioner application from the joining device; and execute the commissioner application to provision the joining device.

Alternatively or in addition to the above described mesh network device, any one or combination of: the commissioning application is configured to retrieve the commissioner application utilizing the received indication; the received indication of the location of the commissioner application is a Uniform Resource Locator (URL); the commissioner application is retrieved over the Internet from a cloud service; the commissioning device uses the received URL to determine if the commissioner application is stored in a memory of the commissioning device.

A mesh network system comprises a joining device configured to request joining a mesh network, and a commissioning device of the mesh network, the commissioning device configured to: establish a commissioning communication session between the commissioning device and a border router of the mesh network; establish a joiner communication session between the joining device and the commissioning device; send commissioning information to the joining device, the commissioning information being usable by the joining device to join the mesh network; receive an indication of a location of a commissioner application from the joining device; and execute the commissioner application to provision the joining device.

Alternatively or in addition to the above described mesh network system, any one or combination of: the commissioning application is configured to retrieve the commissioner application utilizing the received indication; the received indication of the location of the commissioner application is a Uniform Resource Locator (URL); the commissioner application is retrieved over the Internet from a cloud service; and the commissioning device uses the received URL to determine if the commissioner application is stored in a memory of the commissioning device.

A method of identifying devices that are allowed to join a mesh network comprises determining steering data for the mesh network, the steering data comprising an indication of a device identifier associated with a device that is allowed to join the mesh network, and propagating the steering data from a commissioning device for the mesh network to one or more routers in the mesh network, said propagating enabling the one or more routers to transmit the steering data in a beacon message, the steering data effective to enable the device associated with the device identifier to identify that the device is allowed to join the mesh network.

Alternatively or in addition to the above described method, any one or combination of: the steering data comprises a 16 bit Cyclic Redundancy Check (CRC16) of the device identifier; the device identifier is an IEEE 64-bit Extended Unique Identifier (EUI-64); said determining the steering data for the mesh network further comprises determining the steering data for additional device identifiers associated with additional devices that are allowed to join the mesh network; said propagating the steering data is effective to enable the device to distinguish the mesh network from other networks; the other networks are IEEE 802.15.4 networks; and the steering data indicates that a commissioner is active on the mesh network.

A mesh network device implemented as a commissioning device, the mesh network device comprises a mesh network interface configured for communication in a mesh network; a memory and processor system to implement a commissioning application that is configured to: determine steering data for the mesh network, the steering data comprising an indication of a device identifier associated with a device that is allowed to join the mesh network; and propagate the steering data from a commissioning device for the mesh network to one or more routers in the mesh network, the propagation being enabling the one or more routers to transmit the steering data in a beacon message, the steering data being effective to enable the device associated with the device identifier to identify that the device is allowed to join the mesh network.

Alternatively or in addition to the above described mesh network device, any one or combination of: the steering data comprises a 16 bit Cyclic Redundancy Check (CRC16) of the device identifier; the device identifier is an IEEE 64-bit Extended Unique Identifier (EUI-64); the commissioning application, to determine the steering data for the mesh network, is configured to determine the steering data for additional device identifiers associated with additional devices that are allowed to join the mesh network; the steering data is usable by the device to distinguish the mesh network from other networks; the other networks are IEEE 802.15.4 networks; and the steering data indicates that a commissioner is active on the mesh network.

A mesh network system comprises a joining device configured to request joining a mesh network, and a commissioning device of the mesh network, the commissioning device configured to: determine steering data for the mesh network, the steering data comprising an indication of a device identifier associated with a device that is allowed to join the mesh network; and propagate the steering data from a commissioning device for the mesh network to one or more routers in the mesh network, the propagation being enabling the one or more routers to transmit the steering data in a beacon message, the steering data being effective to enable the device associated with the device identifier to identify that the device is allowed to join the mesh network.

Alternatively or in addition to the above described mesh network system, any one or combination of: the steering data comprises a 16 bit Cyclic Redundancy Check (CRC16) of the device identifier; the device identifier is an IEEE 64-bit Extended Unique Identifier (EUI-64); the commissioning device, to determine the steering data for the mesh network, is configured to determine the steering data for additional device identifiers associated with additional devices that are allowed to join the mesh network; the steering data enables the device to distinguish the mesh network from other networks; the steering data indicates that a commissioner is active on the mesh network.

A method of identifying devices that are allowed to join a mesh network comprises determining steering data for the mesh network, the steering data comprising an indication of a device identifier associated with a device that is allowed to join the mesh network, and the indication being represented as a set of values in a Bloom filter that represent the device identifier; and propagating the steering data from a commissioning device for the mesh network to one or more routers in the mesh network, said propagating enabling the one or more routers to transmit the steering data in a beacon message, the steering data enabling the device associated with the device identifier to compare the set of values in the Bloom filter to a second set of values determined at the device to identify that the device is allowed to join the mesh network.

Alternatively or in addition to the above described method, any one or combination of: determining the steering data comprises: applying a first hash function to the device identifier to produce a first hash value, applying a second hash function to the device identifier to produce a second hash value, performing a modulo operation on the first hash value to determine a first bit field location in the Bloom filter, performing the modulo operation on the second hash value to determine a second bit field location in the Bloom filter, setting a value in the first bit field location of the Bloom filter to one, and setting the value in the second bit field location of the Bloom filter to one; the first and second hash functions are Cyclic Redundancy Checks (CRC), the first hash function being a CRC16-CCITT, and the second hash function being a CRC16-ANSI; a divisor for the modulo operation is the length of a bit array of the Bloom filter; the device identifier is an IEEE 64-bit Extended Unique Identifier (EUI-64); the device identifier is the least significant twenty-four bits of the EUI-64; determining the steering data for the mesh network further comprises determining the steering data for additional device identifiers associated with additional devices that are allowed to join the mesh network; setting the value of the steering data to a value of zero, which disables joining for the mesh network; and setting all bit field values in the steering data to a value of one to indicate that the mesh network is joinable for any device.

A mesh network device implemented as a commissioning device, the mesh network device comprises a mesh network interface configured for communication in a mesh network; a memory and processor system to implement a commissioning application that is configured to: determine steering data for the mesh network, the steering data comprising an indication of a device identifier associated with a device that is allowed to join the mesh network, and the indication being represented as a set of values in a Bloom filter that represent the device identifier; and propagate the steering data to one or more routers in the mesh network, the propagation effective to enable the one or more routers to transmit the steering data in a beacon message, the steering data enabling the device associated with the device identifier to compare the set of values in the Bloom filter to a second set of values determined at the device to identify that the device is allowed to join the mesh network.

Alternatively or in addition to the above described mesh network device, any one or combination of: the commissioning application is configured to: apply a first hash function to the device identifier to produce a first hash value, apply a second hash function to the device identifier to produce a second hash value, perform a modulo operation on the first hash value to determine a first bit field location in the Bloom filter, perform the modulo operation on the second hash value to determine a second bit field location in the Bloom filter, set a value in the first bit field location of the Bloom filter to one, and set the value in the second bit field location of the Bloom filter to one; the first and second hash functions are Cyclic Redundancy Checks (CRC), the first hash function being a CRC16-CCITT, and the second hash function being a CRC16-ANSI; and a divisor for the modulo operation is the length of a bit array of the Bloom filter; the device identifier is an IEEE 64-bit Extended Unique Identifier (EUI-64).

A mesh network system comprises a joining device configured to request joining a mesh network, and a commissioning device configured to: determine steering data for the mesh network, the steering data comprising an indication of a device identifier associated with a device that is allowed to join the mesh network, and the indication being represented as a set of values in a Bloom filter that represent the device identifier; and propagate the steering data to one or more routers in the mesh network, the propagation effective to enable the one or more routers to transmit the steering data in a beacon message, the steering data enabling the device associated with the device identifier to compare the set of values in the Bloom filter to a second set of values determined at the device to identify that the device is allowed to join the mesh network.

Alternatively or in addition to the above described mesh network system, any one or combination of: the commissioning device is configured to: apply a first hash function to the device identifier to produce a first hash value, apply a second hash function to the device identifier to produce a second hash value, perform a modulo operation on the first hash value to determine a first bit field location in the Bloom filter, perform the modulo operation on the second hash value to determine a second bit field location in the Bloom filter, set a value in the first bit field location of the Bloom filter to one, and set the value in the second bit field location of the Bloom filter to one; the first and second hash functions are Cyclic Redundancy Checks (CRC), the first hash function being a CRC16-CCITT, and the second hash function being a CRC16-ANSI; a divisor for the modulo operation is the length of a bit array of the Bloom filter; the device identifier is an IEEE 64-bit Extended Unique Identifier (EUI-64); the computing device, to determine the steering data for the mesh network, is configured to determine the steering data for additional device identifiers associated with additional joiner devices that are allowed to join the mesh network.

A method of updating commissioning data in nodes of a mesh network comprises receiving a commissioning dataset at a node device in the mesh network; comparing a timestamp included in the received commissioning dataset with a stored timestamp included in a commissioning dataset that is stored in the node device; determining, from said comparing, that the stored timestamp is more recent than the received timestamp; and in response to said determining, transmitting a message to a leader device of the mesh network, the message comprising the stored commissioning dataset and being effective to enable the leader device to accept the stored commissioning dataset as the most recent commissioning dataset for the mesh network, and propagate the stored commissioning dataset to the mesh network.

Alternatively or in addition to the above described method, any one or combination of: determining, from said comparing, that the received timestamp is more recent than the stored timestamp, and in response to said determining that the received timestamp is more recent than the stored timestamp, updating the stored commissioning dataset to match the received commissioning dataset; the received commissioning dataset comprises: the received timestamp, a commissioning credential, a network name of the mesh network, and a security policy that indicates which security-related operations are allowed in the mesh network; the received timestamp comprises a time value, and an indication that the time value is traceable to Coordinated Universal Time (UTC); the node device and the leader device were previously commissioned to the mesh network, and wherein the previous commissioning stored identical commissioning datasets in the node device and the leader device; the stored commissioning dataset in the node device is updated after a split of the mesh network, the split separating the mesh network into a plurality of partitions, wherein a first partition of the mesh network includes the leader device, and wherein a second partition of the mesh network includes the node device; the split stops communication between the node device and the leader device over the mesh network; receiving the commissioning dataset at the node device occurs after a merge of the first partition and the second partition of the mesh network, the merge re-establishing a communication path between the node device and the leader device over the mesh network; and the node device is a router device or a router-eligible device.

A mesh network device implemented as a router, the mesh network device comprises: a mesh network interface configured for communication in a mesh network; a memory and processor system to implement a commissioning application that is configured to: receive a commissioning dataset; compare a timestamp included in the received commissioning dataset with a stored timestamp included in a commissioning dataset that is stored in the router; determine from the comparison that the stored timestamp is more recent than the received timestamp; and in response to the determination, transmit a message to a leader device of the mesh network, the message comprising the stored commissioning dataset and being effective to enable the leader device to accept the stored commissioning dataset as the most recent commissioning dataset for the mesh network, and propagate the stored commissioning dataset to the mesh network.

Alternatively or in addition to the above described mesh network device, any one or combination of: the commissioning application is configured to: determine from the comparison that the received timestamp is more recent than the stored timestamp, and in response to the determination that the received timestamp is more recent than the stored timestamp, update the stored commissioning dataset to match the received commissioning dataset; the received commissioning dataset comprises: the received timestamp, a commissioning credential, a network name of the mesh network, and a security policy that indicates which security-related operations are allowed in the mesh network; the received timestamp comprises a time value, and an indication that the time value is traceable to Coordinated Universal Time (UTC); the router and the leader device were previously commissioned to the mesh network, and wherein the previous commissioning stored identical commissioning datasets in the router and the leader device; and the stored commissioning dataset in the router is updated after a split of the mesh network, the split separating the mesh network into a plurality of partitions, wherein a first partition of the mesh network includes the leader device, and wherein a second partition of the mesh network includes the router.

A mesh network system comprises a leader device configured to maintain commissioning data for the mesh network, and a router device configured to: receive a commissioning dataset; compare a timestamp included in the received commissioning dataset with a stored timestamp included in a commissioning dataset that is stored in the router; determine from the comparison that the stored timestamp is more recent than the received timestamp; and in response to the determination, transmit a message to a leader device of the mesh network, the message comprising the stored commissioning dataset and being effective to enable the leader device to accept the stored commissioning dataset as the most recent commissioning dataset for the mesh network, and propagate the stored commissioning dataset to the mesh network.

Alternatively or in addition to the above described mesh network system, any one or combination of: the router device is configured to: determine from the comparison that the received timestamp is more recent than the stored timestamp, and in response to the determination that the received timestamp is more recent than the stored timestamp, update the stored commissioning dataset to match the received commissioning dataset; the received commissioning dataset comprises: the received timestamp, a commissioning credential, a network name of the mesh network, and a security policy that indicates which security-related operations are allowed in the mesh network; the received timestamp comprises a time value, and an indication that the time value is traceable to Coordinated Universal Time (UTC); and the router and the leader device were previously commissioned to the mesh network, and wherein the previous commissioning stored identical commissioning datasets in the router and the leader device.

The invention claimed is:

1. A method of updating commissioning data in nodes of a mesh network, the method comprising:
   receiving a commissioning dataset at a node device in the mesh network;
   comparing a timestamp included in the received commissioning dataset with a stored timestamp included in a commissioning dataset that is stored in the node device, the stored commissioning dataset having been updated after a split of the mesh network into a plurality of partitions, a first partition including a leader device and a second partition including the node device, the split stopping communication between the node device and the leader device over the mesh network;
   determining, from said comparing, that the stored timestamp is more recent than the received timestamp; and
   in response to said determining, transmitting a message to the leader device of the mesh network, the message comprising the stored commissioning dataset and being effective to enable the leader device to accept the stored commissioning dataset as the most recent commissioning dataset for the mesh network, and propagate the stored commissioning dataset to the mesh network, the node device and the leader device having been previously commissioned to the mesh network with stored identical commissioning datasets in the node device and the leader device.

2. The method as recited in claim 1, further comprising:
   determining, from said comparing, that the received timestamp is more recent than the stored timestamp; and
   in response to said determining that the received timestamp is more recent than the stored timestamp, updating the stored commissioning dataset to match the received commissioning dataset.

3. The method as recited in claim 1, wherein the received commissioning dataset comprises:
   the received timestamp;
   a commissioning credential;
   a network name of the mesh network; and
   a security policy that indicates which security-related operations are allowed in the mesh network.

4. The method as recited in claim 3, wherein the received timestamp comprises a time value, and an indication that the time value is traceable to Coordinated Universal Time (UTC).

5. The method as recited in claim 1, wherein said receiving the commissioning dataset at the node device occurs after a merge of the first partition and the second partition of the mesh network, the merge re-establishing a communication path between the node device and the leader device over the mesh network.

6. The method as recited in claim 1, wherein the node device is a router device or a router-eligible device.

7. A mesh network device implemented as a router, the mesh network device comprising:
   a mesh network interface configured for communication in a mesh network;
   a memory and processor system to implement a commissioning application that is configured to:
   receive a commissioning dataset;
   compare a timestamp included in the received commissioning dataset with a stored timestamp included in a commissioning dataset that is stored in the router, the stored commissioning dataset having been updated after a split of the mesh network into a plurality of partitions, a first partition including a leader device and a second partition including the router, the split stopping communication between the router and the leader device over the mesh network;
   determine from the comparison that the stored timestamp is more recent than the received timestamp; and
   in response to the determination, transmit a message to the leader device of the mesh network, the message comprising the stored commissioning dataset and being effective to enable the leader device to accept the stored commissioning dataset as the most recent commissioning dataset for the mesh network, and propagate the stored commissioning dataset to the mesh network, the router and the leader device having been previously commissioned to the mesh network with stored identical commissioning datasets in the router and the leader device.

8. The mesh network device as recited in claim 7, wherein the commissioning application is configured to:
   determine from the comparison that the received timestamp is more recent than the stored timestamp; and
   in response to the determination that the received timestamp is more recent than the stored timestamp, update the stored commissioning dataset to match the received commissioning dataset.

9. The mesh network device as recited in claim 7, wherein the received commissioning dataset comprises:
   the received timestamp;
   a commissioning credential;
   a network name of the mesh network; and
   a security policy that indicates which security-related operations are allowed in the mesh network.

10. The mesh network device as recited in claim 9, wherein the received timestamp comprises a time value, and an indication that the time value is traceable to Coordinated Universal Time (UTC).

11. A mesh network system, comprising:
   a leader device configured to maintain commissioning data for the mesh network; and
   a router device configured to:
   receive a commissioning dataset;
   compare a timestamp included in the received commissioning dataset with a stored timestamp included in a commissioning dataset that is stored in the router device, the stored commissioning dataset having been updated after a split of the mesh network into a plurality of partitions, a first partition including a leader device and a second partition including the router device, the split stopping communication between the router device and the leader device over the mesh network;
   determine from the comparison that the stored timestamp is more recent than the received timestamp; and
   in response to the determination, transmit a message to the leader device of the mesh network, the message comprising the stored commissioning dataset and being effective to enable the leader device to accept the stored commissioning dataset as the most recent commissioning dataset for the mesh network, and propagate the stored commissioning dataset to the mesh network, the router device and the leader device having been previously commissioned to the mesh network with stored identical commissioning datasets in the router device and the leader device.

12. The mesh network system as recited in claim 11, wherein the router device is configured to:
   determine from the comparison that the received timestamp is more recent than the stored timestamp; and
   in response to the determination that the received timestamp is more recent than the stored timestamp, update the stored commissioning dataset to match the received commissioning dataset.

13. The mesh network system as recited in claim 11, wherein the received commissioning dataset comprises:
   the received timestamp;
   a commissioning credential;
   a network name of the mesh network; and
   a security policy that indicates which security-related operations are allowed in the mesh network.

14. The mesh network system as recited in claim 13, wherein the received timestamp comprises a time value, and an indication that the time value is traceable to Coordinated Universal Time (UTC).

15. The mesh network system as recited in claim 11, wherein the reception of the commissioning dataset at the router device occurs after a merge of the first partition and the second partition of the mesh network, the merge re-establishing a communication path between the router device and the leader device over the mesh network.

16. The mesh network system as recited in claim 13, wherein the received timestamp comprises a time value and an indication that the time value is a relative time value.

17. The method as recited in claim 1, wherein if the stored timestamp and the received timestamp are identical, the leader device accepts the commissioning dataset of a highest priority fragment as the most recent commissioning dataset for the mesh network.

18. The method as recited in claim 3, wherein the received timestamp comprises a time value and an indication that the time value is a relative time value.

19. The mesh network device as recited in claim 7, wherein the reception of the commissioning dataset at the router occurs after a merge of the first partition and the second partition of the mesh network, the merge re-establishing a communication path between the router and the leader device over the mesh network.

20. The mesh network device as recited in claim 9, wherein the received timestamp comprises a time value and an indication that the time value is a relative time value.

* * * * *